(12) United States Patent
Harkins

(10) Patent No.: US 9,580,912 B1
(45) Date of Patent: Feb. 28, 2017

(54) SYSTEM FOR INSTALLING CEILING SHEETS IN BUILDINGS

(71) Applicant: Daniel J. Harkins, Port Charlotte, FL (US)

(72) Inventor: Daniel J. Harkins, Port Charlotte, FL (US)

( * ) Notice: Subject to any disclaimer, the term of this patent is extended or adjusted under 35 U.S.C. 154(b) by 4 days.

(21) Appl. No.: 14/838,938

(22) Filed: Aug. 28, 2015

Related U.S. Application Data

(63) Continuation of application No. 14/553,440, filed on Nov. 25, 2014, now Pat. No. 9,133,623, which is a continuation of application No. 14/270,379, filed on May 6, 2014, now Pat. No. 8,991,110, which is a continuation of application No. 13/616,709, filed on Sep. 14, 2012, now Pat. No. 8,844,230.

(51) Int. Cl.
  *E04B 1/74* (2006.01)
  *E04F 13/00* (2006.01)
  *E04B 1/24* (2006.01)

(52) U.S. Cl.
  CPC ............. *E04F 13/005* (2013.01); *E04B 1/24* (2013.01)

(58) Field of Classification Search
  CPC ..... E04B 1/24; E04B 1/74; E04B 1/76; E04B 1/342; E04B 1/767; E04B 1/7604; E04B 1/7608; E04B 1/7612; E04B 1/7616; E04B 1/7666; E04B 1/7675; E04D 11/02; E04D 13/1625; E04D 13/1606; E04D 13/1618
  USPC ............ 52/169.11, 273, 404.1, 404.2, 404.5, 52/407.1, 407.4, 408, 410
  See application file for complete search history.

(56) References Cited

U.S. PATENT DOCUMENTS

| | | | | |
|---|---|---|---|---|
| 3,559,914 A | * | 2/1971 | Alderman | ............... E04D 15/06 242/557 |
| 3,969,863 A | * | 7/1976 | Alderman | ............. E04D 3/3602 52/407.4 |
| 4,047,345 A | * | 9/1977 | Alderman | ............. E04D 3/3601 52/404.1 |
| 4,050,972 A | * | 9/1977 | Cardinal, Jr. | ...... A01G 13/0287 156/308.2 |
| 4,147,003 A | * | 4/1979 | Alderman | ............. E04D 3/3602 52/309.8 |
| 4,222,212 A | | 9/1980 | Alderman | |
| 4,280,312 A | * | 7/1981 | Otts | ........................ E04F 21/18 227/111 |

(Continued)

*Primary Examiner* — Charles A Fox
*Assistant Examiner* — James Buckle, Jr.
(74) *Attorney, Agent, or Firm* — Donald J. Ersler

(57) ABSTRACT

A tensioned panel extended insulation system includes a support structure, a panel support structure and a pair of insulation panels. A telescoping tube extended insulation system includes a support structure and a ceiling sheet material. A rafter clip may be attached to a rafter for attachment of an end of the support structure. A cable arched telescoping tube extended insulation system includes an arched support structure, an adjustable spacer, a cable and the ceiling sheet material. A bar joist extended insulation system includes a support structure, an insulation support structure and an ceiling sheet material. A bar joist extended insulation system may be arched. A system for installing ceiling sheet material in buildings preferably includes either two roller supports or two sheave supports, a middle section, a first end section and a second end section. A rotary strut could also be used to replace an existing strut.

13 Claims, 46 Drawing Sheets

(56) References Cited

U.S. PATENT DOCUMENTS

| | | | | |
|---|---|---|---|---|
| 4,329,823 A * | 5/1982 | Simpson | ............... | E04C 3/08 403/161 |
| 4,361,993 A * | 12/1982 | Simpson | ............... | E04B 1/14 52/222 |
| 4,391,075 A * | 7/1983 | Musgrave | ......... | E04D 13/1637 52/404.1 |
| 4,446,664 A | 5/1984 | Harkins | | |
| 4,472,920 A * | 9/1984 | Simpson | ............... | E04B 1/14 52/222 |
| 4,512,130 A * | 4/1985 | Pepin | ............... | E04B 1/7666 411/466 |
| 4,528,790 A * | 7/1985 | Lo | ............... | E04D 13/1637 52/407.4 |
| 4,548,016 A * | 10/1985 | Dubich | ............... | E04D 15/04 404/107 |
| 4,573,298 A | 3/1986 | Harkins | | |
| 4,602,468 A * | 7/1986 | Simpson | ............... | E04C 3/08 52/222 |
| 4,653,241 A * | 3/1987 | Bindi | ............... | E02D 31/02 52/169.11 |
| 5,060,441 A * | 10/1991 | Pichette | ............... | E04B 1/7666 411/466 |
| 5,581,966 A * | 12/1996 | Fligg | ............... | E04B 9/22 160/392 |
| 5,653,081 A | 8/1997 | Wenrick et al. | | |
| 5,884,449 A * | 3/1999 | Alderman | ............... | E04D 15/06 242/557 |
| 5,901,518 A * | 5/1999 | Harkins | ............... | E04B 7/024 52/404.3 |
| 5,911,385 A * | 6/1999 | Neifer | ............... | E04D 15/06 105/150 |
| 5,921,057 A | 7/1999 | Alderman et al. | | |
| 5,953,875 A | 9/1999 | Harkins | | |
| 5,968,311 A | 10/1999 | Zupon, Jr. et al. | | |
| 6,216,416 B1 | 4/2001 | West et al. | | |
| 6,247,288 B1 | 6/2001 | Harkins | | |
| 6,360,496 B1 * | 3/2002 | Raccuglia | ............... | E02D 27/10 52/169.1 |
| 6,672,024 B2 * | 1/2004 | Alderman | ............... | E04D 15/06 52/404.1 |
| 6,705,059 B2 | 3/2004 | Romes | | |
| 6,769,223 B2 * | 8/2004 | Alderman | ............... | E04D 15/06 242/557 |
| 8,015,769 B2 * | 9/2011 | Crostic, Jr. | ............... | E04D 12/002 24/198 |
| 9,038,327 B1 * | 5/2015 | Harkins | ............... | E04D 5/145 52/165 |
| 2004/0206045 A1 * | 10/2004 | Foderberg | ............... | B28B 23/005 52/782.1 |
| 2008/0134600 A1 * | 6/2008 | Gilgan | ............... | F24F 13/0263 52/234 |
| 2011/0173913 A1 * | 7/2011 | Bodsford | ............... | E04H 5/10 52/407.4 |

* cited by examiner

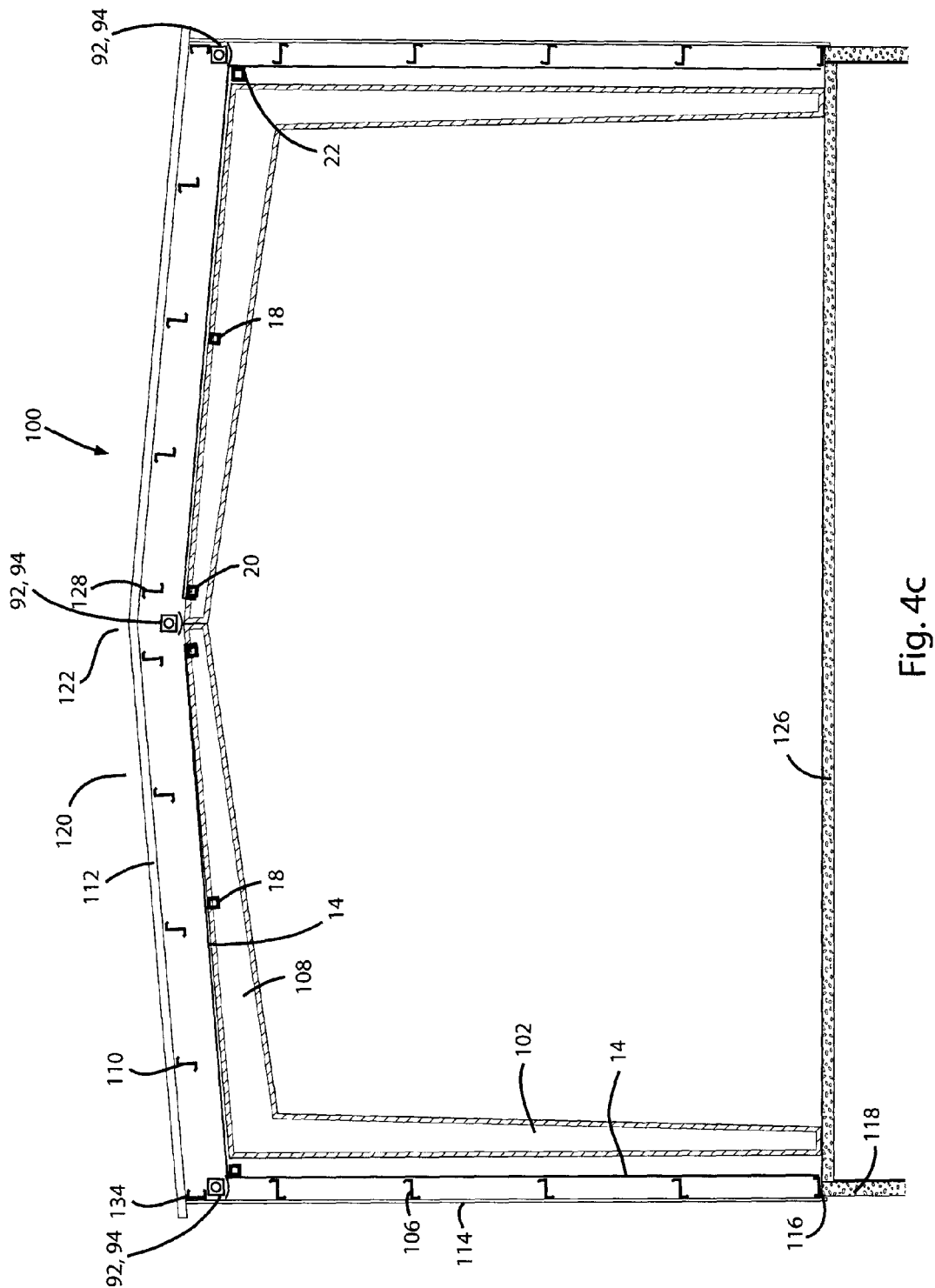

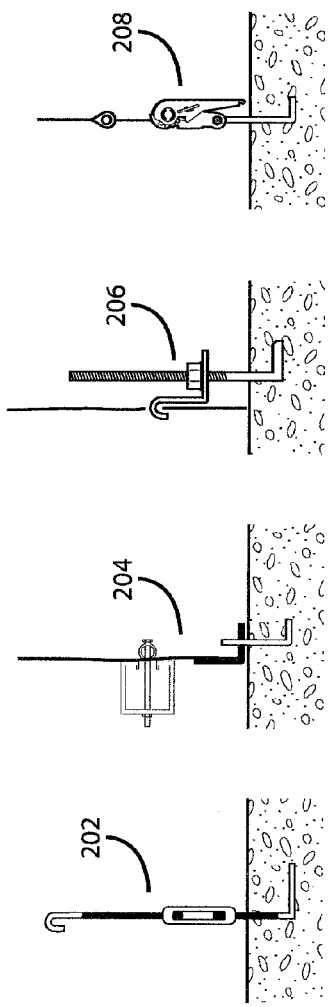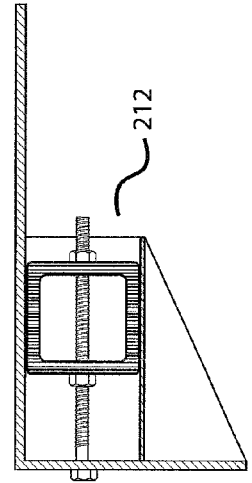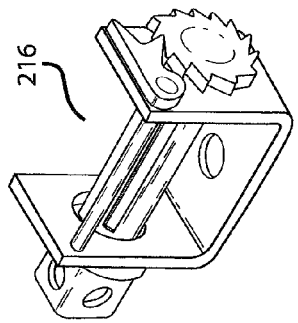

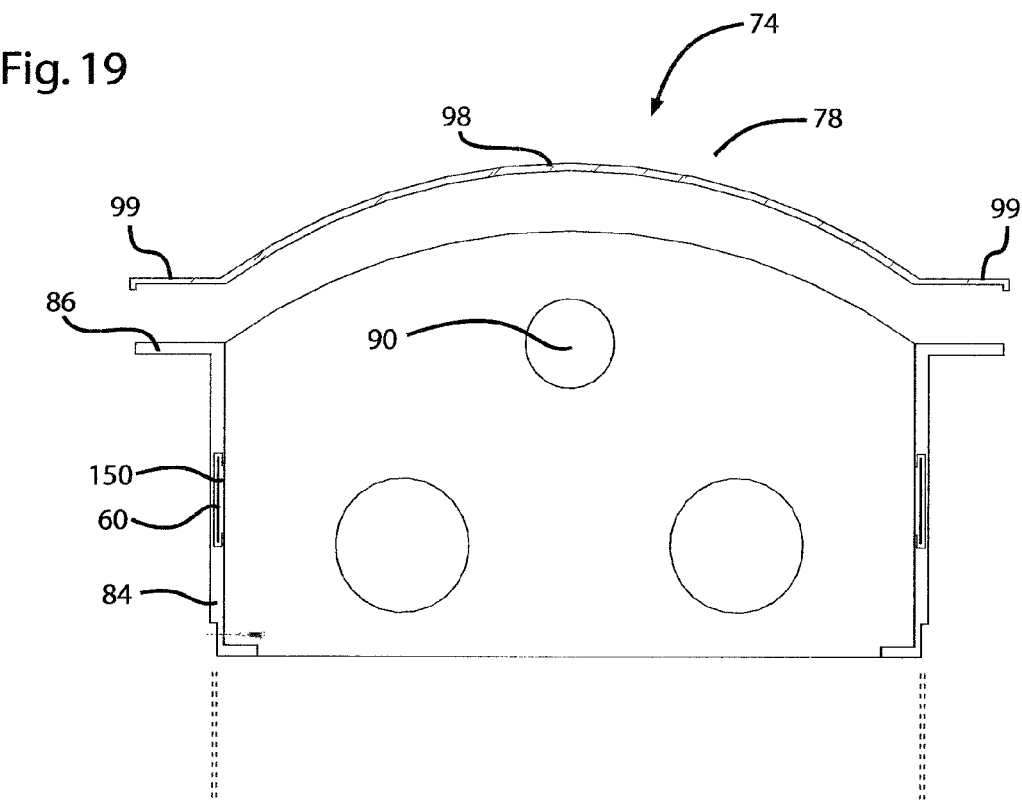
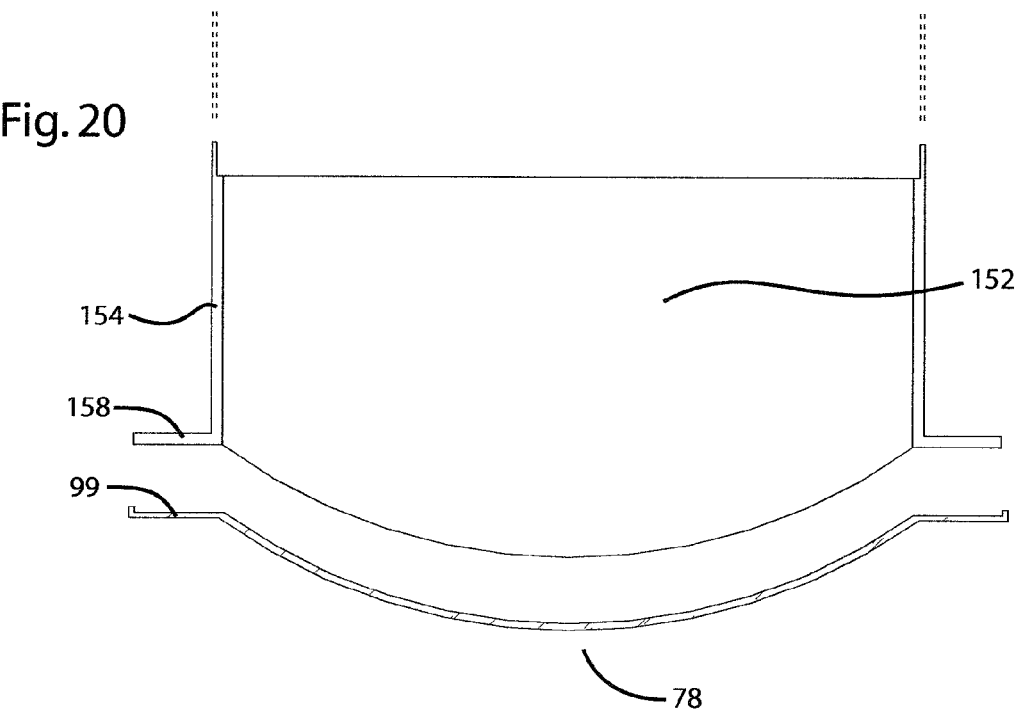

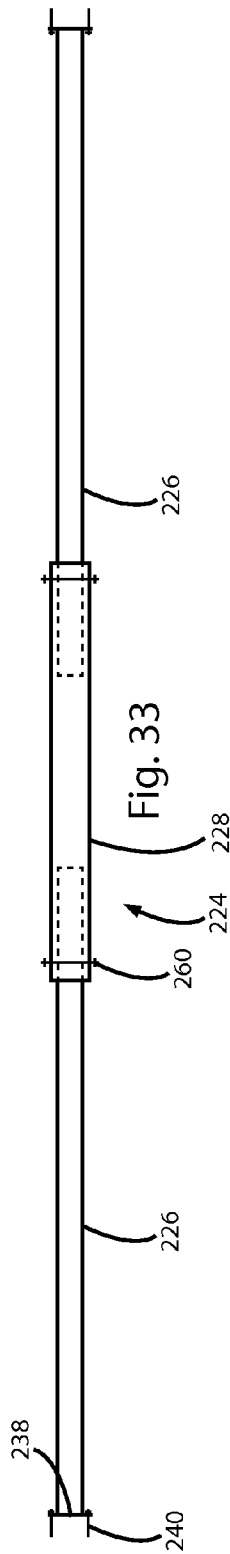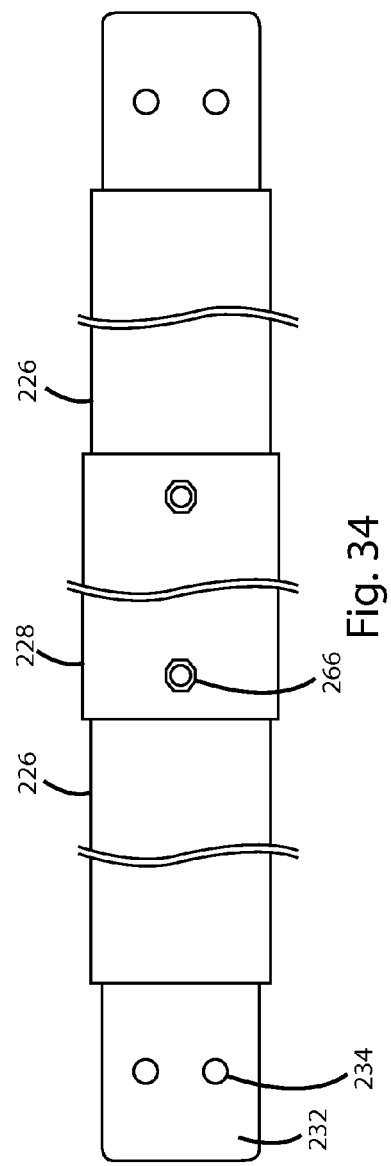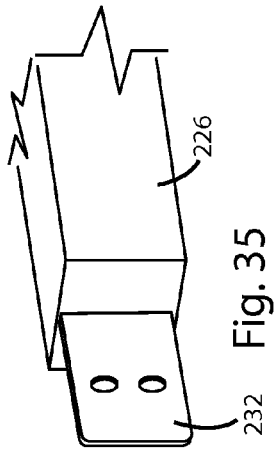

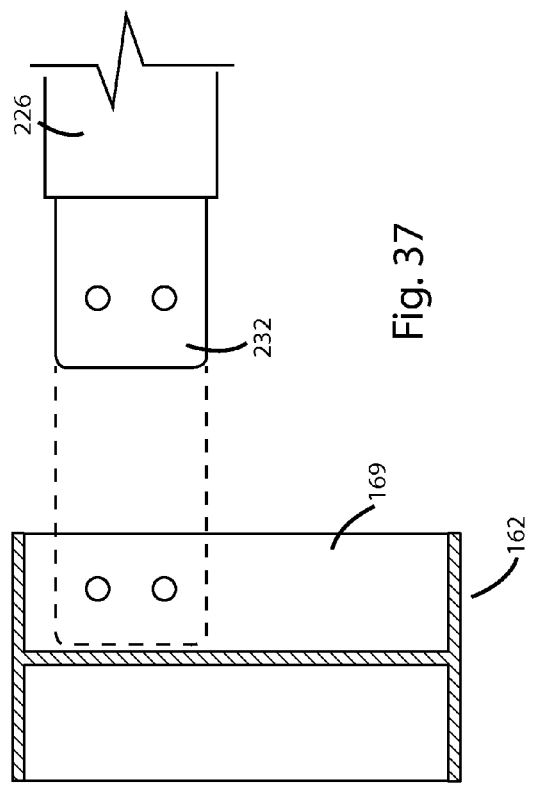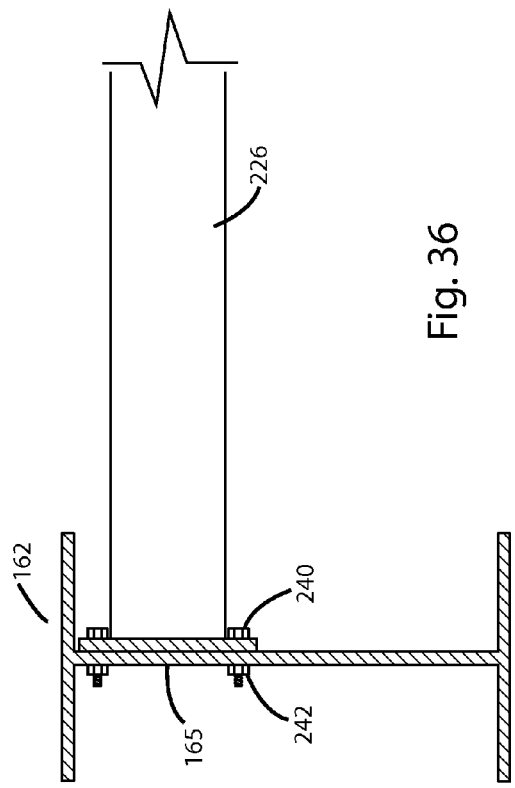

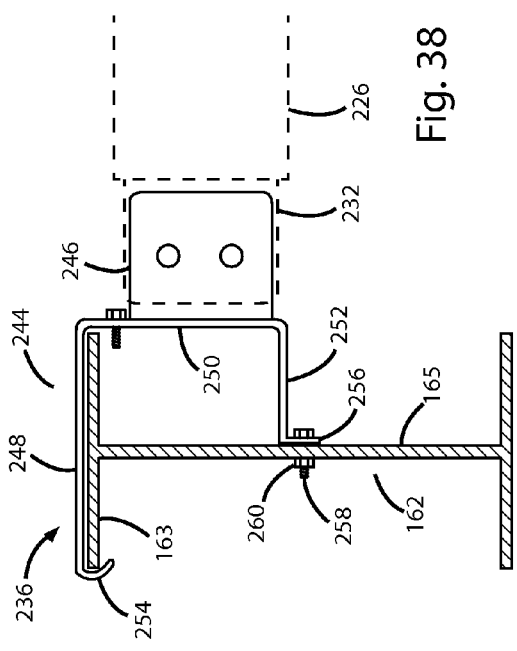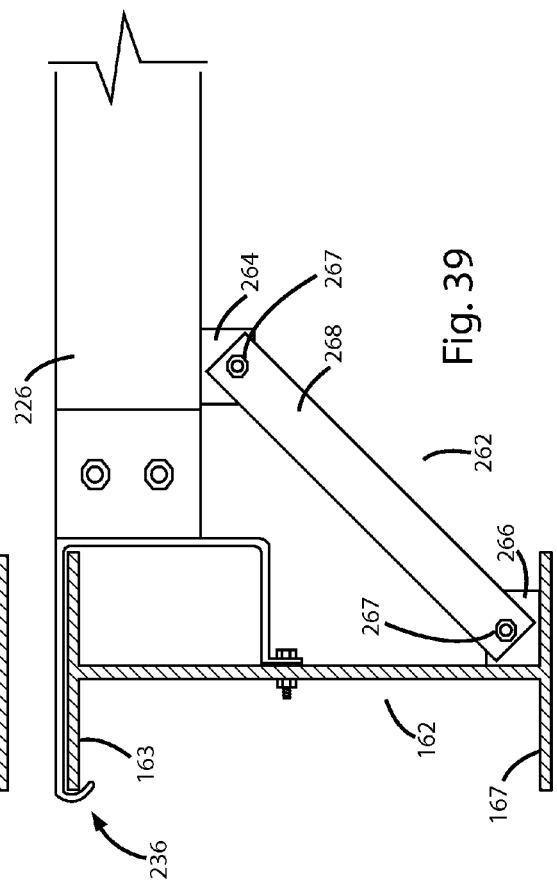

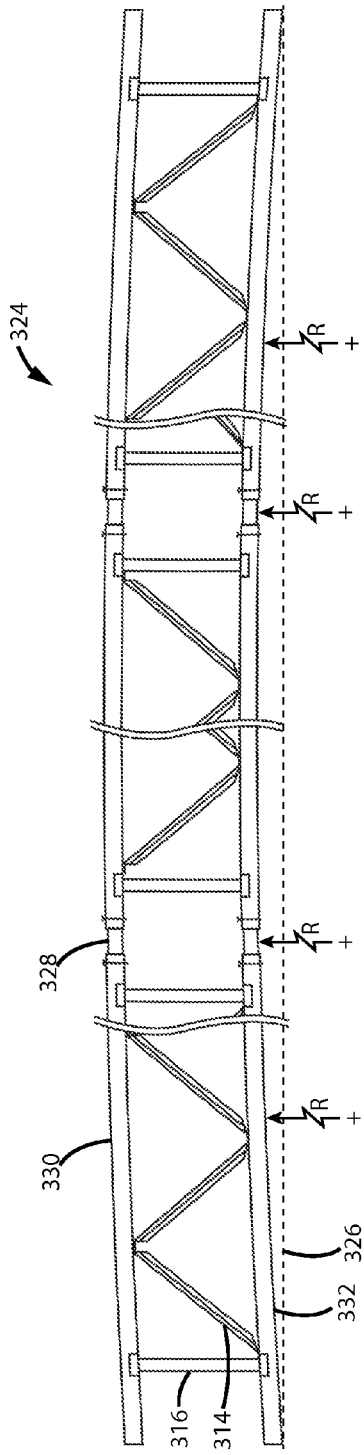
Fig. 46
Fig. 45
Fig. 44

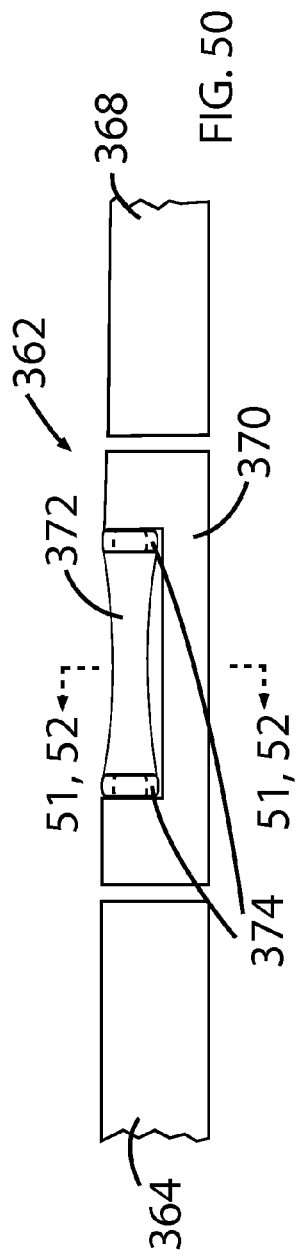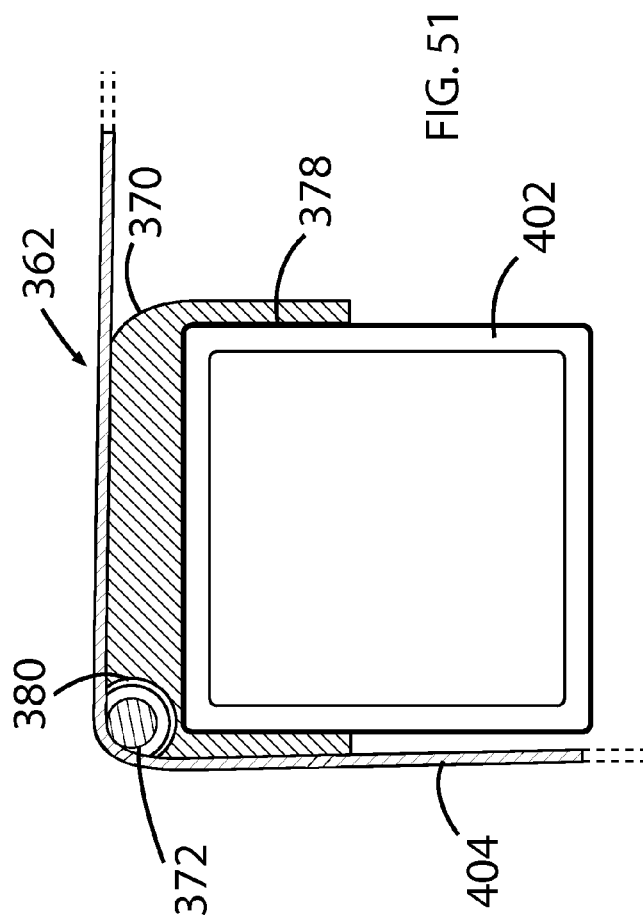

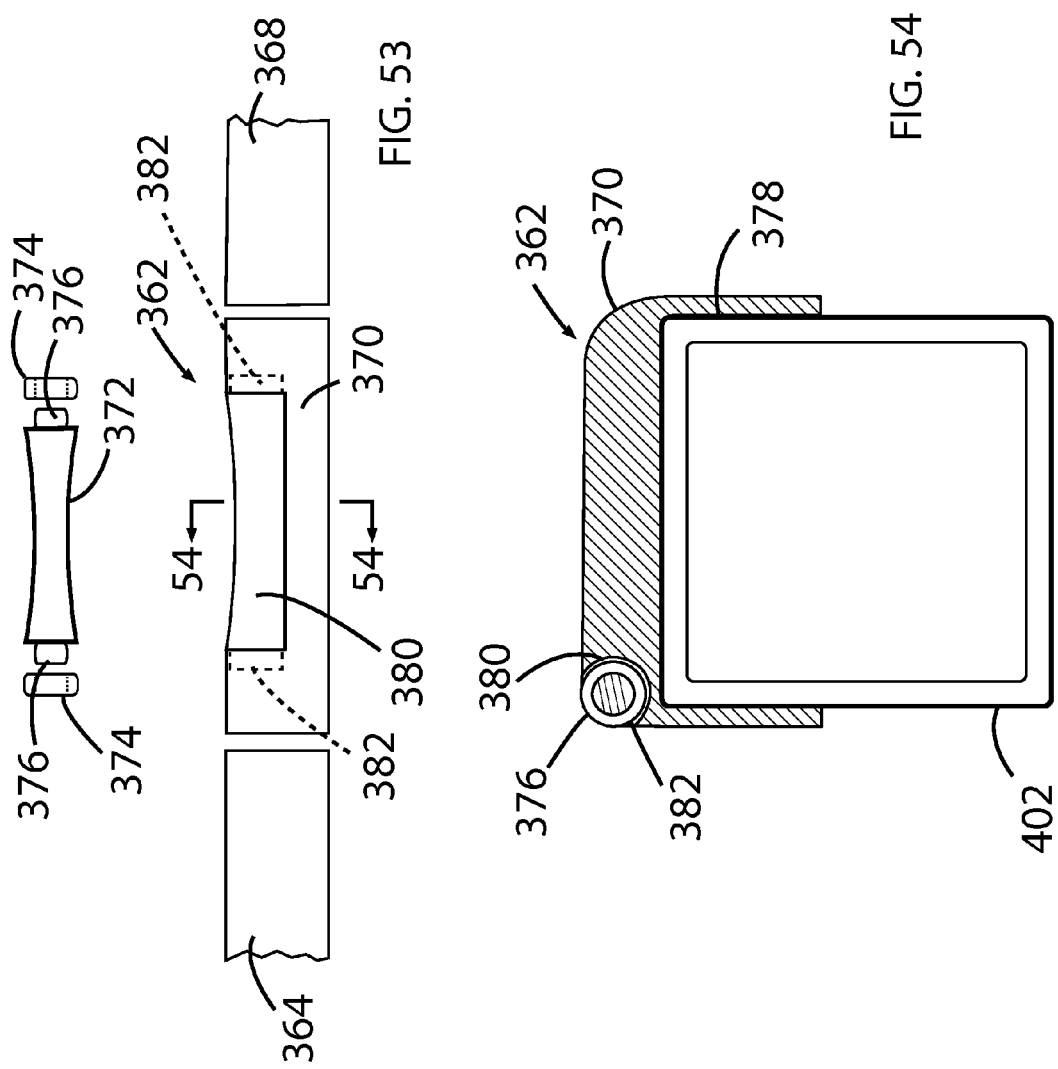

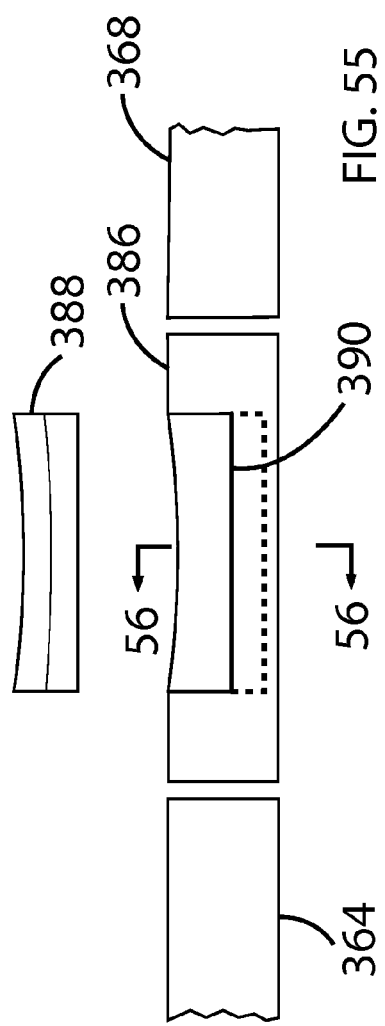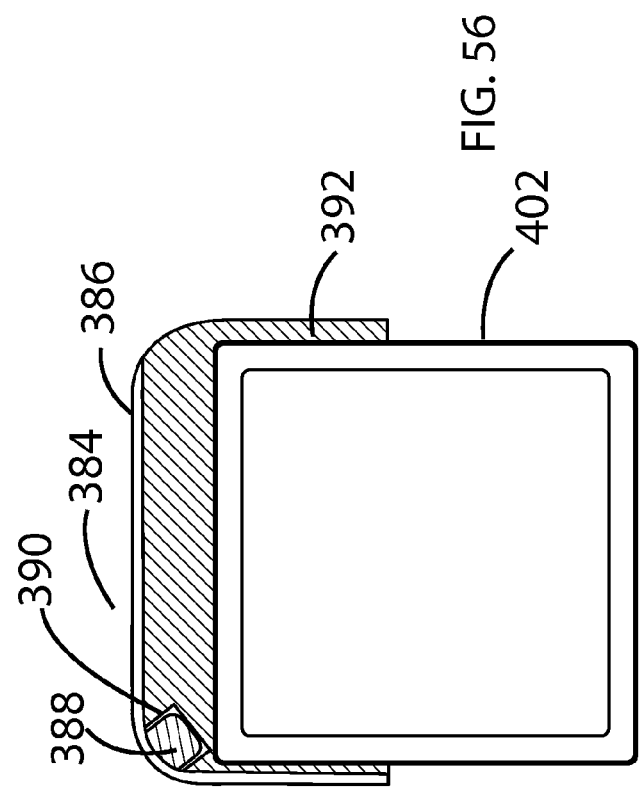

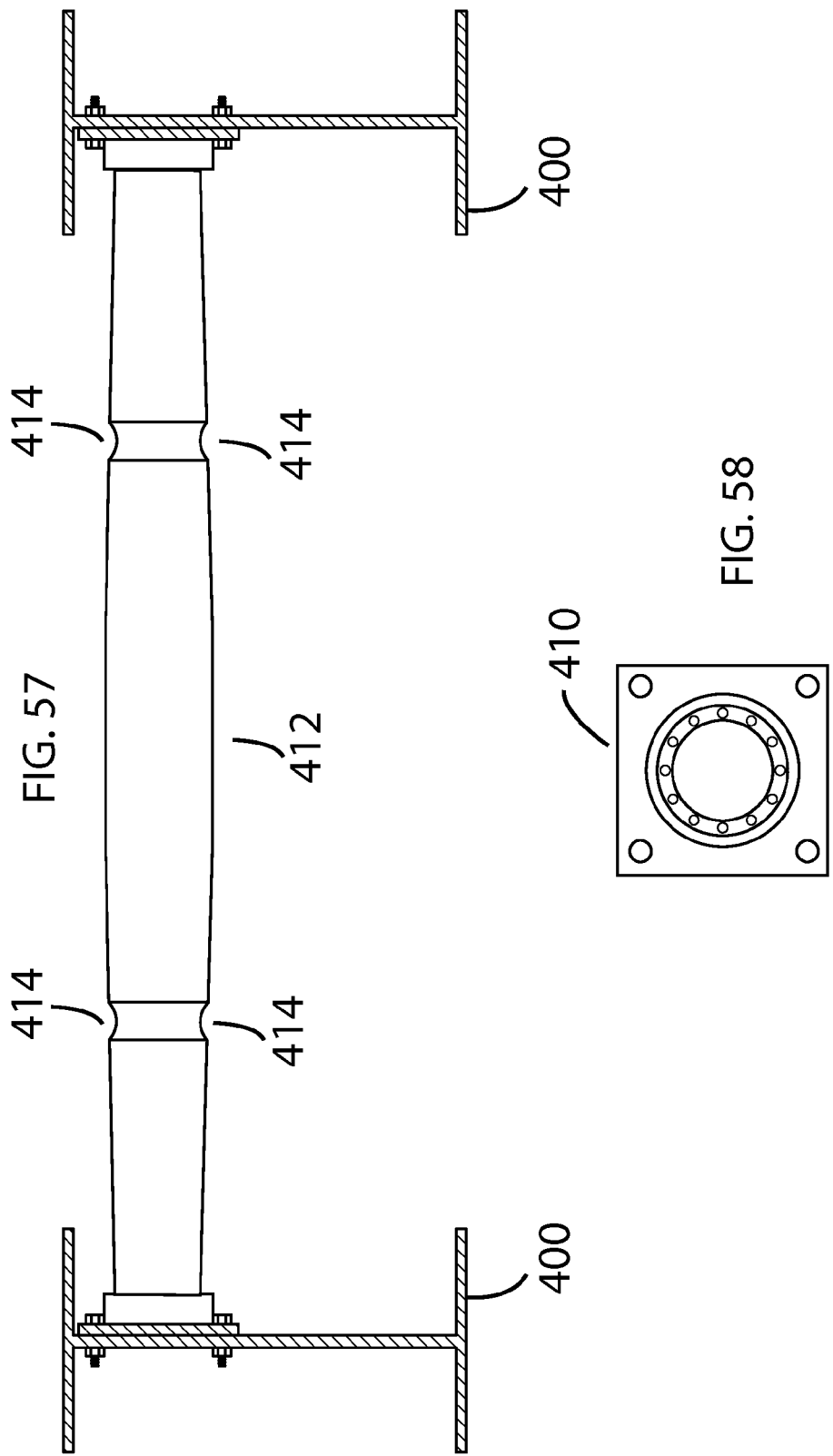

SYSTEM FOR INSTALLING CEILING SHEETS IN BUILDINGS

CROSS-REFERENCES TO RELATED APPLICATIONS

This is a continuation patent application taking priority from application Ser. No. 14/553,440, filed on Nov. 25, 2014, which takes priority from application Ser. No. 14/270,379, filed on May 6, 2014, now U.S. Pat. No. 8,991,110, which takes priority from application Ser. No. 13/616,709, filed on Sep. 14, 2012, now U.S. Pat. No. 8,844,230.

BACKGROUND OF THE INVENTION

Field of the Invention

The present invention relates generally to energy efficient buildings and more specifically to system for installing ceiling sheets in buildings, which enables a ceiling sheet to be installed in less time than that of the prior art.

Discussion of the Prior Art

A brochure MB304 published by the North American Insulation Manufacturers Association (NAIMA) continuously since 1991 describes the state of the art most typically used to insulate roofs and walls of pre-engineered metal buildings. This type of building currently represents over 40% of all non-residential buildings of two stories or less built in the US each year.

U.S. Pat. No. 4,446,664 to Harkins discloses a building insulation system. U.S. Pat. No. 4,573,298 to Harkins discloses a building insulation system. U.S. Pat. No. 5,953,875 of Harkins discloses a slide-in building insulation system. U.S. Pat. No. 6,247,298 to Harkins discloses a roof fabric dispensing device for insulation systems and air barriers over the exterior plane of the building structural members. U.S. Pat. No. 5,968,311 is a device for installing a vapor retarder over the purlins or joist to support insulation. U.S. Pat. No. 6,705,059 is a rolled fabric carriage device for unrolling a vapor retarding fabric over the tops of purlins which is used to support insulation. U.S. Pat. No. 6,216,416 is a system for installing insulation over purlins. U.S. Pat. No. 5,921,057 is an apparatus for dispensing an ceiling sheet material over the purlins. U.S. Pat. No. 5,653,081 is a method for paying out an ceiling sheet material for insulating a building roof over the purlins. U.S. Pat. No. 4,222,212 is an insulated roof over the purlins. There are temporary buildings, which have waterproof coverings over the tops of framing members to form a roof covering and which are commonly used for agricultural and storage purposes.

One common problem with the design of current buildings having integrated thermal insulation systems is the requirement for structural fastening of the insulation support apparatus through the plane of the insulation system. The "through-fastening" creates multiple thermal bridges, which reduces the building thermal performance up to fifty percent. The most predominant methods used to insulate pre-engineered metal buildings from as early as the 1950s, until today is simply draping the insulation over the exterior of the building structural members for support, applying the exterior building sheeting directly over the insulation and then applying the exterior sheeting attachment fasteners through the exterior sheeting, through the insulation from the exterior into the underlying building roof and wall structural members. This method results in thermal bridging fasteners with a frequency of about one fastener per every ten square feet of exterior surface area or less.

A second common problem is that insulation products in building roofs and walls are sandwiched between the roof or wall structural members and the overlying building exterior sheeting with compression of the insulation thickness and its inherent loss of thermal performance which results from this compression. Placing the roof and wall insulation tightly against the exterior roof and wall sheeting panels blocks the solar heat energy from being absorbed and radiated off the interior surface of the sheeting materials for any practical use. The solar energy that hits the building roof and wall surfaces is lost from any practical collection and use. At the same time, fossil fuel energy is purchased to provide heating, cooling and hot water heating for the building occupants and processes.

The third common problem of achieving energy efficient buildings is that the thermal insulation has traditionally been installed during the roof and wall sheeting process. Insulation methods which require the installation of fasteners from the interior during the integrated insulation and exterior sheeting process are shunned by installers of these materials in favor of methods that simply compress the insulation between the roof and wall structural members and the roof and wall sheeting panels with only externally applied fasteners. Such methods eliminate the need for fastening from the interior side of the roof and wall structure during the insulation and sheeting process and therefore are preferred by installers.

This practice severely limits the thermal performance of the buildings to much less than the desirable economic insulation levels. Due to the insulation thickness reductions and thermal bridging, building thermal performance is much less than what is required to honestly meet the minimum installed thermal performance criteria set forth by the various state energy codes. The most common building insulation methods not only compress the insulation thickness by variable percentages, but also thermally bridge the exterior conductive building sheeting surfaces to the interior exposed thermally conductive surfaces of the purlins, joists and girts. These structural configurations maximize the uncontrolled heat transfer between the two thermally bridged surfaces on the opposite sides of the thermal insulation layer and will frequently result in seasonal condensation on the interior exposed building structural members. The roof and wall structural members become very hot in the summer, when the heat is not wanted in the building interior conditioned space and are cold in the winter, when the heat is wanted in the building interior conditioned space. Buildings that are thermally bridged between through the thermal insulation with exterior exposed conductive sheeting materials and interior exposed conductive roof purlins or joist and exposed conductive wall girts result in the opposite seasonal heat transfer effect that is desired and major loss of heating energy.

The cold exterior surface temperatures in the winter typically float up and down crossing over the dew point temperature of the interior conditioned air and also of the dew point temperature of the air trapped within the insulation of the roof and wall assemblies of the building. Fiberglass insulation is mostly air. This condition results in condensation of the water vapor that increases conductivity and reduces the insulation thermal performance, which may result in permanent building structural damage and may also interfere with the building use. If the condensed liquid water accumulates within the building roof and wall assemblies it may also result in dripping and damage to interior building contents.

Prior art like that disclosed in the Harkins U.S. Pat. No. 4,446,664 invention uses a steel strap support system, which temporarily spans across building bays with steel straps fastened at their ends and often installed in a woven mesh. A flexible sheet material is custom fabricated to fit the designated building areas, referred to as building bays, with the absolute minimum of field seams except along the building bay perimeter beams, where there is no problem sealing the edges as the workmen work on the top side of the rafter beams. The flexible sheet material is spread out and clamped in position on the platform of spanned support strapping and then fasteners are required to be installed through the steel straps and sheet material from the building interior into the inside flange of building roof purlins or joist from the interior. This method requires approximately one interior applied fastener for every 30 square feet of the building roof or wall structures. Each fastener is a thermal bridge between the steel strapping and the metal structure to which it is attached.

The invention of the U.S. Pat. No. 4,446,664 creates a defined space for insulation to expand, which eliminates virtually all unwanted compression of the insulation in the roof structures. This method also completely isolates all-of-the highly conductive metal roof and wall purlins or joist surfaces from direct contact with the interior conditioned air. This system however requires the installation of the fasteners from the interior of the building during the integrated process of installing the insulation and the sheeting of the building's exterior roof surfaces. The Harkins '664 patent, while much more thermally efficient than typical methods, is often avoided in favor of much less thermally efficient insulation products and methods which do not require fasteners to be installed from the building interior during the integrated roof insulation and exterior roof sheeting process.

Another problem that occurs in metal panel sheeted buildings is seasonal condensation problems in the wall and roof systems. This phenomenon becomes particularly evident with metal-sheeted buildings because the metal panel temperatures change almost instantly with a change in exterior temperatures. Typically, water vapor within the building interior conditioned space concentrates along with a natural heat gradient at the highest elevations within the building heated space. The concentration of water vapor in air is often measured and expressed as relative humidity. The warmer the air mixture is, the more the weight of water, in vapor form, it can hold. Water vapor will condense on any surface of the building structure it contacts, which is below its dew point temperature. The dew point temperature is the temperature at which the relative humidity of the air contacting the cooler surface will reach 100% relative humidity and begin depositing the excess water vapor as liquid water on that cooler surface. A similar phenomenon occurs within an air mixture itself as it cools and this condensation manifests itself as fog, dew, rain and other forms of precipitation.

In buildings, water vapor will migrate through the vapor retarders, through poorly sealed joints, through staple holes, through gaps, etc. and will condense on the interior surface of the exterior sheeting panels when the exterior surface temperatures are below the dew point temperature of the air mixture within the insulation space of the roof and wall assemblies of the building. The typical preferred insulation methods fill the roof and wall assemblies to the exterior sheeting and any moisture is trapped inside of the wall and roof assemblies. The moisture may condense and may accumulate seasonally during cold temperatures. This trapped water vapor and resultant liquid water will cause premature deterioration of the building roof and wall building components and will shorten the useful life of the building if it can't escape naturally. Many older metal buildings leak air or breathe through the eave and wall flashings and the unsealed wall panel joints due to wind pressure differences. This breathing allowed much of the trapped water vapor to escape, but at the expense of thermal insulation performance. New energy code requirements for sealing all construction joints will essentially eliminate this typical water vapor escape mechanism resulting in a much greater potential for condensation and accumulation of liquid water within these building roof and wall assemblies of the future.

Buildings that have the compressed thermal insulation, buildings that attempt to fill the roof and wall cavities, buildings that have thousands of staple holes along uniformly spaced insulation facing seams, buildings that have substantially thermally bridged conductive interior and exterior surfaces, buildings that trap and accumulate condensed water vapor within the insulated roof and wall assemblies, and buildings which repel the free solar heat energy hitting its exterior surfaces require significantly greater heating and cooling equipment capacities, require excessive fuel piping, require excessive electrical wiring, require excessive service capacities and cost significantly more to heat, cool and ventilate than would be required, if the above mentioned problems were solved.

Accordingly, there is a clearly felt need in the art for a building insulation system, which provides the following useful advantages:

That creates a defined space of sufficient air volume and distance between the roof and wall thermal insulation layer and the conductive exterior sheeting materials to achieve the economic insulation thickness and air gap space to operably manage the intrinsic air mixture, the air flows within and the collection of solar heat from the adjacent heat absorbing, conducting and radiating surfaces of the exterior building sheeting and of their thermally bridged roof purlins and wall girt structural members.

That creates a continuous insulation layer without having structural thermal bridging, nor having fasteners inserted through the insulation layer to support itself. An insulation layer that is supported completely from the interior side without the need for any fasteners installed from the interior during the integrated ceiling thermal insulation and exterior sheeting process of a building.

That provides for the natural collection and concentration of heat energy within defined air gap spaces created within the roof and wall assemblies, which heat can be actively collected from the defined spaces by one of several methods and used to reduce energy consumption for the building, its occupants and related processes.

That provides for water vapor control within the defined roof and wall assembly spaces to concentrate the water vapor by natural means and to actively remove and collect the water from the roof and wall defined air gap spaces as required to minimize any damaging accumulation and allow the simple collection and use of the clean water for various useful purposes.

That maximizes the absorption, collection and transfer of solar heat energy hitting the exterior surfaces of the building and to actively use the clean solar energy to reduce the consumption of purchased energy for the building interior space conditioning and related use processes. The colors and the emissivities of the roof and wall exterior sheeting panel surfaces can be selected to maximize solar energy absorption, transfer and use of the free solar energy, as opposed to reflecting it back into the external environment with it's value completely wasted, as is currently the predominant practice and also part of a growing trend known as "cool roofs" and highly reflective, "low emissivity" surface coating.

That use an active heat collection duct and piping systems installed at optimal locations within the defined air gap layers created within the walls and roof assemblies as a source for concentrated heat to be used directly with air circulation and/or indirectly through the use of a heat exchanger system such as a water pumping and storage system with fan-coil heat transfer units, baseboard type heating radiators, or the use of electric powered, refrigerant type of compressor driven electric heat pumps that collect heat from the pre-heated, pre-concentrated air within the solar wall and solar roof air gap layers in lieu of exterior unheated ambient air as a source for the heat energy it collects and transfers. Efficiencies of over 50 Btu's per watt are expected from this new solar heat pump building invention.

That would facilitate the collection, concentration and storage of the clean solar heat energy in water stored in insulated reservoirs for off peak demand use for space heating and hot water production processes. Excess heat energy collected can be used to melt snow and ice off roofs, driveways, sidewalks, etc. to eliminate typical removal costs, saving equipment costs, time and additional energy. The relatively clean water from snow and ice melting can also be collected, and recycled for many useful purposes.

That interconnects the wall solar energy air gap collection system to the roof solar energy air gap layer collection system which will facilitate the transfer of concentrated heat from the wall air gap layer to the roof air gap layer on demand. This heat transfer allows the building roof to be kept free of snow and ice by using solar heat energy collected in the wall air gap layer to maintain the solar exposed roof absorptive surface area exposed to direct solar energy to absorb the maximum solar energy possible.

That will use free solar heat from the solar wall collection system to eliminate ice damming on cold roof edges by keeping them free of ice accumulation caused by chronic build-up of ice from very slow melt of snow and ice off the exterior roof sheeting due to thermal bridging from the interior conditioned space and through the compressed thermal insulation.

That uses a subterranean air tubing and air conditioning system to pre-condition incoming ventilation air in all seasons to save energy and to also to simultaneously remove water vapor from warm, humid, incoming air during the summer cooling season, thereby reducing both the latent and sensible cooling loads required to maintain the interior conditioned space temperature and humidity at desired levels.

That simplifies the installation process and eliminates the requirement for any fastening from the interior of the building during the integrated process of installing the ceiling sheet ceiling sheet material, the roof insulation and the exterior sheeting panels of the building roof.

That eliminates thermal bridging through the roof insulation to support the insulation layer.

That eliminates thermal bridging through the wall insulation layer for support of the insulation.

That reduces the need for energy for building environmental space conditioning to such a low level, that for practical investment payback reduces the building life cycle cost to a degree that renewable energy generation may be added to the building project so that it annually requires a net total of zero or less purchased energy for typical building conditioning and lighting loads, excluding other user loads, if any.

That accommodates an increased distance between rafters and is easier to install than that of the prior art.

That can eliminate a portion or all of the traditional heating and air conditioning equipment used in buildings, which offsets some or all of the costs of the building heat collection power generator.

SUMMARY OF THE INVENTION

The present invention provides building insulation systems, which include better insulating properties than that of the prior art and which removes humidity typically trapped in the walls, roof and insulation of the building. A solar heat pump building preferably includes a building, at least one air gap heat collection layer, a tension supported flexible sheet material layer, a material insulation layer retained by the sheet material, a plurality of air ducts, a plurality of air duct dampers, a plurality of heat collection pipes, and an active mechanical heat pump collection, concentration, transfer and distribution system. The building is preferably a metal building, but other types of buildings may also be adapted for use with the invention. The typical metal building includes a plurality of rafter columns, a plurality of end columns, a plurality of girts, a plurality of girt clips, a plurality of rafters, a plurality of purlins, a plurality of purlin clips, a plurality roof panels, a plurality of wall panels, and a plurality of bolts, nuts, fasteners, flashings and sealants.

The plurality of rafter columns and the plurality of end columns are attached to a foundation to form a perimeter of the metal building. The plurality of girts are retained by clips extending off the exterior surfaces of the rafter columns and by a plurality of girt clips extending off the exterior surfaces of the end wall columns with girts spanning between adjacent pairs of the plurality of rafter columns girt clips and between adjacent pairs of the plurality of end wall column girt clips. The plurality of rafters are attached to a top of the plurality of rafter columns. Rafters are attached to the top of the building corner rafter columns at the end walls and also are attached between building corner rafters columns to the tops of a plurality of the end wall columns. The plurality of roof purlins are retained by a plurality of purlin clips extending above the exterior surface of the plurality of rafters. The plurality of ceiling sheet material support struts are retained spanning between, or over, adjacent pairs of the plurality of rafters.

The solar heat pump building roof system includes the exterior roof sheeting panels, a purlin structural support system, an air gap heat collection layer, a material insulation layer, at least one insulation supporting sheet material, sheet material support struts and eave inside corner sheet material support struts. Each ridge sheet material support strut is attached spanning between adjacent pairs of rafters and supported by the building rafters. At least one sheet material support strut is attached below a ridge of the building roof and defines the inside sheet material ceiling line below the ridge. Each sheet material eave support strut is attached in an inside corner between two adjacent rafters/rafter columns and defines the inside corner of the ceiling and wall junction of the sheet material in the building. For ease of installation a sheet material may extend continuously from a ridge sheet material support strut around the outside of an eave support strut to a termination point at a floor of the building or alternatively to a termination point created between the floor and the inside corner support strut. The ceiling sheet material is attached at opposing termination points with adhesive, a tensioning device or any other suitable attachment devices and methods. At least one tensioning device is preferred for each sheet material to control and manage deflection of the sheet material within desirable limits.

Alternatively, the sheet material extends from the floor of one side of the building around the exterior of one inside corner eave support strut, over a ridge support strut, around the exterior of the opposite wall inside corner eave support strut and downward for attachment to the floor on an opposing side of the building. Alternatively the ceiling sheet material may be terminated at an intermediate ceiling, eave or wall support strut. Intermediate support struts may be attached spanning between or over two adjacent roof rafters, between to adjacent rafter columns or between two roof purlin clips or wall girt clips.

The ceiling material insulation layer is inserted between at least one ceiling sheet material and a bottom of the plurality of roof sheets and preferably a bottom of the roof purlins with a air gap layer created to the exterior side of the material insulation layer. A plurality of vent spacer blocks may be attached to the interior or exterior facing flanges of the purlins prior to installation of the exterior metal roof panels. The vent spacer blocks have vent holes to insure the heat and convection air naturally flows between the roof air gap layer spaces between adjacent purlins within the solar heat pump building roof. The plurality of thermally conductive metal roof panels are attached to the outer surface flanges of a plurality of the roof purlins. The building air gap heat collection layer is thereby created between an outer surface of the ceiling insulation layer and the inside surface of the roof metal sheeting panels. The purlin clips on the rafters may be extended to provide the desired distance for the ceiling insulation layer without compression of the designed insulation thickness. The typical metal building ridge cap may be used to complete the roof at the building ridge but with less efficiency than the optional multi-vent. An optional ridge mounted multi-vent extends through a ridge of the roof and extends any length of the roof desired by the designer. The ridge mounted multi-vent replaces the typical metal building ridge cap and is located between two ridge purlins or at the high side of the building if the building is a single slope building. The multi-vent provides heat collection, heat concentration, heat transfer, ventilation, dehumidification, day-lighting and building management functions.

The solar heat pump building wall system preferably includes an exterior metal wall panel, thermally conductive metal girts, an air gap heat collection layer, vent spacer blocks on interior girt flanges, a first exterior sheet material which is typically an extension of the ceiling sheet material, a material insulation layer, a second interior wall sheet material which covers the wall material insulation layer from the exposure to the building interior space, and a means of using the concentrated heat within the air gap layer(s). The solar heat pump building end wall systems contain the same general components as a side wall system. The solar heat pump buildings preferably include a plurality of inner girt vent spacers and may also include a plurality of outer girt vent spacers containing a plurality of air vent holes to ensure the natural concentration of heat energy at the top of the wall air gap layer and allow convection air flows between girt spaces within the wall heat collection air gap layer of a system. Solar collected heat rises naturally and concentrates at the highest points of the wall and roof air gap layer(s) that it can achieve. A plurality of outer girt vent spacers may be attached to the exterior facing flanges of the girts prior to installation of the exterior metal wall sheeting panels. The inner girt vent spacers are attached to the interior facing flanges of the girts prior to installation of the first (exterior) sheet material which defines the interior surface of the wall air gap layer.

A plurality of rigid formed insulation hangers are then attached to the interior facing surface of the first (exterior) wall sheet material. A material insulation layer is attached in substantial contact without the interior-most surface of the first (exterior) wall sheet material using the pre-installed insulation hangers. The material insulation is impaled on the rigid formed insulation hangers designed for this purpose which are completely supported by the exterior wall sheet material and not fastened to the building girts to eliminate thermal bridging to the material insulation layer. A top of each second (interior) wall sheet material is securely attached to the ceiling sheet material, such that it's outer surface is in substantial contact with an inner-most surface of the wall material insulation layer. A bottom of each interior wall sheet material is attached to floor with adhesives, tensioning device, or other suitable attachment means, such that it contacts the wall material insulation layer. The material insulation layer is thereby sandwiched between the first and second wall sheet material layers. The solar heat collecting wall air gap layer is thereby created between an inner surface of the exterior wall panel and the outer surface of the first (exterior) wall sheet material layer The solar heat pump building wall heat collection air gap layer is preferably connected to the roof heat collecting air gap layer at their intersection at the building eave area so that the concentrated wall heat may be naturally transferred to the roof air gap layer, preferably on demand, by using a damper system at this junction, and the wall heat energy therefore used to keep the building roof heat absorbing surfaces fully exposed to absorb solar energy by keeping the roof surfaces free of snow and ice with free solar heat.

The plurality of wall ducts include side wall ducts and end wall ducts. The plurality of side wall ducts preferably include two side wall eave line roof ducts, two side wall upper wall ducts, two side wall base ducts and two side wall subterranean air ducts. The plurality of end wall ducts preferably include two upper wall ducts and two end base wall ducts. Each duct includes a rectangular (preferably square) tube, which preferably includes a plurality of air flow holes formed through the sides thereof. A damper strip slot is formed in all four sides to receive a sliding damper strip. The damper strip also includes a plurality of air flow holes. The hole locations and hole sizes in the damper strip are engineered to equalize the collection (intake) and distribution (exhaust) of air flows evenly through the wall and roof air gap layers along the length of each duct to maximize the collection and concentration efficiency of heat energy rising through the walls and roof of the solar heat pump building. A damper strip actuation device is used to open and close the plurality of air flow holes of the various air flow paths on demand by sliding the damper strips in a damper slot of a duct. Duct end caps are used to enclose the air streams between the ends of duct sections as desired.

Each side wall eave roof duct is located at the top of the wall air gap layer to communicate with the roof air gap layer.

Each side wall upper wall duct is located immediately below a side wall eave roof duct and communicates with the wall air gap layer. The side wall eave roof ducts are capable of receiving outside air through its air flow holes or a branch duct which communicates the upper wall duct or with the outside air. The side wall eave roof ducts are also capable of receiving heat and air through its air flow holes or a branch duct which communicates with an upper side wall duct. The upper side wall ducts and upper end wall ducts collect heat energy and air from the respective wall heat collecting air gap layers through the air flow holes which communicate with the wall air gap layer below the respective upper wall ducts.

The side wall and end wall base ducts are at the base of the respective wall heat collecting air gap layers. A wall base duct is located adjacent the wall sheeting panels, above the floor, with air flow holes which communicate with the wall air gap layer. A side wall or end wall base duct is capable of receiving outside air through its air flow holes or a branch duct which communicate with the outside air. The side wall or end wall base duct is also capable of receiving interior space air through its air flow holes or a branch duct which communicate with the interior space air. The side wall and end wall base ducts are capable of supplying air to the bottom end of the wall heat collection air gap layer from either the outside air or the inside air or both, through its air flow holes which communicate with the wall air gap layer. The air flows are preferably controlled by an active damper in a damper slot or in the branch duct, as applicable.

Two subterranean air ducts are located adjacent to the interior foundation walls at two opposite building walls, at or below floor level and extend substantially the length of each respective opposing building wall. A wall subterranean air duct communicates with the interior space air through air flow holes or branch ducts. The opposite subterranean air duct communicates with the outside ambient air through a branch duct, containing a damper and an internal, air stream mounted fan powered by energy. A plurality of subterranean tubing is located below a floor of the building preferably at a depth of six to eight feet with each opposing tube end connected to the opposing subterranean duct located near the floor adjacent to the opposing foundation walls of the building. Warm outside air flowed through the plurality of subterranean ducts and subterranean tubing will be cooled by a cooler ground temperatures during the cooling season. Outside warm humid air flowed through a plurality of the cooler subterranean ducts and subterranean tubes will be naturally dehumidified by the cooler earth ground temperatures during the cooling season. Cooler air flowed through the plurality of subterranean ducts and subterranean tubes will be warmed by a warmer earth ground temperature during the heating season.

It is preferable that the plurality of subterranean ducts be oriented either parallel to the ends of the building or parallel to the sides of a building which are substantially opposite each other and the plurality of the subterranean tube ends connect between the to opposing wall subterranean ducts.

It is preferred that each subterranean tube be sloped to a low point and connected to a common drain pipe to collect seasonal condensation and pipe it to run by gravity to a common collection reservoir for recycling for other uses.

The ridge mounted multi-vent device includes a plurality of vent modules attached in series. The plurality of vent modules are connected to each other end-to-end with any suitable attachment device or method such as installing bolts or screws. Each vent module includes a box unit. The box unit includes a vent base, two end walls, two side walls and two box side flanges. The two end walls extend upward from opposing ends of the vent base and the two side walls extend upward from opposing sides of the vent base. A single flange extends outward from a top of each box side wall. At least one opening is formed through each end wall to allow the flow of air between adjacent modules. A hole may also be formed through each end wall to receive a heat collecting pipe apparatus. This pipe apparatus would include pipe, heat collecting fins, condensation collecting trough, joint connectors, support brackets and drain tubing.

The top and bottom covers include a cover portion and a pair of cover side flanges. The cover side flange extends from each side of the cover portion. A sealing material may be placed between the cover side flanges and the box side flanges. A sealing material may be placed between the cover ends and the box end panels. The cover is fabricated from a material, which is light collecting, light diffusing, light transmitting, light concentrating, light reflecting or opaque to light. The box unit may have side wall and end wall extensions with are adapted to make the overall height of the box unit fit the thickness of the building roof assembly to close any air leaks between the interior space air and the roof insulation and air gap layer.

Damper strip slots are formed in the box side wall panels to receive a sliding damper strip similar to that of the wall ducts. A plurality of air flow holes are formed through the box side wall panels within the slot. The damper strip includes a plurality air flow holes, which generally align with the plurality air flow holes in the box unit side walls. A continuous damper strip may be installed spanning between multiple multi-vent modules to be operated by a single damper actuator. The damper strip may be shifted in the damper slot with a damper strip actuation device to allow the air flow holes to be opened or closed to any degree by sliding a damper strip in the damper slot. The collected solar heat entering the multi-vent is naturally concentrated from the roof solar heat collection air gap layer of the roof on either side of the ridge or both. The solar heat collected in the wall air gap layer may be extracted at the top of the wall air gap layer or passed on upward into the roof solar heat collection air gap layer to be carried further upward and concentrated below the ridge cap or in the multi-vent for extraction for direct use as heated air, for extraction for indirect use by a heat absorption pipe of a heat pump for space heating, for heating process water, for the generation of power, for other useful purposes or may simply be exhausted to the atmosphere to cool the building roof. The optional multi-vent forms a heat and air collection duct when joined end-to-end which can be connected to an in-line branch duct containing a powered fan or to an air handler unit to efficiently move and concentrate the solar heated air of the solar heat pump building air gap layers for useful purposes, rather than simply wasted as is the current state of the art.

An insulation system for buildings having an extended length between rafters (extended insulation system). A tensioned panel extended insulation system preferably includes a support structure, a panel support structure and a pair of insulation panels. The support structure preferably includes two strut end supports, two lengthwise struts, a center strut support and a center hanger. The panel support structure includes two sheet side edge holders and a center edge holder. Each strut end support includes a C-shaped cross section. A vertical portion of each strut end support is preferably attached to a rafter web with fasteners. An inside perimeter of the two strut end supports are sized to receive the two lengthwise struts. One end of the two lengthwise struts is retained in the two strut end supports with fasteners. The other end of the two lengthwise struts is retained in opposing ends of the center strut support. An inner perimeter of the center strut support is sized to receive the two lengthwise struts.

Each insulation panel includes a pair of opposing rod ends and ceiling sheet material. Insulation is supported above the insulation panels. Each end of the sheet material is secured to one of the pair of opposing rod ends. Each side edge holder includes a side holder body, a tensioning bolt and a cylinder nut. A rod hook is formed on one end of the side holder body and a sheet retainer is formed on an opposing end of the side holder body. A bolt notch is formed through the rod hook to provide clearance for the tensioning bolt. The sheet retainer includes a rod cross bore and a sheet slit. The rod cross bore is sized to receive one of the rod ends and cross slit provides clearance for the ceiling sheet material.

The center hanger includes a support stud and a joist hanger. A lengthwise rod slot is formed in opposing sides of the center edge holder. A sheet clearance slit is formed through the lengthwise rod slot. The lengthwise rod slot retains the opposing rod end and the sheet clearance slit provides clearance for the sheet material. A hole is formed through the center edge holder and the center strut support for insertion of the support stud. The joist hanger is preferably fabricated from a strip of metal. The strip of metal is bent into a substantially rectangular shape. A stud hole is formed through each end of the strip of metal to receive the support stud. The strip of metal is bent to form the substantially rectangular shape, such that the support stud is inserted through the two stud holes and retained with two nuts on one end of the support stud. Another nut is threaded on to the other end of the support stud to support the center strut support.

A telescoping tube extended insulation system preferably includes a support structure and a ceiling sheet material. The support structure includes two strut tubes and a center strut tube. Each strut tube includes a support tube and an attachment plate. One end of the two strut tubes is retained in the center strut and the other end of the two strut tubes terminated with the attachment plate. The attachment plate may be parallel to an axis of the support tube or perpendicular to an axis of the support tube. The parallel attachment plate includes at least one bolt hole for fastening to a a rafter web stiffener or a rafter clip.

The rafter clip preferably includes a clip member and a clip attachment plate. The clip member includes a flange plate, a vertical plate and a web plate. One end of the flange plate is terminated with a hook portion and the vertical plate extends downward from the other end of the flange plate. The attachment plate extends from a front of the vertical plate. The web plate extends inward from a bottom of the vertical plate. A distal end of the web plate is terminated with a flange plate. The hook portion hooks around a top flange of a rafter. A bolt may be inserted through the flange plate and attached to a vertical web of the rafter. The parallel attachment plate is bolted to the attachment plate. A bracing strut may be used to further support an end of the strut tube. The bracing strut includes two rafter brace clips, two bolts and a rafter brace member. One of the two rafter brace clips is attached to a lower flange of a rafter and the other one of the two rafter brace clips is attached to a bottom of the strut tube. Each opposing end of the rafter brace member is attached to one of the two rafter brace clips. The ceiling sheet material is retained on a top of the support structure.

An arched telescoping tube extended insulation system includes an arched support structure and the ceiling sheet material. The arched support structure includes forming a large radius on the two strut tubes and the center strut tube, such that a middle of the arched support structure is higher than each end of the arched support structure to offset deflection of the arched support structure during use. It is preferable that the height differential is between 1.25-1.50 inches over a length of 25 feet.

A cable arched telescoping tube cable extended insulation system includes the arched support structure, an adjustable spacer, a cable and the ceiling sheet material. The adjustable spacer is attached to a bottom of the arched center strut tube. The adjustable spacer preferably includes a top portion, a center portion and a bottom portion. Rotation of the center portion decreases or increases a length of the adjustable spacer to offset deflection during use. One end of the cable is attached to one parallel attachment plate and the other end of the cable is attached to the other parallel attachment plate. A groove is preferably formed in a bottom of the bottom portion to receive the cable.

A bar joist extended insulation system preferably includes a support structure, an insulation support structure and a ceiling sheet material. The support structure includes a base member, a top yoke and a bottom yoke. The bottom yoke extends outward from a bottom of the base member and the top yoke extends outward from a top of the base member. The base member is attached to a web of a rafter. The insulation support structure includes at least two bar joist members and at least two telescoping tubes. Each bar joist member includes a bottom chord, a plurality of webs and a top chord. An end of the top and bottom chords are sized to be received by the top and bottom yokes, respectively. One end of the plurality of webs is attached to a top of the bottom chord and the other end of the plurality of webs is attached to a bottom of the top chord. The top and bottom chords are tubular. An inner perimeter of the top and bottom chords is sized to receive an outer perimeter of the telescoping tubes. The insulation support sheet is retained on a top of the top chord.

An arched bar joist extended insulation system includes the support structure, an arched insulation support structure and the ceiling sheet material. The arched insulation support structure includes at least two arched bar joists and at least two arched telescoping tubes. The arched bar joists include an arched bottom chord, a plurality of webs and an arched top chord. The arched insulation support structure is created by forming a large radius on the bottom chord, the top chord and the at two telescoping tubes, such that a middle of the arched insulation support structure is higher than each end of the arched insulation support structure. It is preferable that the height differential is between 1.25-1.50 inches over a length of 25 feet.

A building heat collection power generator preferably includes a heat exchanger, a pressure driven turbine, an electrical generator, a condenser and two fluid pumps. Finned tubing is installed along a length of a heat collection area, at upper wall air gaps and along the highest practical point of a roof air gap, where heat naturally collects. A heat transfer fluid is pumped through finned tubing. A leak-proof drip gutter is installed below the finned tubing to collect condensation, which may form and drip from the fins of the finned tubing.

Finned tubing is installed the length of the heat collection area as shown along the upper wall air gaps and/or along the highest practical point of the roof air gap where the heat naturally collects and concentrates in a gradient due to gravity. Solar heated air inside of the wall air gap behind the conductive wall panels and or in the roof air gap under the roof conductive panels comes in contact with the cooled finned tubing depicted below. The finned tubing must be installed above a leak-proof drip gutter to collect condensation, which may form and drip from the fins of the tubing. The heat transfer fluid is pumped through the finned tubing from a first fluid pump. The heat transfer fluid collects heat from the wall air gap and the roof air gap of the building. The heated heat transfer fluid travels to the heat exchanger, which transfers the heat energy from the heat transfer fluid to a second heat transfer fluid circulating in the heat exchanger through interlaced plates or tubing. The second heat transfer fluid is circulated with a second fluid pump.

The heat transfer fluid is preferably a low freezing point liquid such as water with an antifreeze chemical added to it to prevent freezing in very cold weather conditions. The second fluid is preferably a low boiling point organic compound such as refrigerants used in some heating and cooling equipment. The secondary heat transfer fluid is heated above its boiling point and creates a superheated fluid, which exerts an increasing pressure as the temperature is increased. A pressure of up to 350 lbs/square inch may be achieved with the super heated transfer fluid in a high pressure side of the heat exchanger. The heat exchanger preferably includes a first U-shaped tube, a second U-shaped tube, a plurality of first plates and a plurality of second plates, all retained inside an enclosed container. The first U-shaped tube is retained in holes in the plurality of first plates. The second U-shaped tube is retained in holes in the plurality of second plates. The plurality of first plates are alternated between the plurality of second plates. The first heat transfer fluid enters one end of the first tube and exits the other end of the first tube. The second heat transfer fluid enters on end of the second tuber and exists the other end of the second tube.

An inside volume of the enclosed container is chosen to provide a common surface area optimized for the first and second isolated heat transfer fluids to exchange heat energy from the warmer first heat transfer fluid to the cooler second heat transfer fluid. The first heat transfer fluid will be lower pressure and the second heat transfer fluid will be higher pressure. The second heat transfer fluid is an organic compound with a low temperature boiling point, which builds up pressure as it is heated above its boiling point. The pressure is used to turn the turbine. The pressure driven turbine preferably includes a turbine housing, a turbine drive shaft, a plurality of flywheel discs, an inlet and an outlet. The plurality of flywheel discs are retained on the turbine drive shaft. The turbine drive shaft is rotatably retained on each end of the turbine housing with bearings of various types. The turbine drive shaft may also extend out one end of the turbine housing. A shaft seal seals the turbine drive shaft to the turbine housing to withstand variable pressures during use. Other configurations, not shown, may use enclosed shafts which do not require the shaft seals which may be preferred for high rotational speeds.

An inlet tangently sprays the superheated second heat transfer fluid against an outer perimeter of the plurality of flywheel discs as it instantly vaporizes into a rapidly expanding gas. Molecular attraction forces between the heat transfer fluid, the flywheel disks and the individual molecules of the heat transfer fluid cause the turbine drive shaft to rotate rapidly as the heat transfer fluid passes by the disks on its pathway out of the turbine. This rotation completes the transfer of heat energy to mechanical energy. The outlet allows the second heat transfer fluid to escape as a lower pressure gas through the turbine housing. The second heat transfer fluid flows through the outlet into a condenser, which cools the second heat transfer fluid slightly and changes the second heat transfer fluid back to a low pressure liquid. The second heat transfer liquid fluid is pumped back into the heat exchanger with the second fluid pump. The first heat transfer fluid is pumped through the finned heat collection tubing with the first fluid pump. At least one check valve is installed in the fluid pump piping circuits to prevent backflow of the respective heat transfer fluids.

By-products of the hot superheated first transfer fluid are heat for space heating by the addition of a fan coil air handler in a branch circuit. The by-product of the second super heated transfer fluid is space cooling or refrigeration by the addition of an expansion valve and a fan coil hair handler in a branch circuit. Branch circuits are used to enable the on-demand use of the by-products of the building heat collection power generator. The turbine drive shaft is connected or coupled through a transmission to a generator drive shaft of the electrical generator.

The turbine drive shaft rotates the generator drive shaft. The rotation of the generator drive shaft generates electrical power, which is collected and converted into the correct voltage for use within the building. With proper controls, the electrical power generated can be transferred to the electrical utility grid to be used elsewhere and withdrawn at a later time and used when needed. The most electrical power is generated in the long, hot days of the summer when the power demands are at the greatest on the power grid. So the implementation of the power generated from the building heat collection power generator is very beneficial in offsetting the peak loads experienced by the grid demand, which are the long, hot days of the summer months. The building heat collection power generator can eliminate a portion or all of the traditional heating and air conditioning equipment used in buildings, which offsets some or all of the costs of the solar heat pump building power generator.

A system for installing ceiling sheets in buildings (installation system) preferably includes two roller supports, a middle section, a first end section and a second end section. Each roller support includes a roller support base, a roller and a pair of bearings. A C-shaped channel is formed in a bottom of the two roller supports, the middle section, the first end section and the second end section to receive an outer perimeter of a strut. Preferably, a bottom of the C-shaped channel in the first and second end sections are tapered, such that a distance from a bottom of the C-shaped channel to a top of the end section is greater at an inside end than at an outside end. Preferably, a bottom of the C-shaped channel in the roller support base is tapered, such that a distance from a bottom of the C-shaped channel to a top of the roller support base is greater at an inside end than at an outside end. Preferably, a bottom of the C-shaped channel in the middle section is tapered, such that a distance from a bottom of the C-shaped channel to a top of the middle section in a middle is greater than at each end thereof.

A roller pocket is formed in a top and side of the roller support base to provide clearance for the roller. A pair of bearing snap pockets are formed in opposing ends of the roller pocket to receive the pair of bearings. The roller is preferably a bow tie roller. An axle extends from each end of the roller. The two axles are sized to be received by an inner diameter of the pair of bearings. The two axles are inserted into the pair of bearings. The roller-bearing assembly is snapped into the pair of snap bearing pockets. The pair of roller supports, the first and second end sections and the middle section are placed on top of a strut, where the ceiling sheet will make a substantially perpendicular turn. The roller may be replaced with a sheave.

A conventional stationary strut may be replaced with a rotary strut for installing ceiling sheets. The rotary strut preferably includes a pair of bearing brackets and a roller support. The roller support preferably includes a substantially parabolic shape and a pair of cable groves formed in a perimeter of the roller support. Each end of the roller support is inserted into one of the pair of bearing brackets. The bearing brackets are attached between adjacent rafters. The rotary strut provides structural rigidity to the adjacent rafters and the roller support rotates relative to the adjacent rafters. The rotary strut is installed adjacent a wall of a building.

Accordingly, it is an object of the present invention to provide a building insulation system, which creates an air gap layer between the roof and wall thermal insulation layer and the conductive exterior sheeting and framing materials to operably manage the intrinsic air mixtures, the heat and air flows and the collection of concentrated solar heat from the adjacent heat absorbing surfaces of the exterior building sheeting panels and thermally bridged conductive roof purlins and wall girts.

It is a further object of the present invention to provide a building insulation system, which creates a continuous insulation layer without having structural thermal bridged fasteners inserted through the insulation layer to retain the insulation system layer.

It is another object of the present invention to provide a building insulation system, which has an insulation layer without fasteners being installed from the interior side through a sheet material to roof purlins or wall girt framing.

It is yet a further object of the present invention to provide a building insulation system, which does not require the installation of bottom side fasteners during the process of installation of the insulation and roofing of a building.

It is yet a further object of the invention to provide a method of installation of a ceiling sheet by tensioning a sheet material over underlying support struts to safely support it's designed loads below the purlin or joist structures of a building without the need for fasteners to be installed from the interior side during the process of installing the material insulation layer and roof sheeting materials to complete a building roof system.

It is yet a further object of the invention to provide a building insulation system with a tensioned ceiling sheet that will provide fall protection safety for workmen installing building construction materials above the upper surface of an installed tensioned ceiling sheet.

It is yet a further object of the invention to provide a building insulation system with a tensioned ceiling sheet material system structure, which will support a 400 pound weight object, nominally 30 inches plus or minus two inches in diameter, dropped from height not less than 42 inches above the plane of the tensioned ceiling sheet material without the weight falling more than six feet below the initial plane of the installed sheet material.

It is yet a further object of this invention to provide a building insulation system with an installer safe fall prevention feature employing a tensioned ceiling sheet material building structure that will support in tension, between opposing attachment points, a minimum of 1000 pounds of static weight superimposed on a upper side of the ceiling sheet material.

It is yet a further object of the present invention to provide a building insulation system to create a solar heat pump building structure which provides for the natural concentration of heat energy within the defined air gap spaces created within the roof or wall assemblies, where heat can be actively managed and collected from the defined spaces by any of several methods and used to reduce energy consumption for the building, its occupants or for other processes.

It is yet a further object of the present invention to provide a building insulation system to create a solar heat pump building structure for water vapor collection and control within the roof and wall defined air gap layer to concentrate the water vapor by natural means and actively condense and collect the liquid water from the roof and wall defined air gap layer spaces of the building.

It is yet a further object of the present invention to provide a building insulation system to create a solar heat pump building structure, which maximizes the absorption, collection and transfer of solar heat energy hitting the exterior surfaces of the building for the active use of the solar energy to reduce the consumption of purchased energy for the building interior space conditioning and processes.

It is yet a further object of the present invention to provide a building insulation system to create a solar heat pump building structure, which uses an active heat collection piping system installed at desirable locations within the defined air gap spaces created within a wall or roof assembly as a source for naturally concentrated heat energy to be used directly with active air circulation and/or through the use of an active indirect heat exchanger system.

It is yet a further object of the present invention to provide a building insulation system to create a solar heat pump building, which would facilitate the collection, concentration and storage of the solar heat energy in water stored in reservoirs for off peak demand use for space heating and for hot water processes.

It is yet a further object of the present invention to provide a building insulation system to create a solar heat pump building, which uses a subterranean air tubing as an air conditioning system to pre-condition incoming ventilation air in any season to save energy and to also to simultaneously remove water vapor from incoming humid air.

It is yet a further object of the present invention to provide a building insulation system to create a solar heat pump building, which reduces the need for energy for the building environmental space conditioning to such a low level, that for very practical investment, renewable energy generation may be added to the building so that it annually requires zero or less net purchased energy for typical space conditioning and lighting needs It is yet a further object of the present invention to provide an insulation system for buildings with long bays, which accommodates an increased distance between rafters and is easier to install than that of the prior art.

It is yet a further object of the present invention to provide a building heat collection power generator, which can eliminate a portion or all of the traditional heating and air conditioning equipment used in buildings, which offsets some or all of the costs of the building solar heat collection power generator.

Finally, it is another object of the present invention to provide an installation system for installing ceiling sheets in buildings, which enables a ceiling sheet to be installed in less time than that of the prior art.

These and additional objects, structures, advantages, features and benefits of the present invention will become apparent from the following specification.

BRIEF DESCRIPTION OF THE DRAWINGS

FIG. 4a is an enlarged cross sectional end view of a ridge ceiling support strut for retaining a ceiling sheet material in a metal building with a termination of the sheet material at one of two adjacent ridge ceiling sheet material support struts in accordance with the present invention.

FIG. 4b is an enlarged cross sectional end view of an eave inside corner support strut for retaining a ceiling sheet material in a metal building in accordance with the present invention.

FIG. 4c is a cross sectional end view of a metal building with finned tubing installed at the top of a wall and the highest area of the roof in accordance with the present invention.

FIG. 10a is a turnbuckle tensioning device for tensioning a wall or ceiling sheet material.

FIG. 10b is a right angle take-up tensioning device for tensioning a wall or ceiling sheet material.

FIG. 10c is a hook and treaded rod tensioning device for tensioning a wall or ceiling sheet material.

FIG. 10d is a ratchet strap tensioning device for tensioning a wall or ceiling sheet material.

FIG. 10e is a turning shaft tensioning device for tensioning a wall or ceiling sheet material.

FIG. 10f is a single adjustable strut tensioning device for tensioning a wall or ceiling sheet material.

FIG. 10g is a bidirectional adjustable strut tensioning device for tensioning a wall or ceiling sheet material.

FIG. 10h is a strap winch tensioning device for tensioning a wall or ceiling sheet material.

FIG. 19 is an end view of a box unit of a ridge mounted multi-vent with a damper slot formed in the opposing sides thereof to retain two operable damper strips in accordance with the present invention.

FIG. 20 is an end view of a box end panel extension of a ridge mounted multi-vent in accordance with the present invention.

FIG. 33 is a front view of a telescoping tube extended insulation system with a perpendicular attachment plate in accordance with the present invention.

FIG. 34 is a front view of a telescoping tube extended insulation system with a parallel attachment plate in accordance with the present invention.

FIG. 35 is a perspective view of a parallel attachment plate extending from a strut tube of a telescoping tube extended insulation system in accordance with the present invention.

FIG. 36 is a side view of a perpendicular attachment plate secured to a rafter of a telescoping tube extended insulation system in accordance with the present invention.

FIG. 37 is a side view of a parallel attachment plate of a telescoping tube extended insulation system, before attachment to a rafter web stiffener in accordance with the present invention.

FIG. 38 is a side view of a parallel attachment plate of a telescoping tube extended insulation system attached to a rafter clip in accordance with the present invention.

FIG. 39 is a side view of a parallel attachment plate of a telescoping tube extended insulation system attached to a strut clip and a bracing strut supporting an end of the telescoping tube extended insulation system in accordance with the present invention.

FIG. 44 is an end view of an insulation support structure of a bar joist extended insulation system with a U-shaped telescoping tube in accordance with the present invention.

FIG. 45 is an end view of an insulation support structure of a bar joist extended insulation system with a round telescoping tube in accordance with the present invention.

FIG. 46 is a side view of an insulation support structure of an arched bar joist extended insulation system in accordance with the present invention.

FIG. 50 is a front enlarged view of a roller support of an installation system in accordance with the present invention.

FIG. 51 is a cross sectional view cut through FIG. 50 of a cable supported by a roller support of an installation system, which is pulling a ceiling sheet in accordance with the present invention.

FIG. 53 is a front exploded view of a roller, a pair of bearings and roller support base of an installation system in accordance with the present invention.

FIG. 54 is a cross sectional view cut through FIG. 53 of a bearing being retained in a snap bearing pocket of an installation system in accordance with the present invention.

FIG. 55 is a front exploded view of a sheave and a roller support base of an installation system in accordance with the present invention.

FIG. 56 is a cross sectional view cut through FIG. 55 of sheave retained in a roll support base of an installation system in accordance with the present invention.

FIG. 57 is a front view of a rotary strut installed between two adjacent rafters of an installation system in accordance with the present invention.

FIG. 58 is an end view of a bearing bracket of a rotary strut of an installation system in accordance with the present invention.

DETAILED DESCRIPTION OF THE PREFERRED EMBODIMENTS

Figure 1:
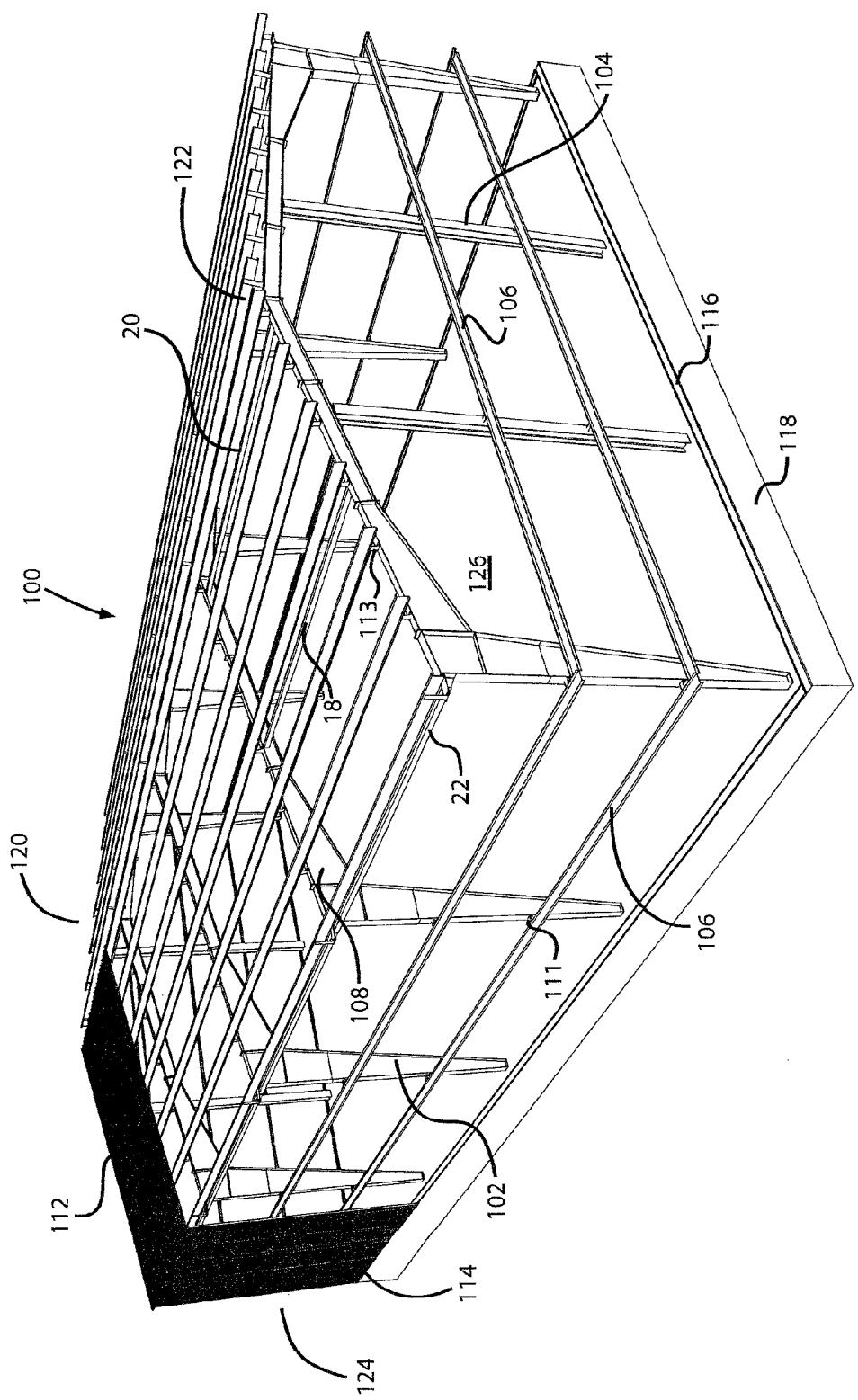
FIG. 1 is a perspective cutaway view of a typical metal building.
Figure 1A:
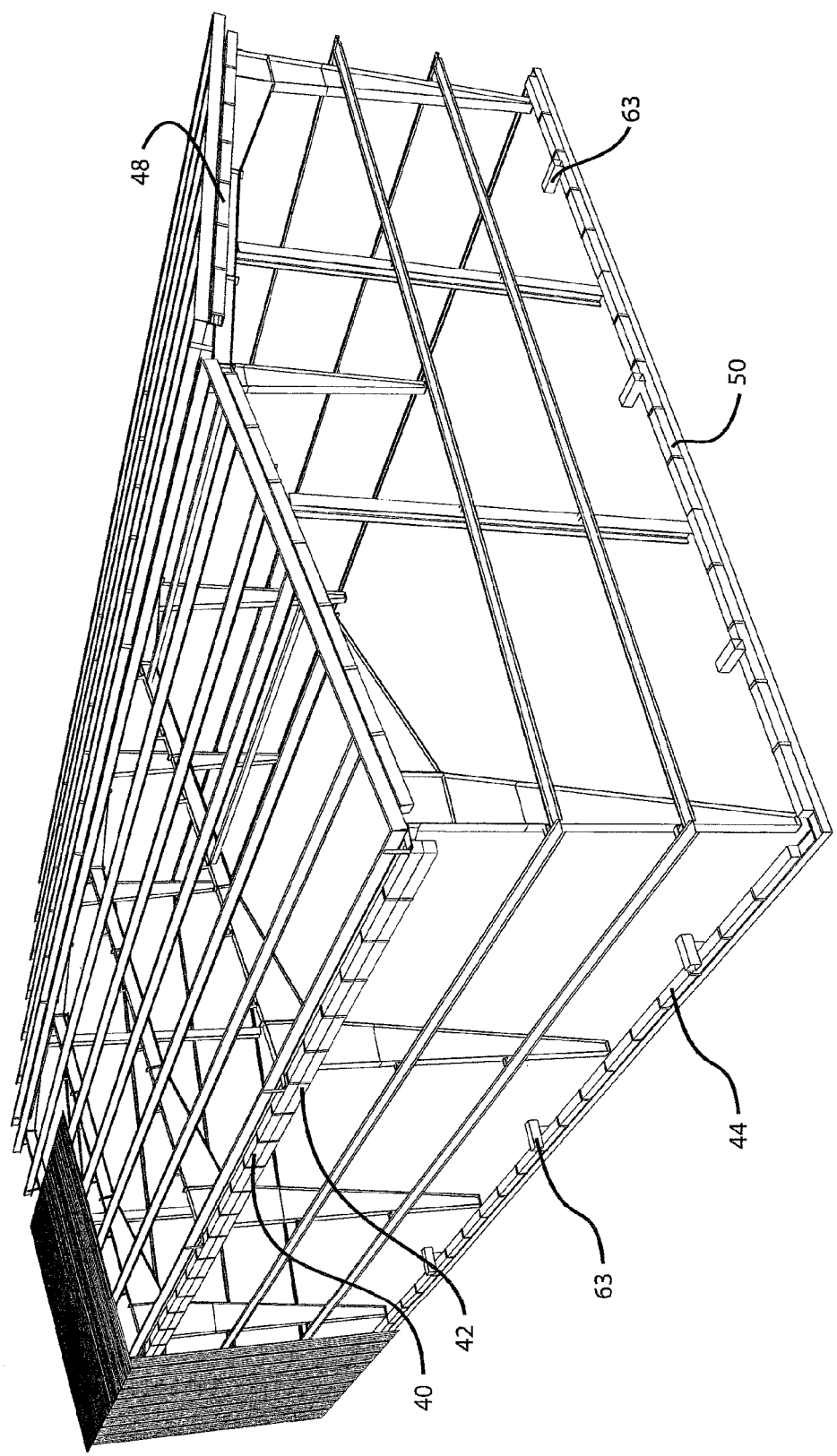
FIG. 1a is a perspective cutaway view of a typical metal building with a plurality of ducts installed.
Figure 2:
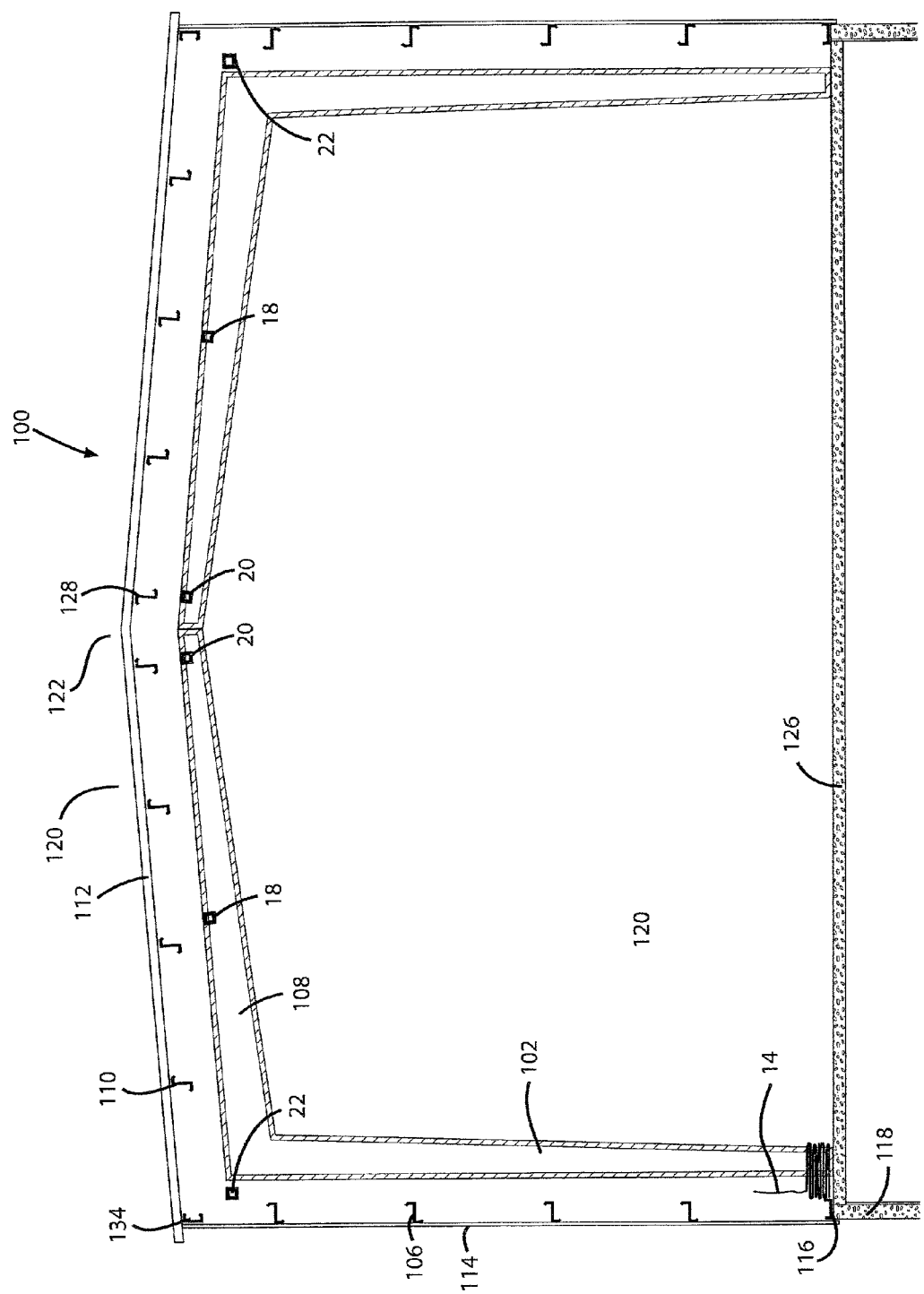
FIG. 2 is a cross sectional end view of a metal building, before installation of a tensioned ceiling or wall sheet material in accordance with the present invention.
Figure 3:
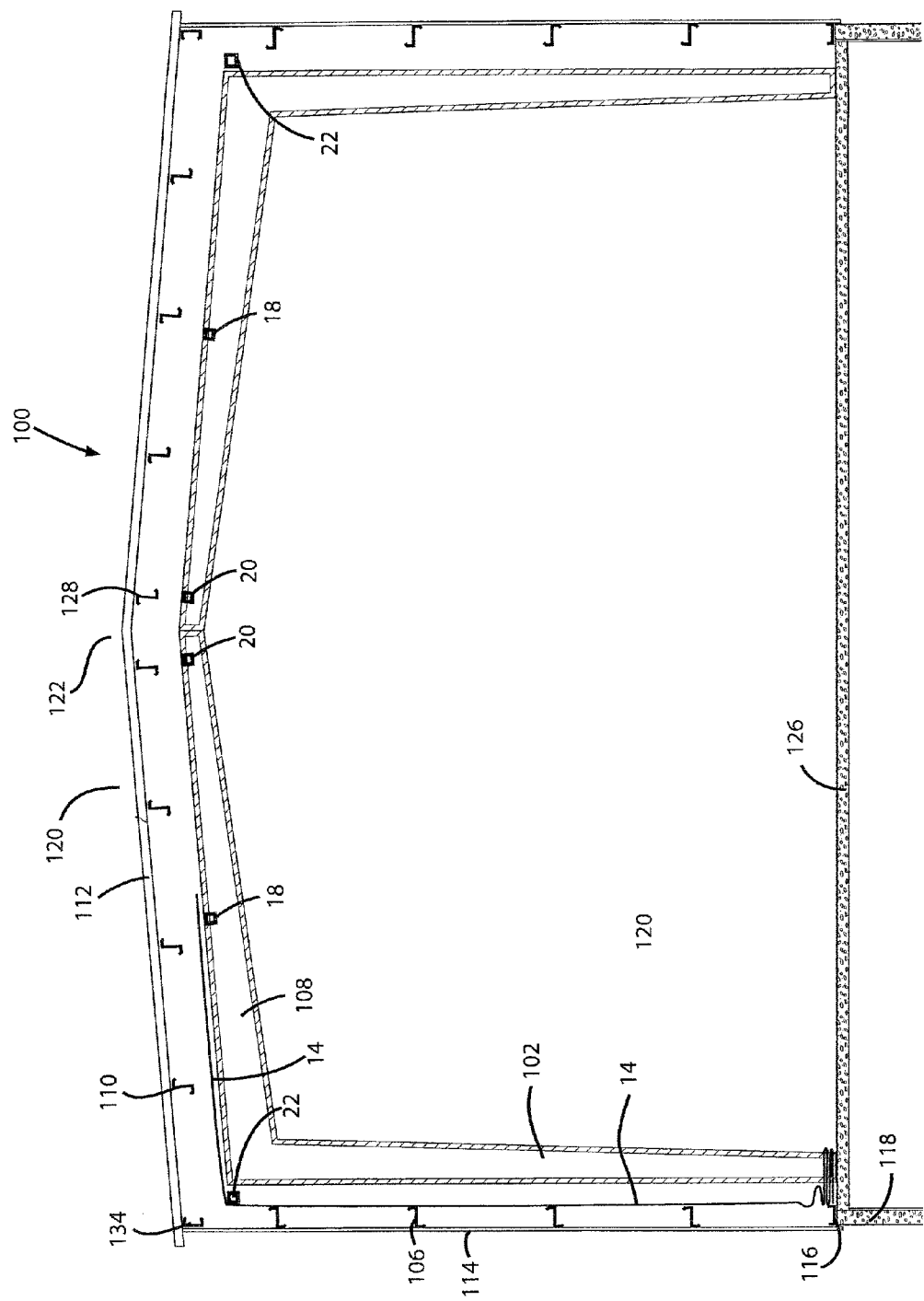
FIG. 3 is a cross sectional end view of a metal building, as a sheet material is partially installed over sheet material support struts in accordance with the present invention.
Figure 4:
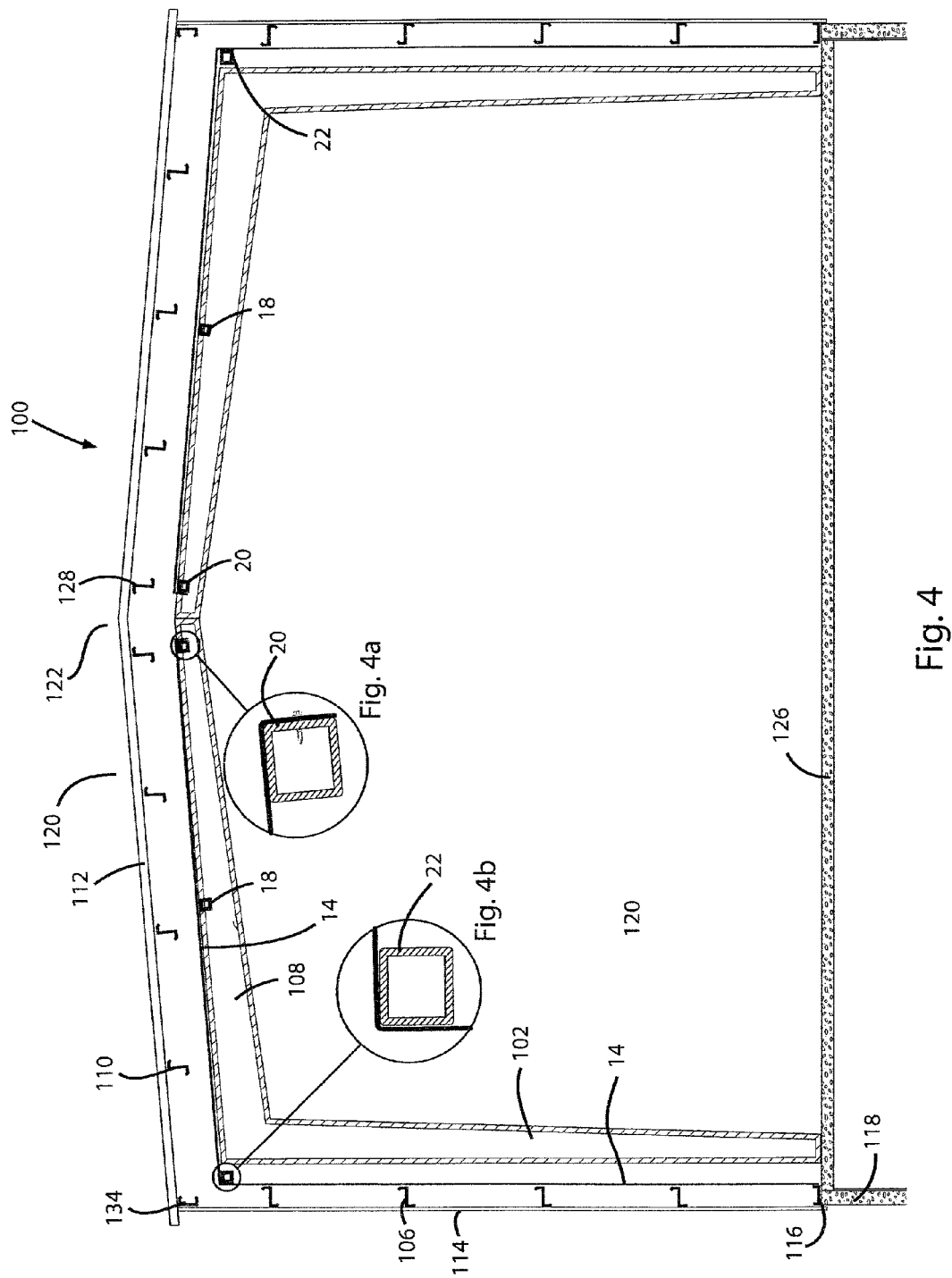
FIG. 4 is a cross sectional end view of a metal building, after installation of a sheet material when a sheet material is terminated at a ridge sheet material support strut in accordance with the present invention.
Figure 5:
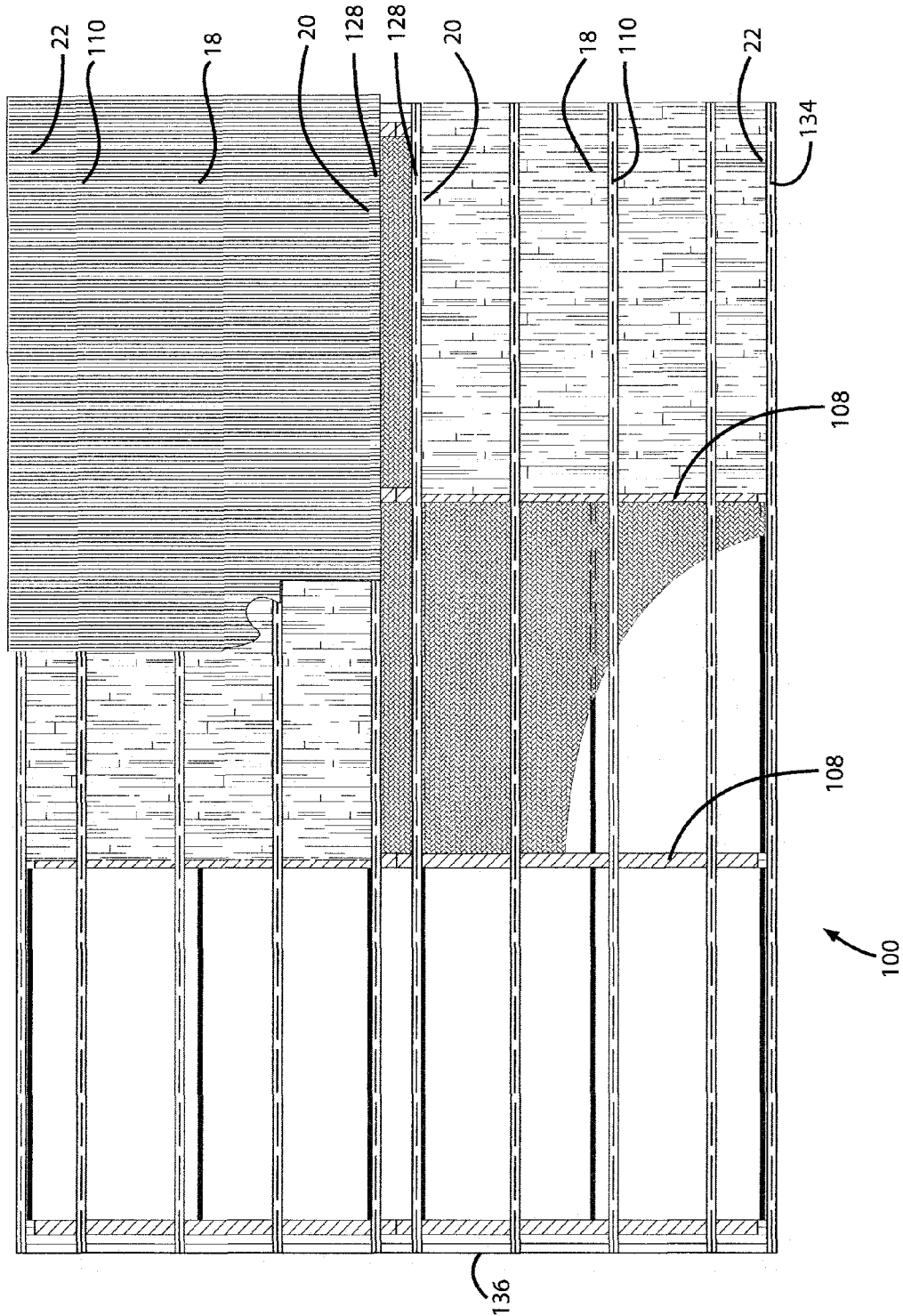
FIG. 5 is a top view of a metal building containing purlins and ceiling sheet material support struts, prior to the installation of a ceiling sheet material, a thermal insulation layer and roof sheeting panels in accordance with the present invention.
Figure 6:
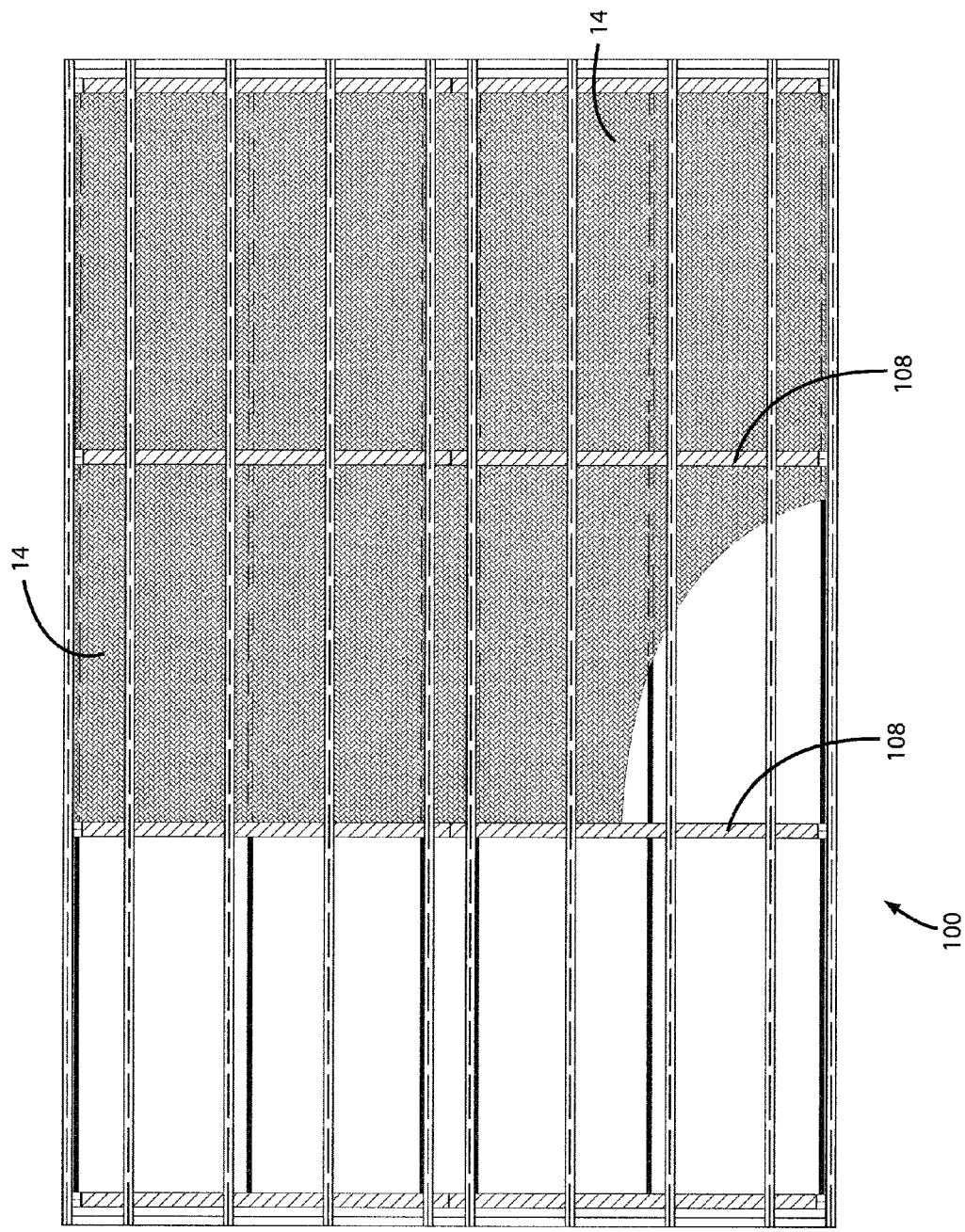
FIG. 6 is a cross-sectional top view of a metal building below purlins with at one ceiling sheet material installed and another in a cut-a-way view showing underlying ceiling sheet material support struts in accordance with the present invention.
Figure 7:
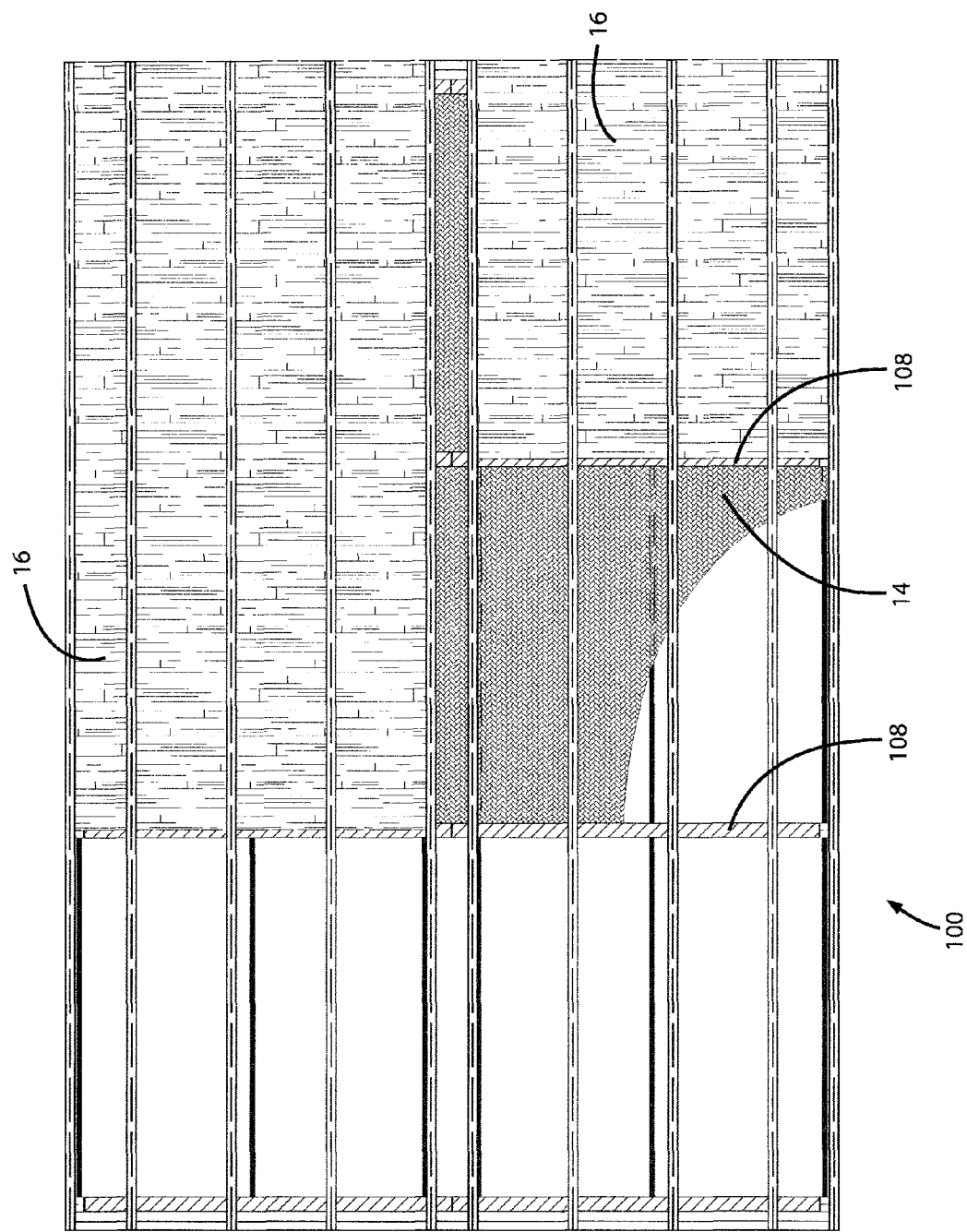
FIG. 7 is a cut-a-way top view of a metal building with a ceiling insulation layer installed on top of at least one ceiling sheet material prior to the installation of any roof sheeting panels in accordance with the present invention.
Figure 8:
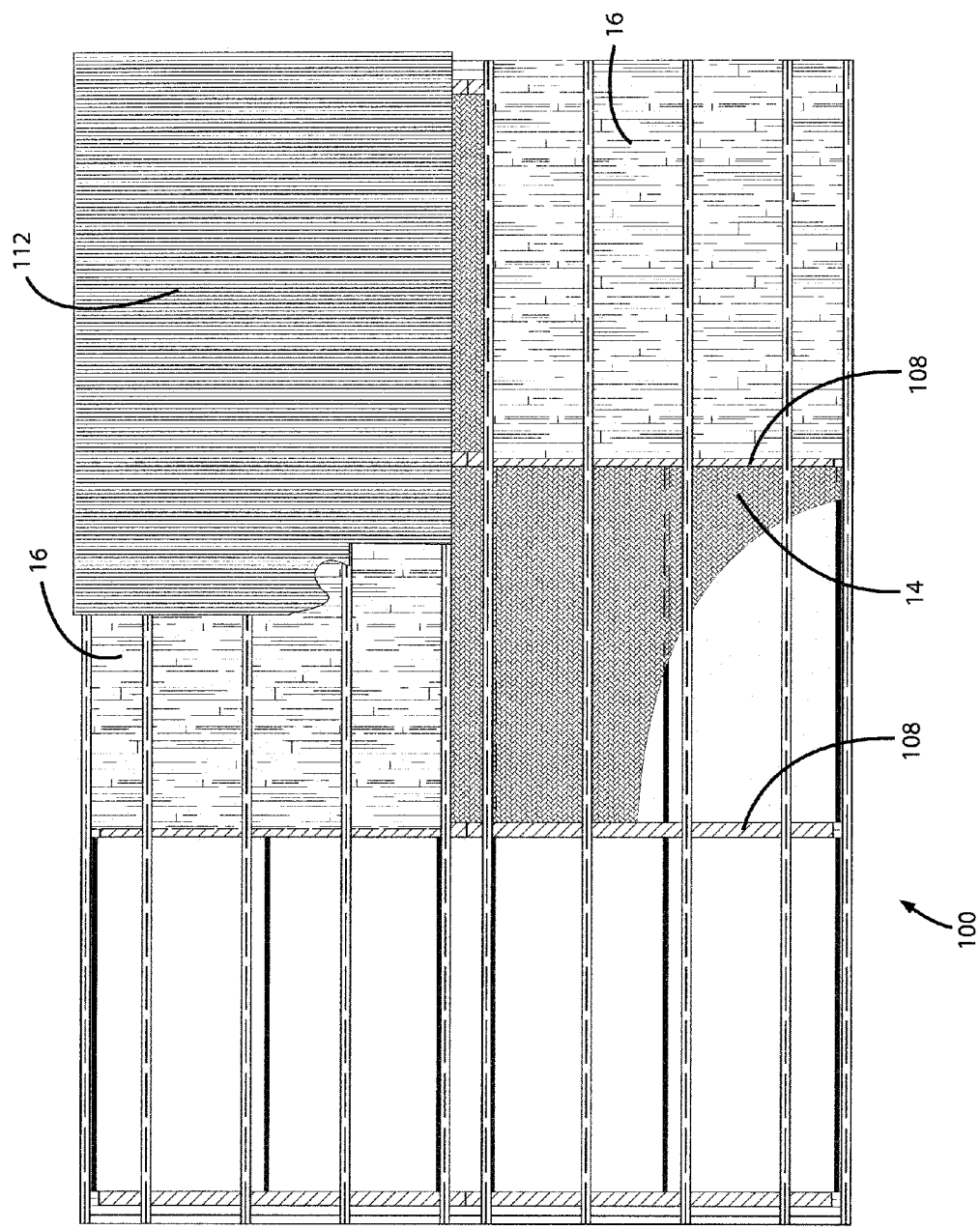
FIG. 8 is a cut-a-way top view of a metal building with a ceiling insulation layer installed on top of at least one ceiling sheet material and a roof panel installed on top of a plurality of purlins, an air gap layer is formed between a ceiling insulation layer and a roof sheeting panel in accordance with the present invention.
Figure 10:
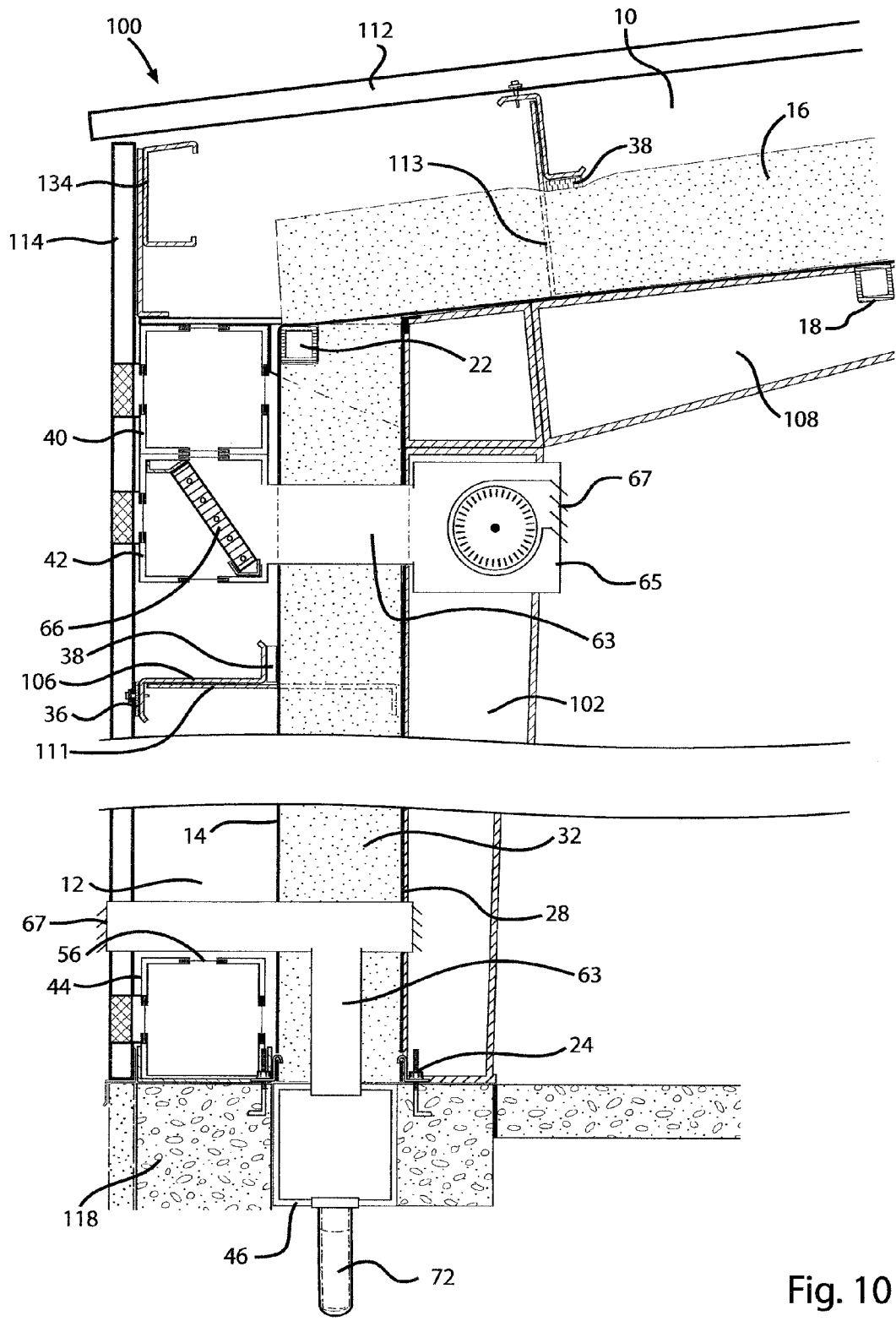
FIG. 10 is a partial cross sectional end view at a side wall column location of a metal building illustrating a side wall from a foundation and floor to the eave and roof of the building in accordance with the present invention.
Figure 11:
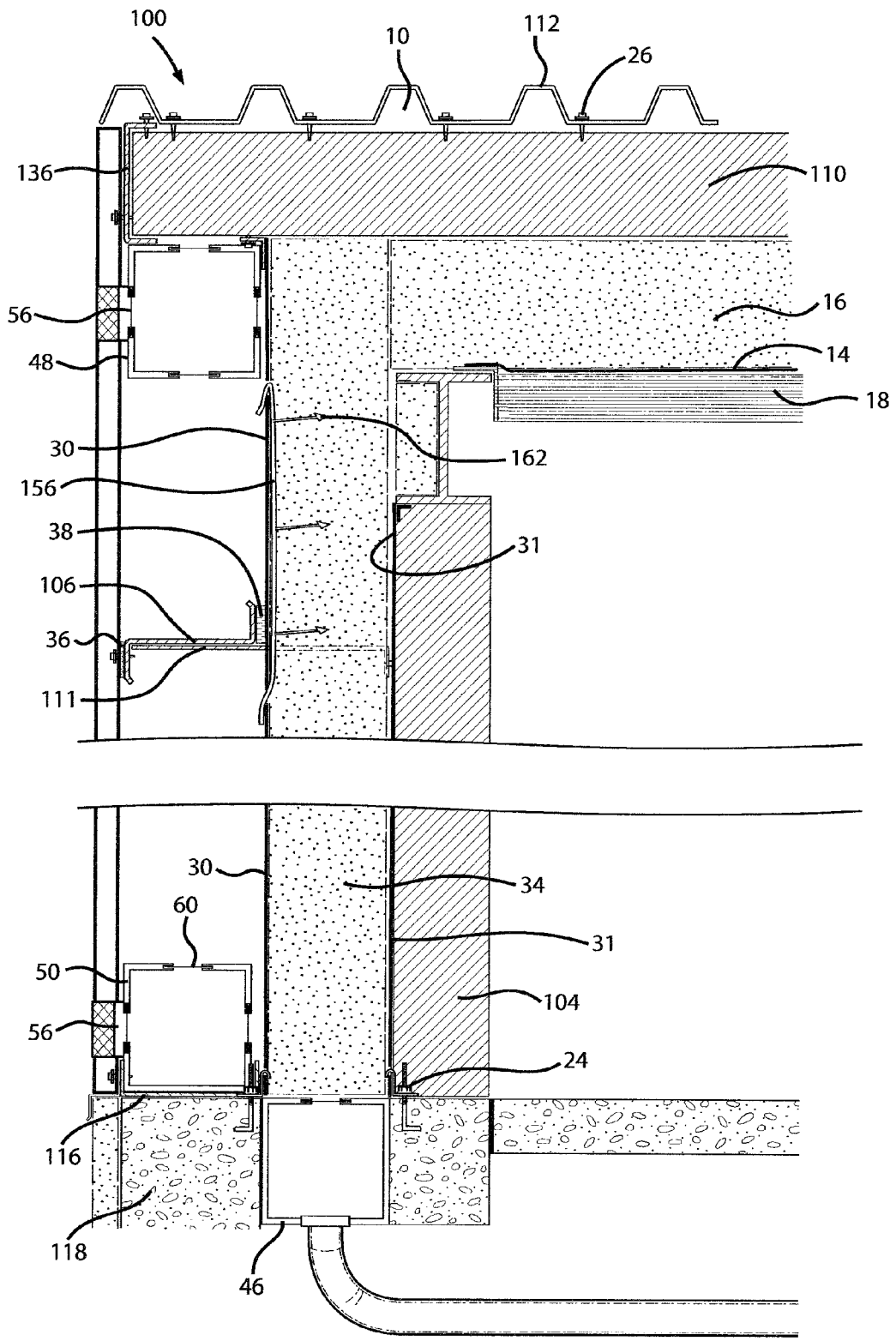
FIG. 11 is a partial cross sectional view of a metal building illustrating an end wall from foundation and floor to a gable end eave and roof of a building at the location of a ceiling sheet material support strut in accordance with the present invention.

With reference now to the drawings, and particularly to FIGS. 1 and 10, there is shown a cut-away perspective view of a metal building 100. With reference to FIGS. 10, 11, the metal building 100 preferably includes a heat collection air gap layer 10, 12, air vent spacers 36, 38, an insulation retaining sheet material 14, 30, a material insulation layer 16, 32, 34 and a plurality of ducts 40, 42, 44, 48, 50. The metal building 100 is shown, but other types of buildings may also be used. The metal building 100 includes a plurality of rafter columns 102, a plurality of end columns 104, a plurality of wall girts 106, a plurality of rafters 108, a plurality of purlins 110, 128, 134, a plurality roof exterior sheeting panels 112, a plurality of wall exterior sheeting panels 114 and a peripheral base channel 116. The plurality of rafter columns 102 and the plurality of end columns 104 are attached to the peripheral base foundation 118. The peripheral base channel 116 is attached to a foundation 118 to form a perimeter of the metal building 100. The plurality of girts 106 are retained between horizontally extended girt clips 111, off the exterior surfaces of the plurality of rafter columns 102 and end columns 104. The plurality of rafters 108 are attached to a top of the plurality of rafter columns 102. The plurality of purlins 110, 128, 134 are retained between vertically extended purlin clips 113 above the exterior faces the plurality of rafters 108.

Figure 16:
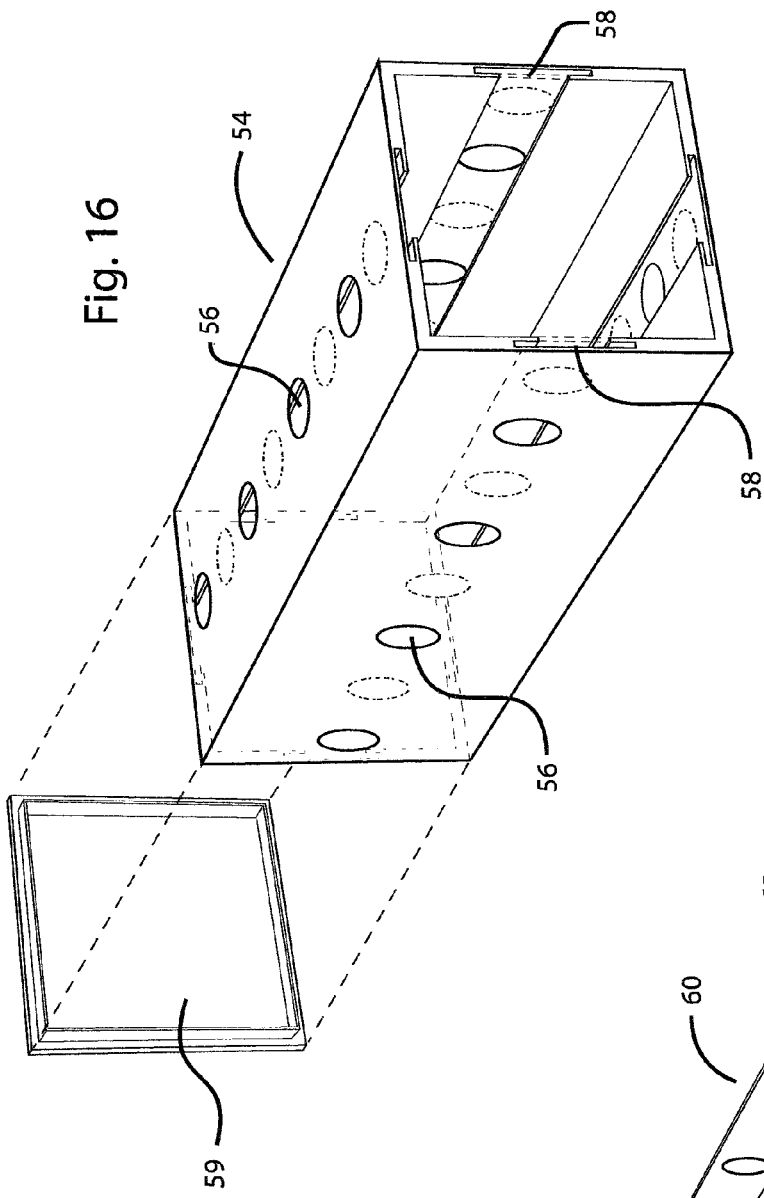
FIG. 16 is an exploded perspective view of a single duct module with an end cap, but without damper strips in accordance with the present invention.

With reference to FIGS. 10 and 16, the heat collecting air gap layers include a roof heat collecting ceiling air gap layer 10 and a wall heat collecting air gap layer 12, which communicate with each other on demand through duct damper holes 56 to increase the total heat collector surface area available to absorb solar heat. The solar heat from the east, west, south or north walls can be individually directed through ducts 40,42,48 through damper holes 56 to the solar exposed roof 120, to melt snow and ice, thereby maximizing the total heat absorption surface area to achieve greatest volume and heat energy concentration.

With reference to FIGS. 2-8, the composite roof assembly preferably includes at least one ceiling sheet material 14, a ceiling material insulation layer 16, at least two intermediate ceiling support struts 18, at least two ridge ceiling support struts 20 and at least two eave inside corner ceiling support struts 22. Each intermediate ceiling support strut 18 and eave inside corner ceiling support strut 22 are attached between two adjacent rafters 108. Each ridge ceiling support strut 20 is attached to two adjacent rafters 108 adjacent a ridge 122 of the roof 120 and vertically aligned below the roof 120 ridge purlins 128. Each eave inside corner ceiling sheet material support strut 22 is attached to define an inside corner between a roof 120 and a side wall 124 sheet materials 14, 30 of the metal building 100. One end of the ceiling sheet material 14 is inserted behind the eave inside corner ceiling sheet material support strut 22, above the intermediate ceiling sheet material support struts 18, above the ridge ceiling sheet material support strut 20 adjacent a ridge 122 of the roof 120 and securely attached to the nearest ridge ceiling support strut 20 with fasteners or the like. The other end of the ceiling sheet material 14 is attached to either a foundation 118 or a floor 126 of the metal building 100 with adhesive, a tensioning device 24 or any other suitable means.

With reference to FIG. 10a-10h, a variety of tensioning devices include a turnbuckle tensioning device 202, a right angle take-up tensioning device 204, a hook and threaded rod tensioning device 206, a ratchet strap tensioning device 208, a turning shaft tensioning device 210, a single adjustable strut tensioning device 212, a bi-directional adjustable strut tensioning device 214 and a strap winch tensioning device 216.

Figure 10I:
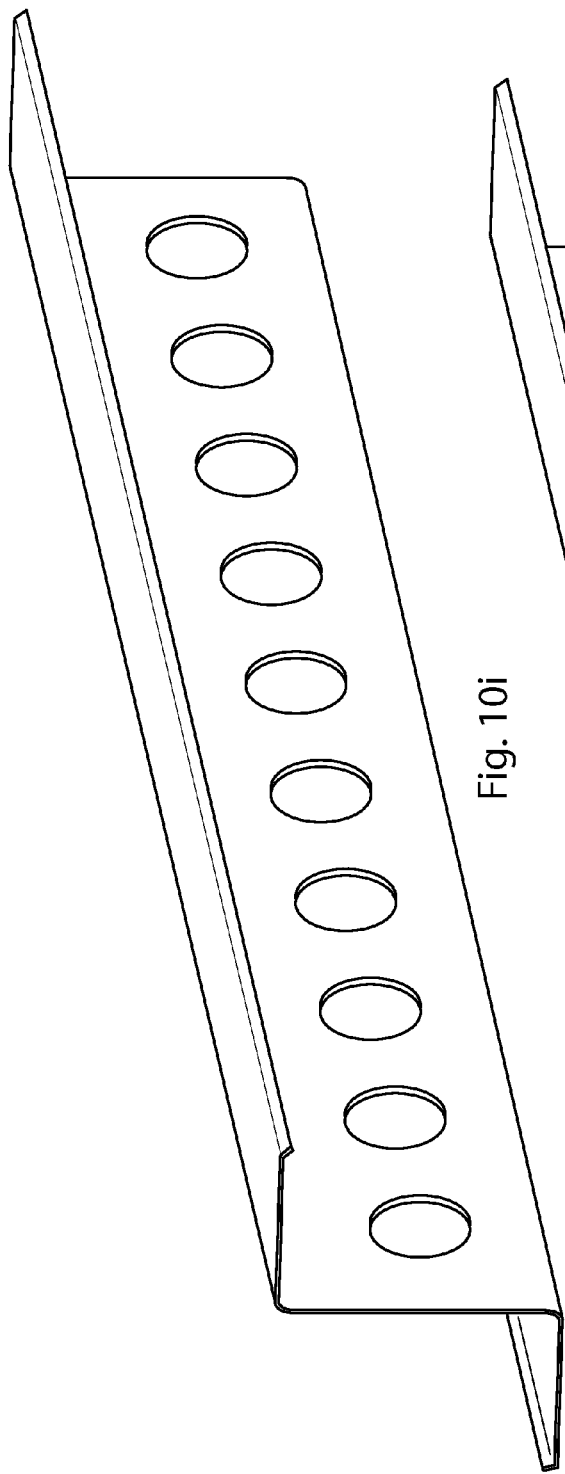
FIG. 10i is a Z-shaped purlin with a plurality of air flow holes formed therethrough for installation in a metal building.
Figure 10J:
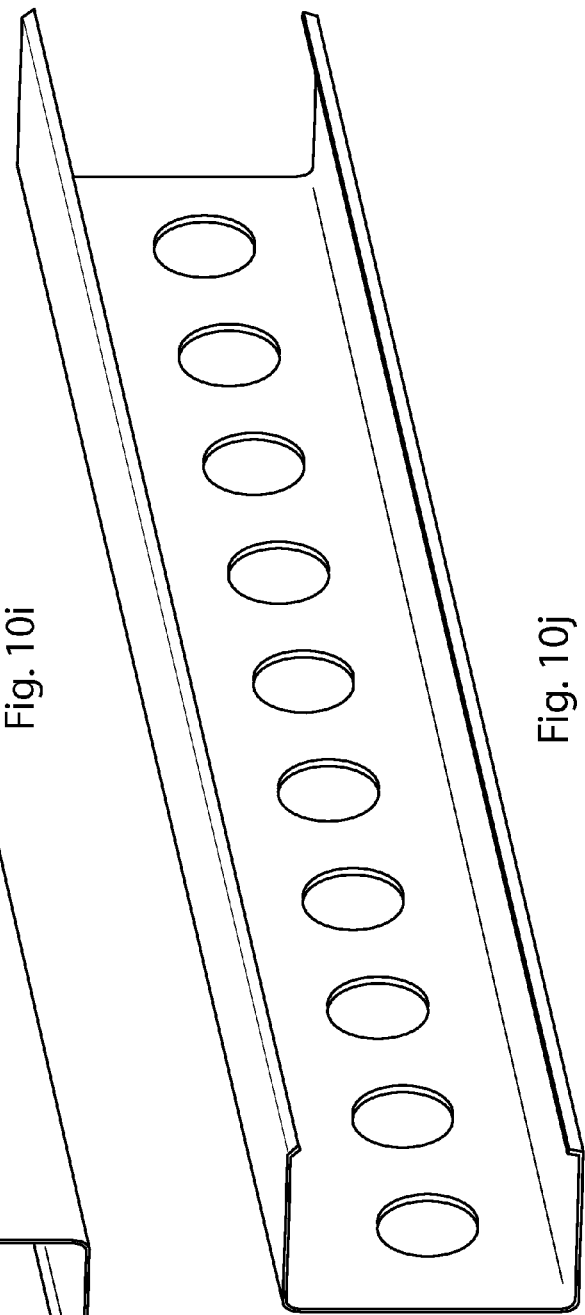
FIG. 10j is a C-shaped purlin with a plurality of air flow holes formed therethrough for installation in a metal building.

With reference to FIGS. 10i and 10j, a Z-shaped purlin 111 includes a plurality of air through holes 115. The plurality of air through holes 115 allow air between the roof 112 and the insulation 16 to flow upwards toward a multi-vent 69. A C-shaped purlin 117 includes a plurality of air through holes 119. The C-shaped purlin 117 may be used to replace the Z-shaped purlin 111 in some construction applications.

Figure 12:
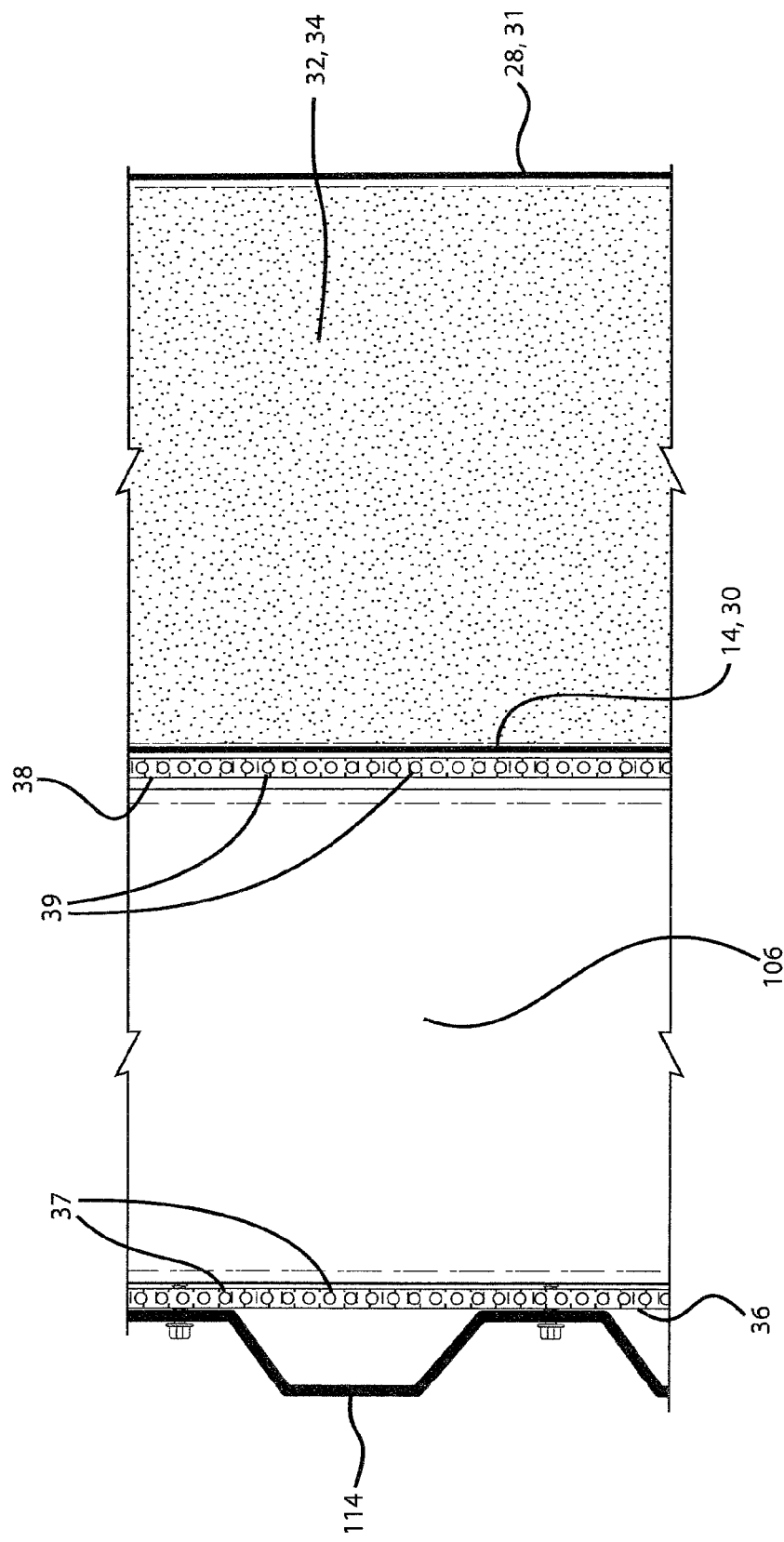
FIG. 12 is a top view looking into a side wall or an end wall of a metal building illustrating an air gap layer, a material insulation layer and a girt with interior and exterior flange mounted vent spacers in accordance with the present invention.
Figure 13:
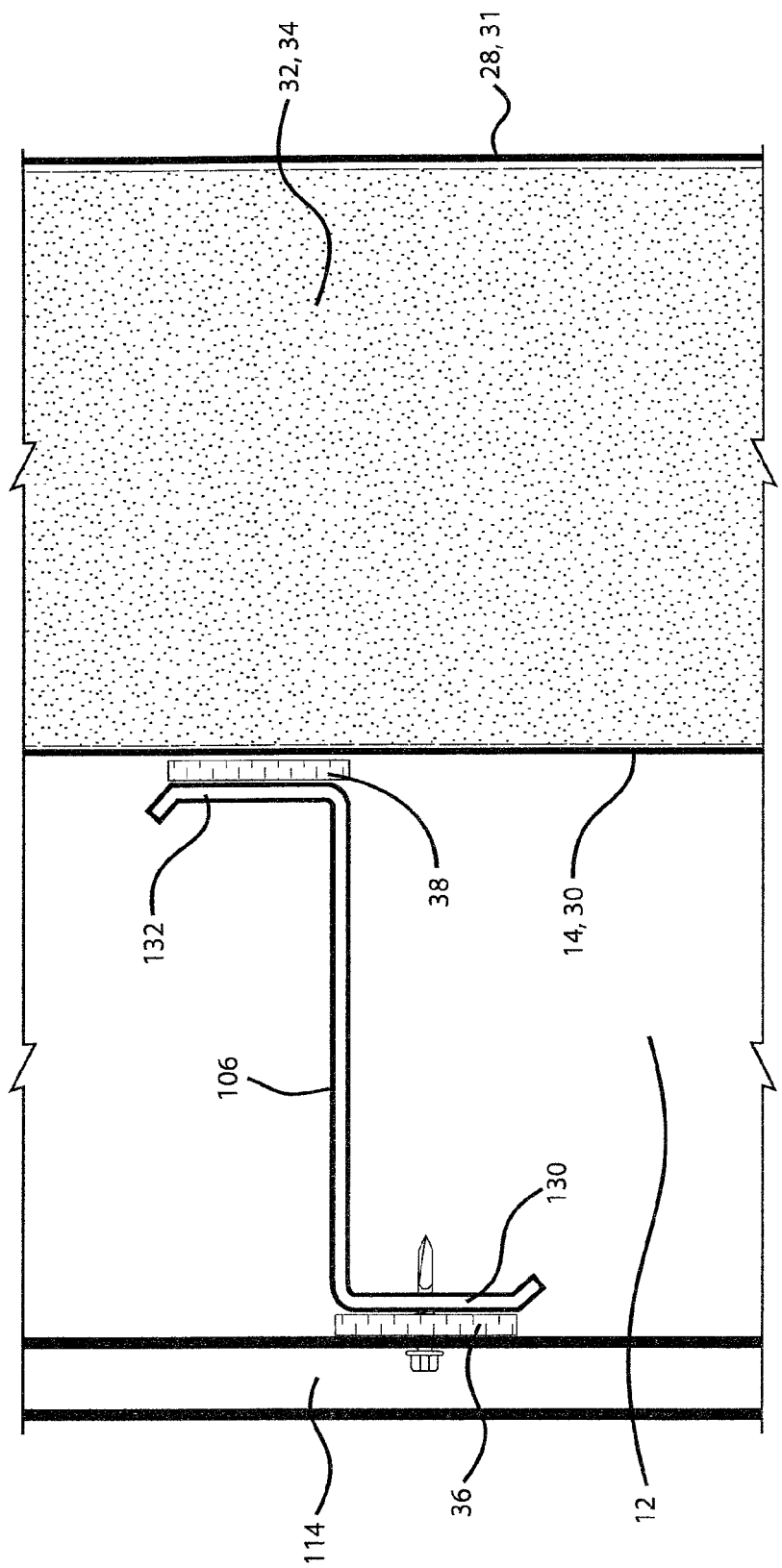
FIG. 13 is an end view looking into a side wall or an end wall of a metal building illustrating an air gap layer, a material insulation layer and a girt with interior and exterior flange mounted vent spacers in accordance with the present invention.
Figure 14:
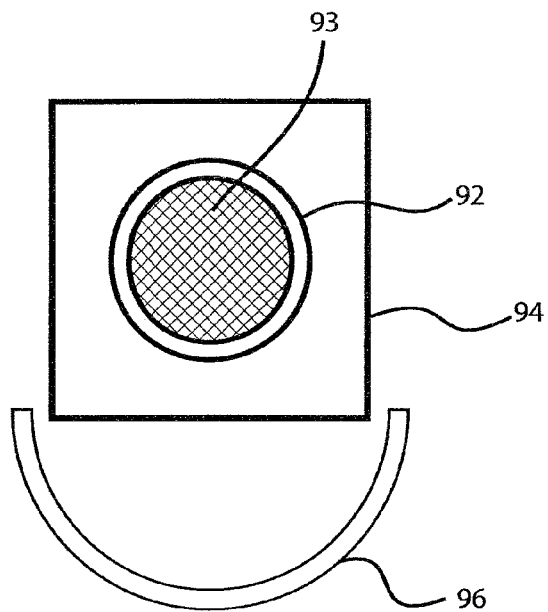
FIG. 14 is an enlarged cross sectional end view of a heat collecting dehumidifier pipe with square fins retained above a water collection trough in a ridge air gap layer or in a ridge mounted multi-vent, which may also be used in an upper wall air gap layer or upper wall duct to collect heat and dehumidify the wall or roof air gap air in accordance with the present invention.

Alternatively, one end of the sheet material 14 is secured to the foundation 118 or the floor 126 on one side of the metal building 100 and the other end of the sheet material 14 is inserted around the exterior side of one eave inside corner ceiling support strut 22, inserted over the intermediate ceiling sheet material support strut(s) 18, inserted over the two ridge ceiling sheet material support struts 20, inserted over the opposite side intermediate ceiling sheet material support strut(s) 18, inserted over the opposite side eave inside corner, ceiling sheet material support strut 22 and finally secured with a tensioning device 24 or any other suitable means to the foundation 118 or floor 126 on an opposing side of the metal building 100. Significant tension is typically required to limit deflection when supporting the load of the material insulation layer without the intermediate fasteners and the resultant thermal bridging common to all known prior art. The ceiling insulation layer 16 is laid on the at least one ceiling sheet material 14 and includes an insulation thickness that extends upward to near the bottom of the plurality of purlins 110. Although not required, an air flow path is desired between the material insulation layer 16 and the bottom of the plurality of purlins 110 to allow cooler, more dense air to flow toward the eave purlin 134 to more efficiently complete the movement of the heat energy up over the purlins 110 to the ridge 122 and allow the cooler, more dense air is allowed to flow back down toward the eave purlin 134. Open web purlins and joists are not shown, but allow the heat energy, humidity and air to flow in all directions without this efficiency concern. FIGS. 12-13 show a plurality of inner vent spacers 38 that include air vent holes 39 which would be installed on the under side of the bottom flange 132 of the plurality of solid web purlins 110, 128 to ensure an air circulation path from ridge to eave. The ceiling heat collecting air gap layer 10 is created between a top of the ceiling material insulation layer 16 and a bottom of the roof panel 112. Preferably the roof sheeting panels 112 are connected to the tops of the purlins 110 with a plurality of thermal conductive fasteners 26 to maximize thermal conduction from the plurality of thermally conductive roof sheeting panels 112 into the plurality of conductive, radiative roof purlins 110, 128, 134. With reference to FIG. 14, maximizing conduction will enhance the heat transfer, enhance the heat collection in the air gap layer 10, enhance the heat concentration at the highest point of the air gap layer 10 closest the ridge 122 and enhance overall efficiency of heat energy collection at the heat collection fins 94 of the heat transfer pipe 92 of the metal building building 100. Heat transfer fluid 93 circulates inside the heat transfer pipe 92 powered by either a pump or compressor (not shown).

Figure 18:
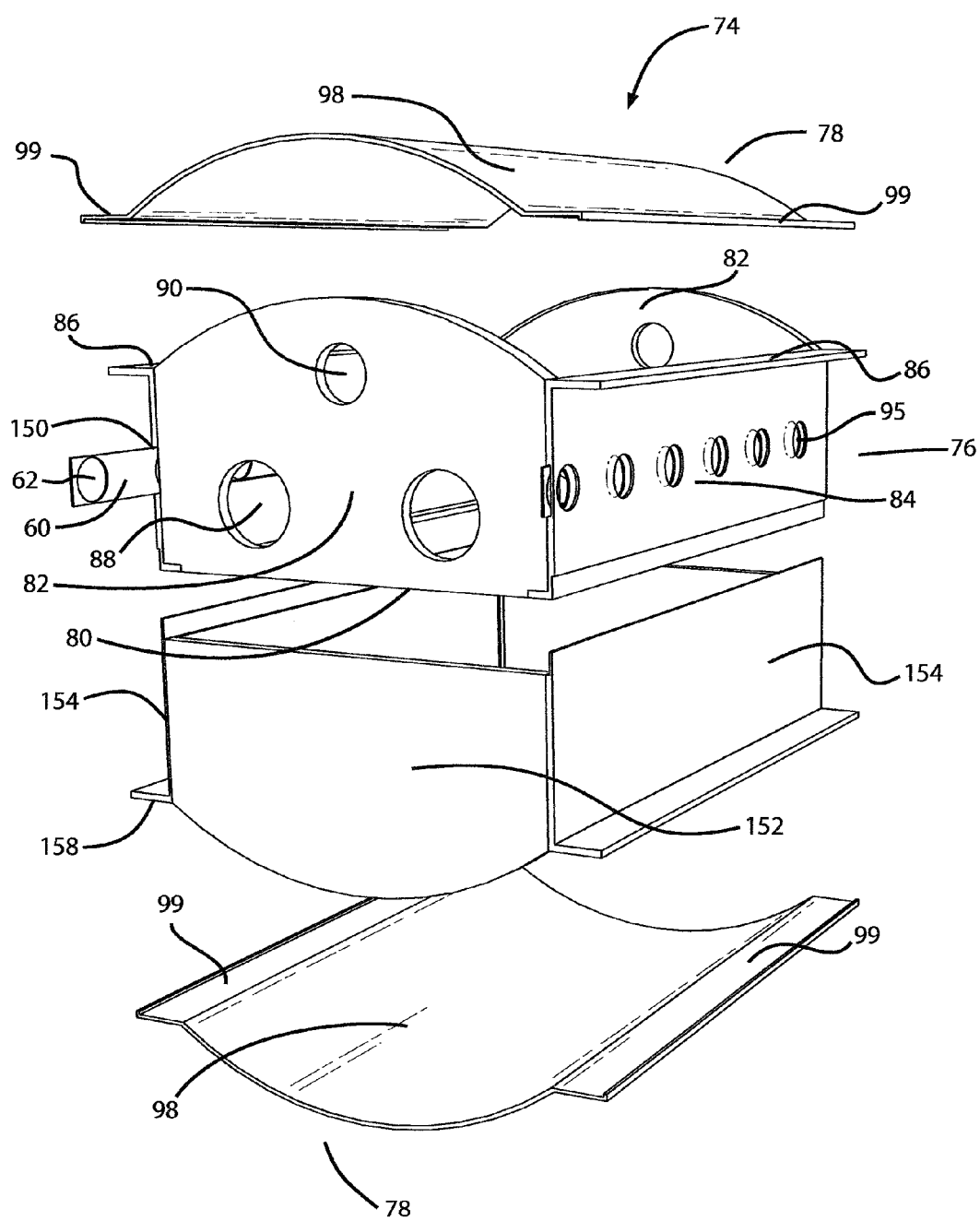
FIG. 18 is an exploded perspective view of a ridge mounted multi-vent, a similar multi-vent turned ninety degrees may be mounted in place of an upper wall duct in a sidewall or end wall to function for system inspection, wall daylighting purposes and other uses in accordance with the present invention.
Figure 21:
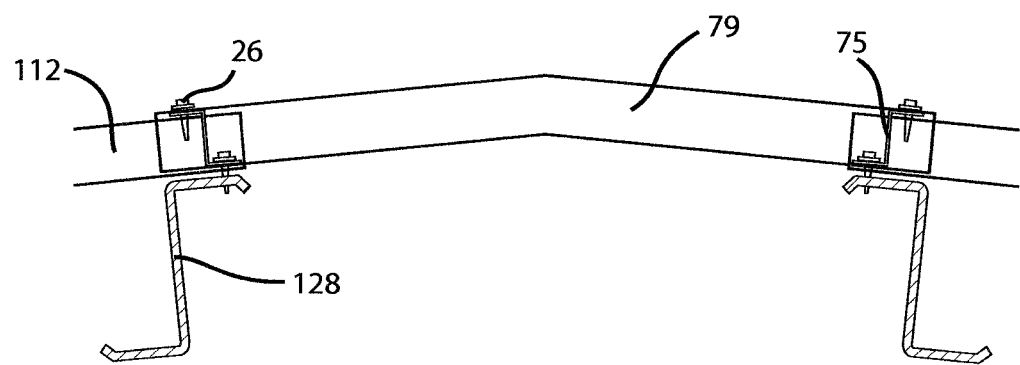
FIG. 21 is a cross-sectional end view of a typical metal building ridge cap made of a formed corrugated roof panel in a building ridge, which matches the corrugation configuration of roof panels.
Figure 22:
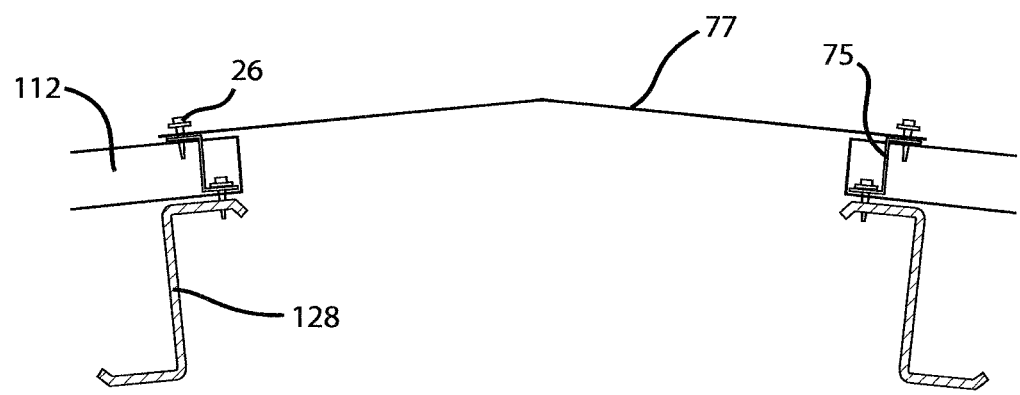
FIG. 22 is an alternative cross-section end view of a typical metal building ridge cap formed into two flat planes and two formed metal closures to fill in the corrugation profile of the roof sheeting panels, a closure installed on each side of a ridge, the ridge cap does not need to match the roof panel corrugation with this design.
Figure 23:
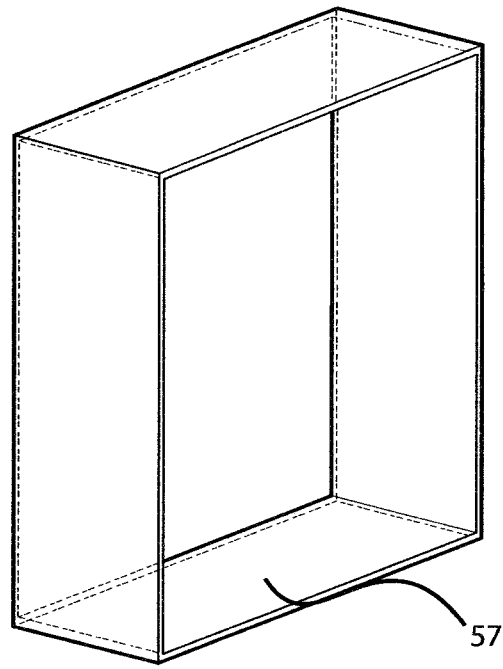
FIG. 23 is a perspective view of a modular duct connection coupling in accordance with the present invention.
Figure 24:
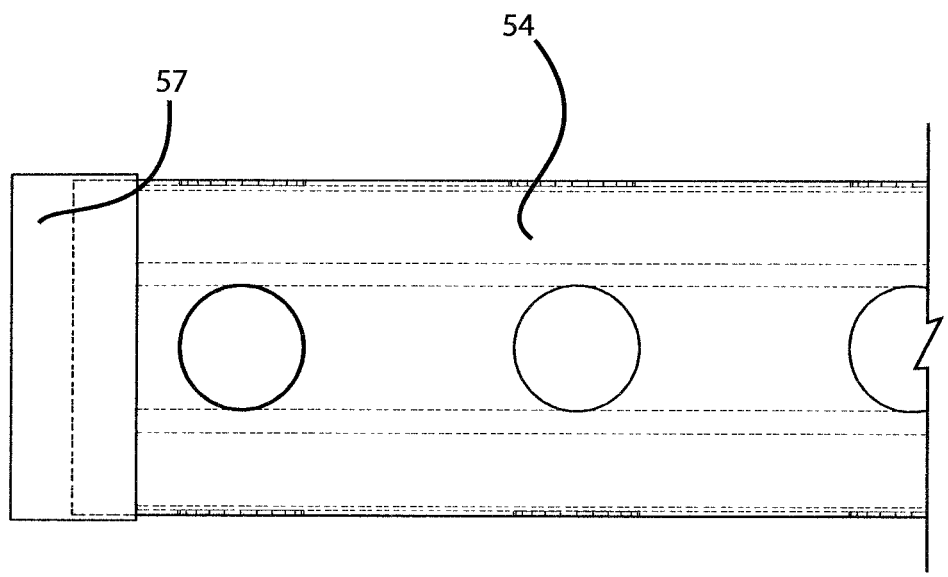
FIG. 24 is a side view of a duct module with the duct connect coupling installed on one end in accordance with the present invention.

FIGS. 18-20 illustrate a preferred alternative multi-vent 74 to a typical metal roof ridge cap 77, 79 of FIGS. 21-22. The ridge mounted multi-vent 74 extends through the ridge 122 of the roof 120 and preferably extends a length of the roof ridge 122. The ridge mounted multi-vent 74 is located between two ridge purlins 128 and between the two ridge ceiling support struts 20. FIG. 20 illustrates a plurality of multi-vent box side panel extensions 154 and a plurality of multi-vent box end panel extensions 152 which attach to the bottoms of the plurality of multi-vents modules 74 to fill the open space to the bottoms of the two ridge ceiling support struts 20 shown in FIG. 4. If the preferred multi-vent is not used and a typical ridge cap 77, 79 is used. a single ridge ceiling support strut centered below the ridge line is sufficient to support the ceiling sheet material and the overlying material insulation layer.

With reference to FIGS. 12-13, each metal building 100 composite wall structure includes an exterior metal wall sheeting panel 114, an optional exterior girt mounted vent spacer 36, a girt 106 in the air gap 12, the interior mounted girt vent spacer 38, an exterior side wall sheet material which may typically be an extension of the ceiling sheet material 14, or may be an independent exterior wall sheet material 30, a material insulation layer 32, 34, and an interior wall material 28, 31.

Figure 25:
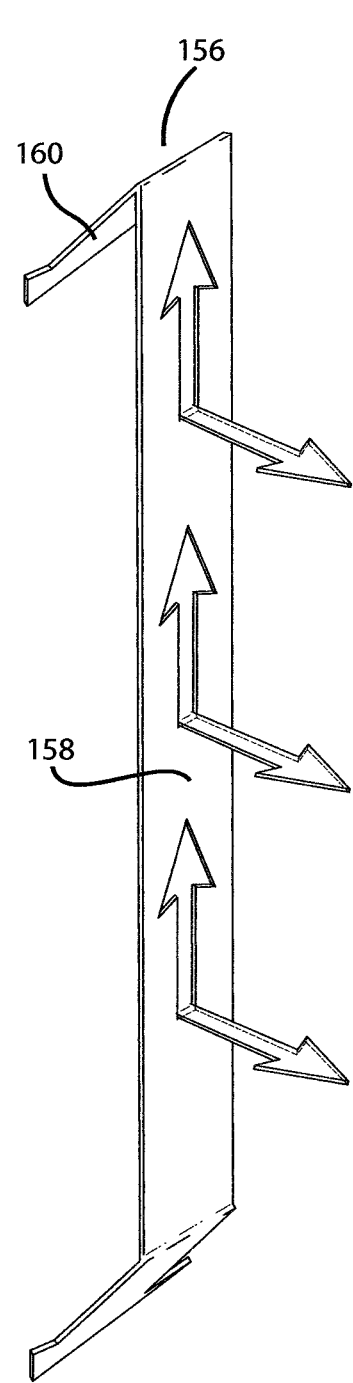
FIG. 25 is a perspective view of a bi-directional insulation hanger device designed to quickly impale and suspend from a wall sheet material on one side and to support an impaled insulation layer on the opposing side without any thermal bridging to a metal wall girts or to the interior space air in accordance with the present invention.
Figure 26:
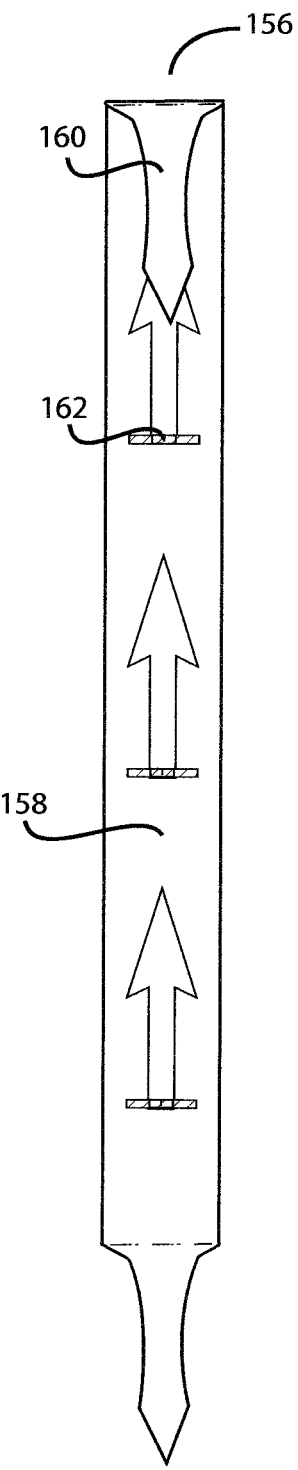
FIG. 26 is a rear view of the bi-directional insulation hanger device illustrated in FIG. 25 in accordance with the present invention.

A plurality of optional girt exterior flange mounted vent spacers 36 include a plurality of through air flow openings 37, if desired to increase the heat flow area upward around the girts. The interior girt flange mounted vent spacers 38 are attached to an interior flange 132 of the girt 106. The interior girt spacers 38 include a plurality of through air flow openings 39, if desired to increase the heat flow area around the interior girt flanges. An exterior surface of the wall sheet material 14, 30 abuts the plurality of interior flange mounted girt spacers 38. With reference to FIGS. 25-26, a wall material insulation layer 32, 34 is secured to a vertical portion of the wall sheet material 14, 30 with bi-directional impaling hangers 156 by first impaling the sheet material impaling arrows 160 through the sheet material 14, 30 for support and then impaling the insulation layer 32, 34 on the opposite side hanger insulation impaling arrows 162 with any suitable method or device. A top edge of each side wall interior insulation covering sheet material 28 is preferably attached to the ceiling sheet material 14 with adhesive, fasteners or other suitable attachment means, such that the exterior surface of insulation covering wall sheet material 28 contacts an interior surface of the wall insulation layer 32 which is typically fiber glass blanket or batt insulation. A bottom edge of each interior insulation covering wall sheet material 28 is attached at its base with a tensioning device 24, adhesive, fasteners or any other suitable attachment method. A plurality of wall heat collecting air gap layers 12 are created between an interior facing surfaces of the exterior wall sheeting panels 114 and the exterior facing surfaces of the side wall sheet material layer 14 which are typically extensions of the ceiling sheet layer 14.

The outer end wall sheet material 30 abuts to the plurality of inner girt flange vent spacers 38. A top end of first installed exterior end wall sheet material 30 is preferably attached to the ceiling sheet material 14 with adhesive, fasteners or other suitable attachment means, but may alternatively be attached to the end wall rafter 108 or to end wall girts 106 as limited by accessibility of an individual application. A bottom end of each first installed, exterior end wall sheet material 30 is attached to the foundation 118 or floor 126 with the tensioning device 24, adhesive or any other suitable attachment device and methods. FIGS. 10a-10h illustrate various styles of tensioning devices which may be used to apply tension to the ceiling or wall sheet material 28, 31. Wall material insulation layers 32, 34 preferably are suspended from the interior surfaces of the first installed, exterior wall sheet material 14, 30.

The plurality of bi-directional impaling suspension hangers 156 are used to suspend the wall material insulation layers 32,34 without any conductive thermal bridges to the wall girts 106. The exterior facing impaling arrows 160 impale the exterior wall sheet material for support. The insulation layer 32, 34 is impaled on the opposing impaling arrows 162 to support the insulation in suspension without any thermal bridging to the exterior wall girts and panels. A top end of each second installed, interior wall sheet material 28, 31 is preferably attached to the ceiling sheet material 14 with adhesive, fasteners or other suitable attachment means, such that its exterior surface contacts an interior surface of the wall insulation layer 32, 34. A bottom end of each second installed, interior wall sheet material 28, 31 is attached at its base with a tensioning device 24 or any other suitable attachment device and method. The end wall heat collecting air gap layer 12 is created between an interior facing surface of the exterior end wall sheeting panels 114 and the exterior facing surface of the first installed, exterior end wall sheet material 30. The side wall heat collecting air gap layer 12 is created between an interior facing surface of the exterior wall sheeting panels 114 and the exterior facing surface of the first installed, exterior side wall sheet material 14, 30.

Figure 17:
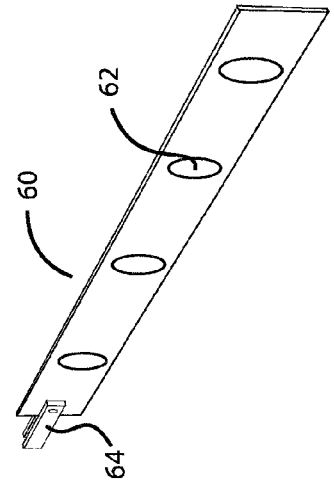
FIG. 17 is a perspective view of a damper strip for insertion into a damper strip slot of a duct module or multi-vent module in accordance with the present invention.

With reference to FIGS. 1a, 10-11, 16-17 and 23-24 the plurality of wall ducts include side wall ducts and end wall ducts. The ducts are joined in series with a plurality of connection couplings 57. The plurality of side wall ducts 40, 42, 44 generally have a horizontal orientation. The plurality of side wall ducts preferably include two side wall eave roof ducts 40, two sidewall upper wall ducts 42, two sidewall base ducts 44. The side wall eave roof ducts 40 provide an independent air flow path from the exterior air to the roof air gap layer. The upper side wall air flow duct provides and independent air flow path which communicates with the exterior air and the air gap layer 12. The plurality of end wall ducts include upper wall ducts 48 with an orientation generally matching the roof slope along the top of the end wall air gap layer 12. The plurality of the end wall base ducts 50 have a horizontal orientation along the base of the air gap layer 12. The plurality of end wall ducts preferably include two upper wall ducts 48 and two end wall base ducts 50. Two subterranean air ducts 46 and subterranean tube ducts 72 connected between the two opposite wall subterranean air ducts 46 also may be installed to pre-condition air used for ventilation, heating, cooling and dehumidification. Each duct 40-50 is preferably fabricated from an extruded rectangular (preferably square) tube 54 illustrated in FIG. 16. The tube 54 preferably includes a plurality of air flow holes 56 formed through one or more sides thereof. With reference to FIG. 17, a damper strip slot 58 is formed in at least one sides side of the tube 54 to receive a damper strip 60. The damper strip 60 includes a plurality of holes 62, which may be aligned with the plurality of air flow holes 56 to allow air flow into the tube 54 or to prevent air flow into the tube 54. Any suitable duct actuation device 64 may be used to slide the damper strip 60 in the damper strip slot 58. FIG. 1 illustrates a cut-away perspective view of the general spacial locations of the wall duct and eave line roof duct communicating with the air gap layers 10, 12 of the metal building 100. The ducts need not be installed continuously, nor the full lengths of the building walls but only as desired to provide a useful function.

Each sidewall eave roof duct 40 is located below a lengthwise eave purlin 134. The side wall eave roof duct 40 may be constructed of any suitable material and used to replace the eave purlin 134 and provide the intended combined functions of both the eave line roof duct 40 and the eave purlin 134. Each end wall upper wall duct 48 is located below an end wall eave channel 136 or below the ends of the roof purlins 110, 128, 134 if there is no end wall eave channel 136. The side wall, end wall, and subterranean ducts 40, 42, 44, 46, 48, 50 are capable of receiving outside air or interior space air through either air flow holes 56 or through branch ducts 63. Typically there would be an operable damper strip 60 or an operable louver 67 to open or close the air flow holes 56 or branch ducts 63 to air flows.

The side wall upper wall duct 42 is located below the sidewall eave roof ducts 40. The upper wall ducts 42, 48 and base wall ducts 44, 50 communicate with the air gap layers 12 of the walls. The upper side wall ducts 42 allow heat and air in the wall air gap layers 12 to communicate with the roof air gap layers 10 directly or through eave line roof duct 40.

Figure 15:
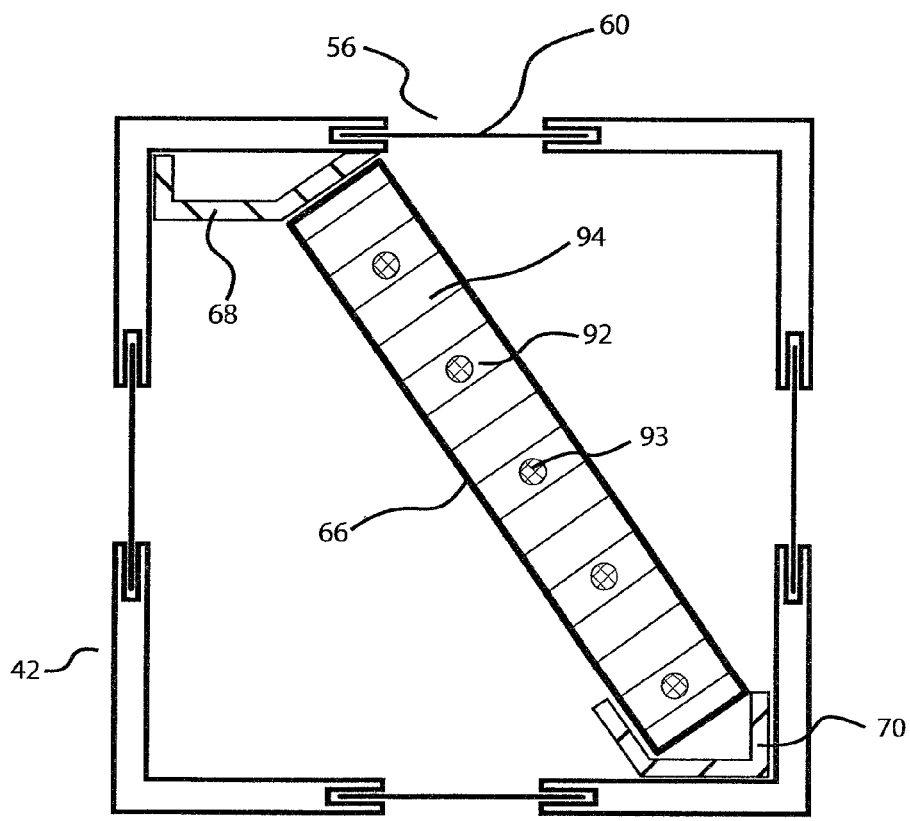
FIG. 15 is an enlarged cross sectional end view of a heat collection coil/dehumidifier retained above a water collection trough in a wall duct or a multi-vent in accordance with the present invention.

With reference to FIG. 15, a heat collection coil/dehumidifier 66 is preferably retained inside the sidewall upper wall air gap layer 12 or inside the upper wall ducts 42 at this same general location. An coil bracket 68 is secured to one edge of the side wall heat collection/dehumidifier coil 66 and a lower mounting bracket 70 is secured to the other edge of the heat collection/dehumidifier coil 66. With reference to FIG. 10, a blower 65 may be used to transfer heat and air from the wall heat collection air gap layer 12 to an interior space of the metal building 100. The side wall base ducts 44 and the end wall base duct 50 are located adjacent the wall panel 114 and above the floor 126. Ends of the side wall ducts 40, 42, 44 and ends of the end ducts 48, 50 are preferably closed with a duct end cap 59 illustrated in FIG. 16. The base ducts 44, 50 may be made of a suitable material and used to replace a base support channel (not shown) and provide the intended functions of both the base ducting 44, 50 and of the base structural support channel 116.

Figure 9:
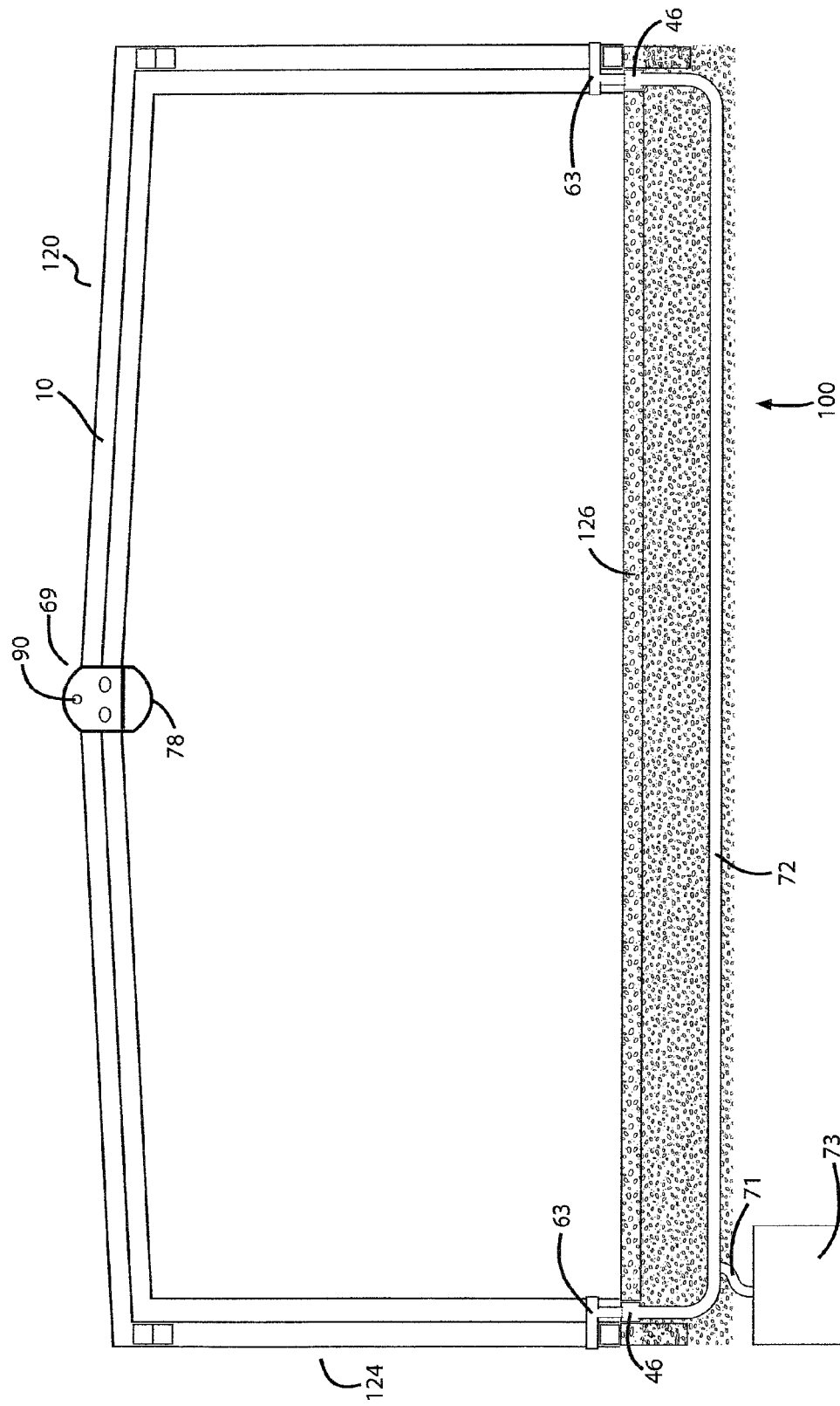
FIG. 9 is a cross sectional end view of a metal building with subterranean air conditioning ducts and tubing installed below a floor with a condensate drain pipe and water collection reservoir in accordance with the present invention.

With reference to FIG. 9, the two opposing side wall subterranean air ducts 46 are located at a base perimeter of the metal building 100, preferably at or below floor level and which extends the side wall length of the metal building 100. One side wall subterranean air duct 46 communicates with the interior air space of the metal building 100 through at least one branch duct 63 or the plurality of duct modules tubes 54 air flow holes 56. The opposing side wall subterranean duct communicates with the exterior air through at least one opposing branch duct 63 to the exterior air. A plurality of subterranean tubing 72 is located below the floor 126 of the building at a depth of about 6 to 9 feet, which run parallel to each other in the earth with the opposing subterranean tubing 72 ends connected to the two opposing subterranean ducts 46. Air flowed through the subterranean ducts 46 flows through the subterranean tubing 72 under the building floor 126 will be cooled by a reduced temperature of the earth in contact with the subterranean tubing 72. One end of the plurality of subterranean tubing 72 is connected to one of the two lengthwise subterranean air tubing ducts 46 and the other end of the plurality of foundation tubing 72 is connected to a second of the two lengthwise subterranean air tubing ducts 46.

It is preferable that the plurality of foundation tubing 72 be oriented either parallel to the end walls of the building or parallel to the side walls of the building. It is preferred that the plurality of subterranean tubing 72 be connected to either the opposing sidewall subterranean ducts 46 or to opposing end wall subterranean tubing ducts (not shown). It is possible to use more than one subterranean duct and tubing system under the floor 126 of the metal building 100 at different depths to condition additional volumes of ventilation air flowing through them. The subterranean tubes 72 should be sloped to a low point and connected to a liquid water drain pipe 71 which connects to a liquid water reservoir 73 from which the condensation water can be stored and recycled for other uses.

With reference to FIGS. 9, 18-20, the ridge mounted multi-vent 69 includes a plurality of vent modules 74 attached to each other end to end in series. The plurality of vent modules 74 are secured in series to each other with bolts or any suitable attachment device or method. Each vent module 74 includes a box unit 76 and a cover 78. The box unit 76 includes a vent base 80, two end walls 82, two side walls 84 and two box side flanges 86. The two end walls 82 extend upward from opposing ends of the vent base 80 and two side walls 84 extend upward from opposing sides of the vent base 80. A single flange 86 extends outward from a top of each box side wall 84. At least one air opening 88 may be formed through each end wall 82 to allow the flow of air between the vent modules 74. With reference to FIG. 14, a heat transfer pipe hole 90 may also be formed through each end wall 82 to receive a heat transfer pipe 92. A plurality of heat fins 94 are attached along a length of the heat transfer pipe 92. A trough 96 is placed under the heat transfer pipe 92 to catch and channel condensation to a drain (not shown) along its length.

The cover 78 includes a cover portion 98 and a pair of cover side flanges 99 disposed on opposing side edges thereof. The cover portion 98 preferably includes a curved cross section. The cover side flange 99 extends from each side of the cover portion 98. A first sealing material (not shown) may be placed between the cover side flanges 99 and the box side flanges 86. A second sealing material (not shown) may be placed between the cover portion ends 98 and the box end wall 82 top edges. The cover 78 is preferably fabricated from a material, which is light translucent, light collecting, light diffusing or opaque. A damper slot 150 may be formed into each side wall 84 to slidably retain the damper strip 60. A plurality of air flow holes are formed through the side walls 84 in the damper slot 150. The damper strip 60 of FIG. 17 may be shifted in the damper slot 150 with an actuation device to allow air to flow through air flow holes 62 and 95. With reference to FIGS. 21-22, the covers 78 of the plurality of vent modules 74 are secured through their flanges 99 to ridge roof sheeting panel closures 75 or to the roof ridge purlins 128 structures with fasteners 26 or any suitable attachment device or method.

With reference to FIGS. 18-20, the box unit 76 may have two end wall extension panels 152 which attach to base of the end walls 82, and two side wall extension panels 154 which attach to the base of the side wall panels 84. These extension panels fill any gap between the ridge support struts 20 and the base 80 of the multi-vent box unit side walls 84 and end walls 82. A cover 78 with two opposing side flanges 99 may be attached to the side wall extensions from the interior side. The cover 78 is preferably fabricated from a material, which is light translucent, light collecting, light diffusing or opaque.

Figure 27:
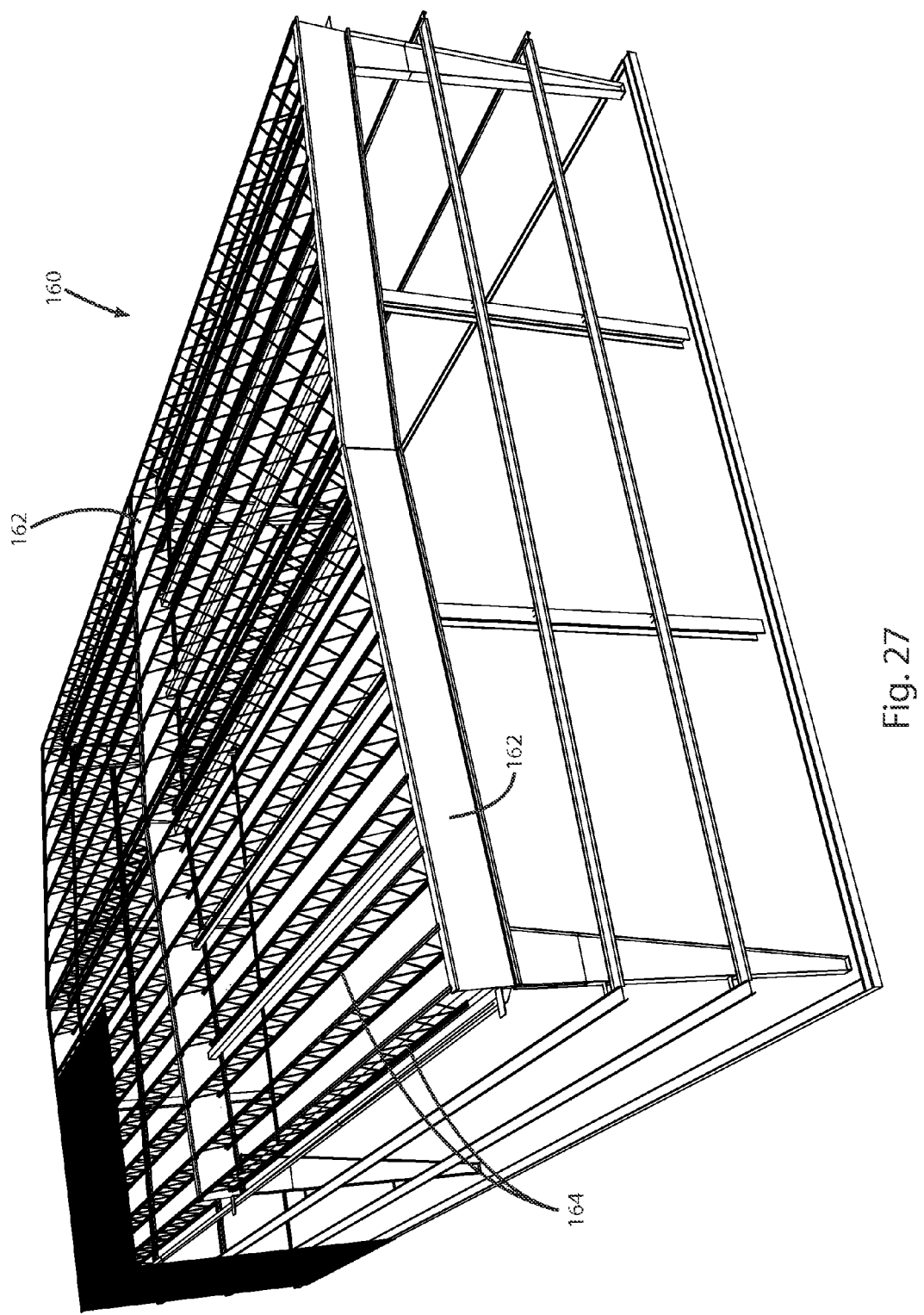
FIG. 27 is a perspective cut-away view of a metal building with an extended distance between rafters.
Figure 28:
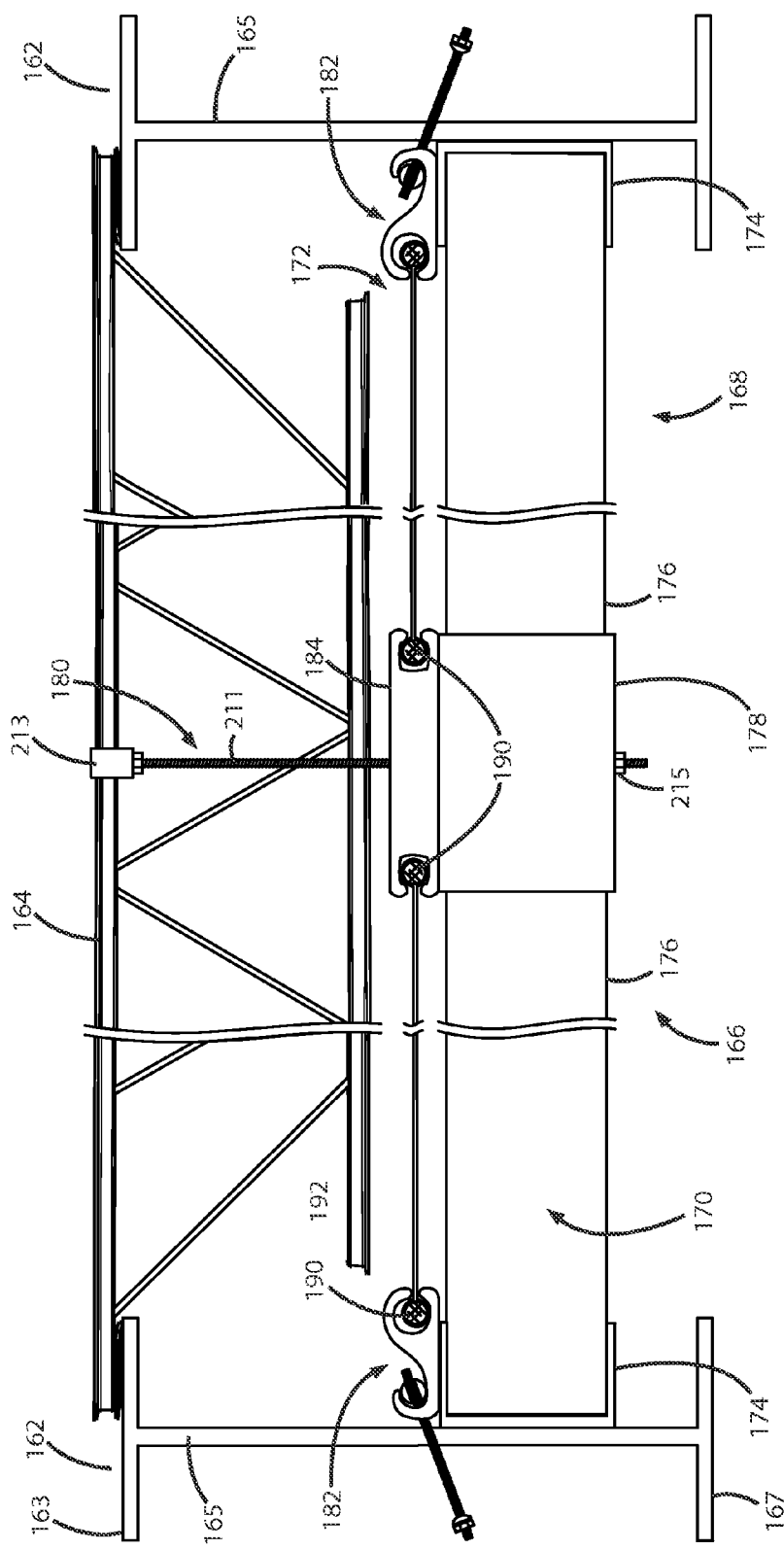
FIG. 28 is a side view of a tensioned panel extended insulation system in accordance with the present invention.
Figure 29:
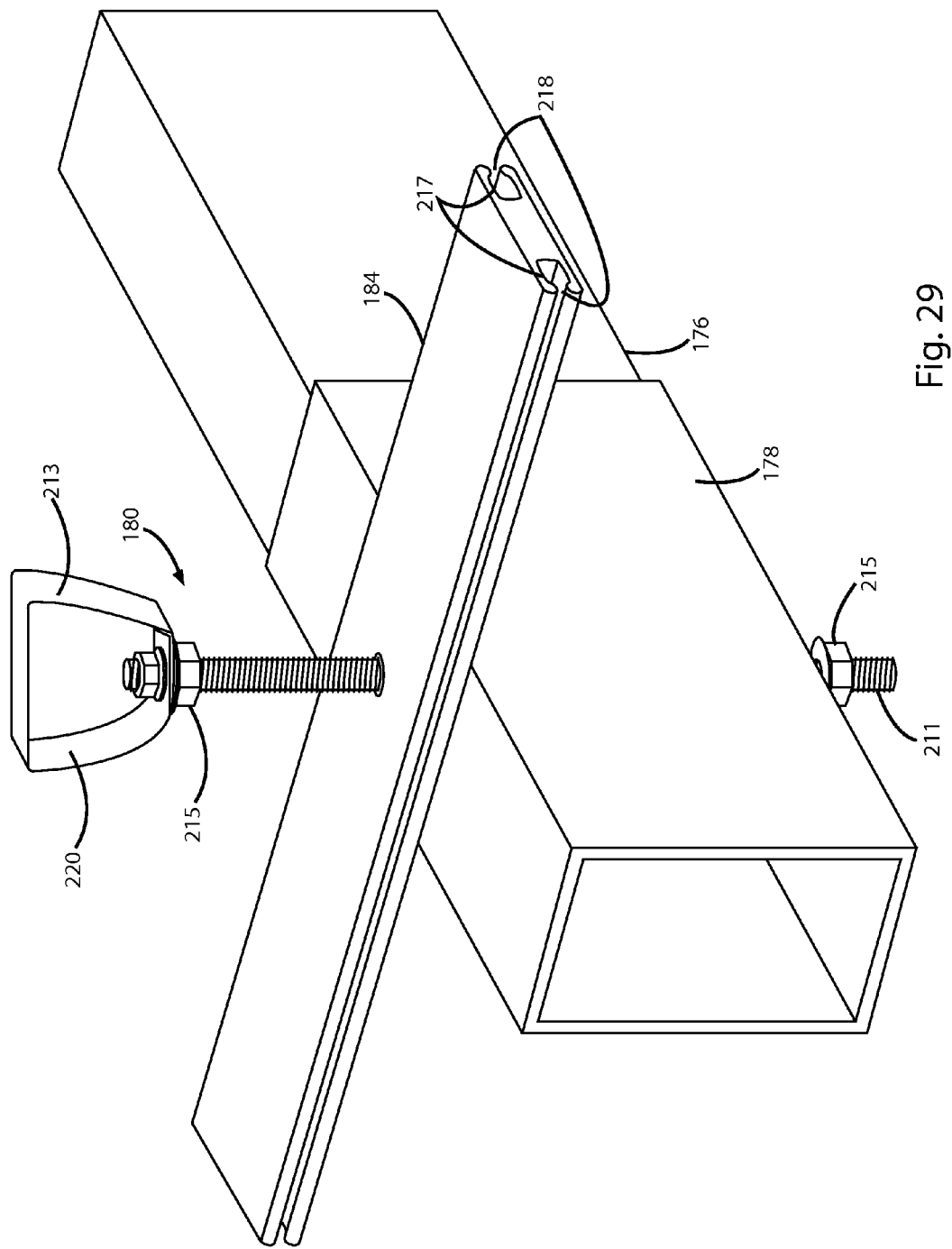
FIG. 29 is an enlarged perspective view of a center hanger and a center strut support of a tensioned panel extended insulation system in accordance with the present invention.
Figure 30:
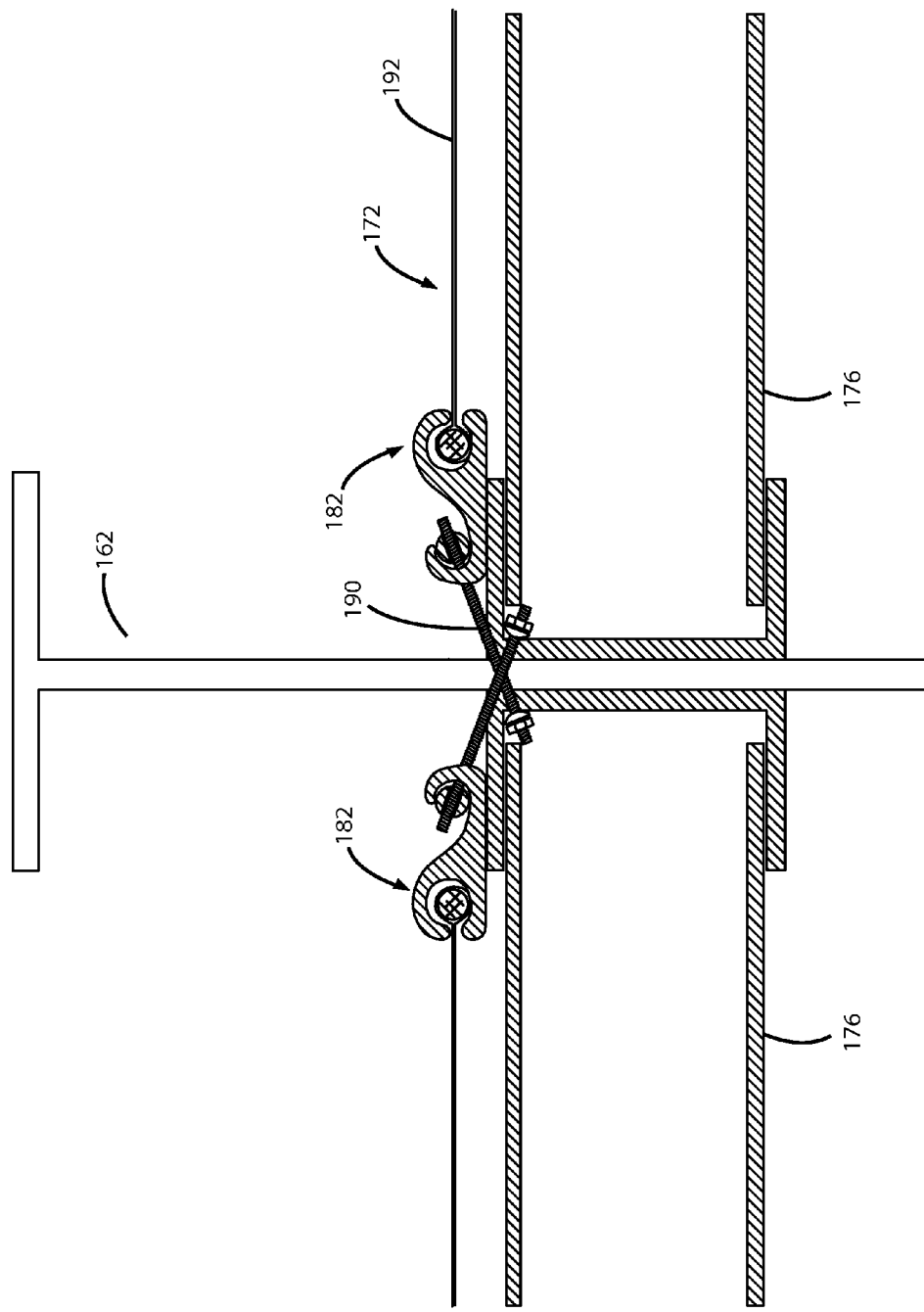
FIG. 30 is an enlarged cross sectional side view of ends of two tensioned panel extended insulation system anchored to a rafter in accordance with the present invention.
Figure 31:
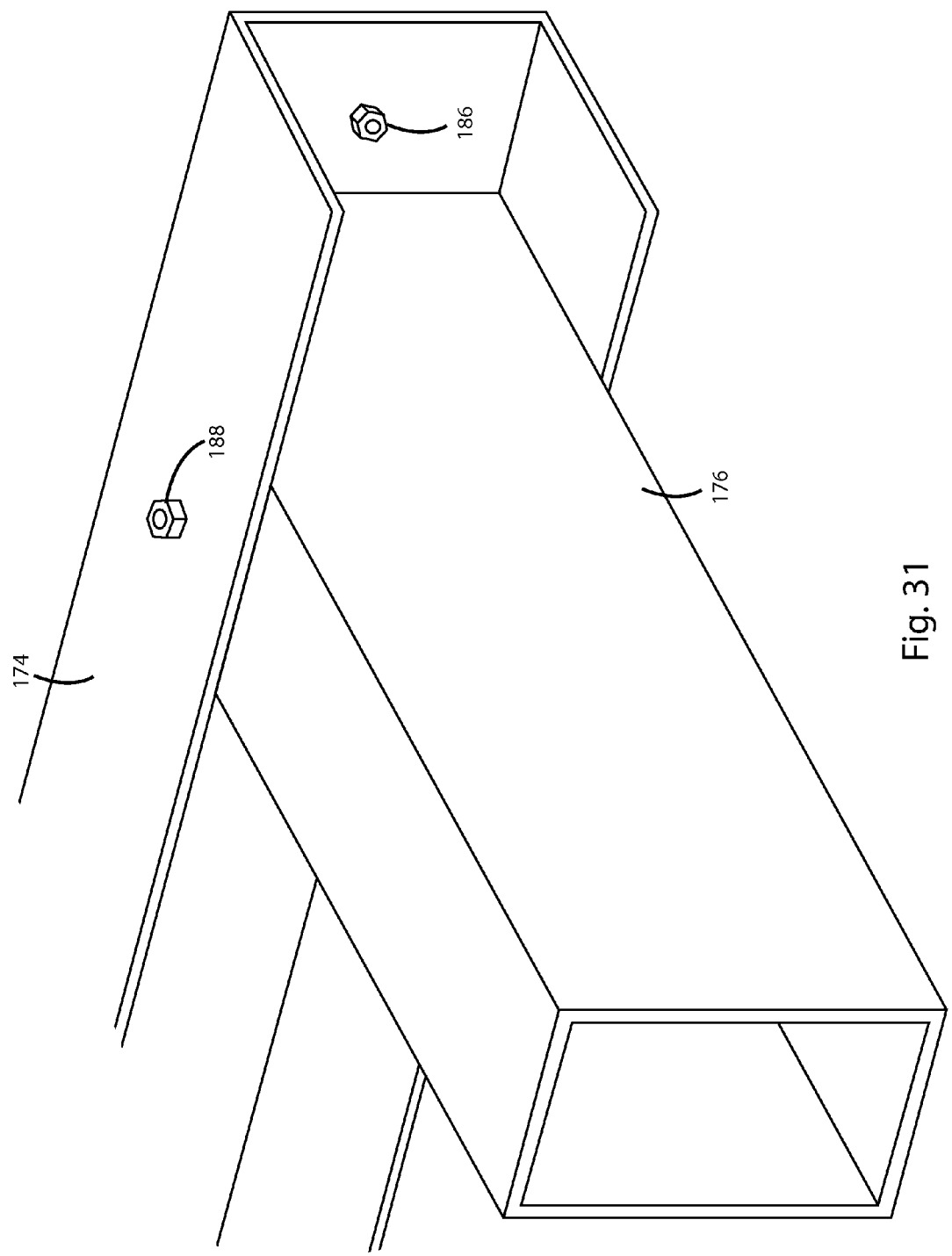
FIG. 31 is an enlarged perspective view of a lengthwise strut retained in a strut end support of a tensioned panel extended insulation system in accordance with the present invention.
Figure 32:
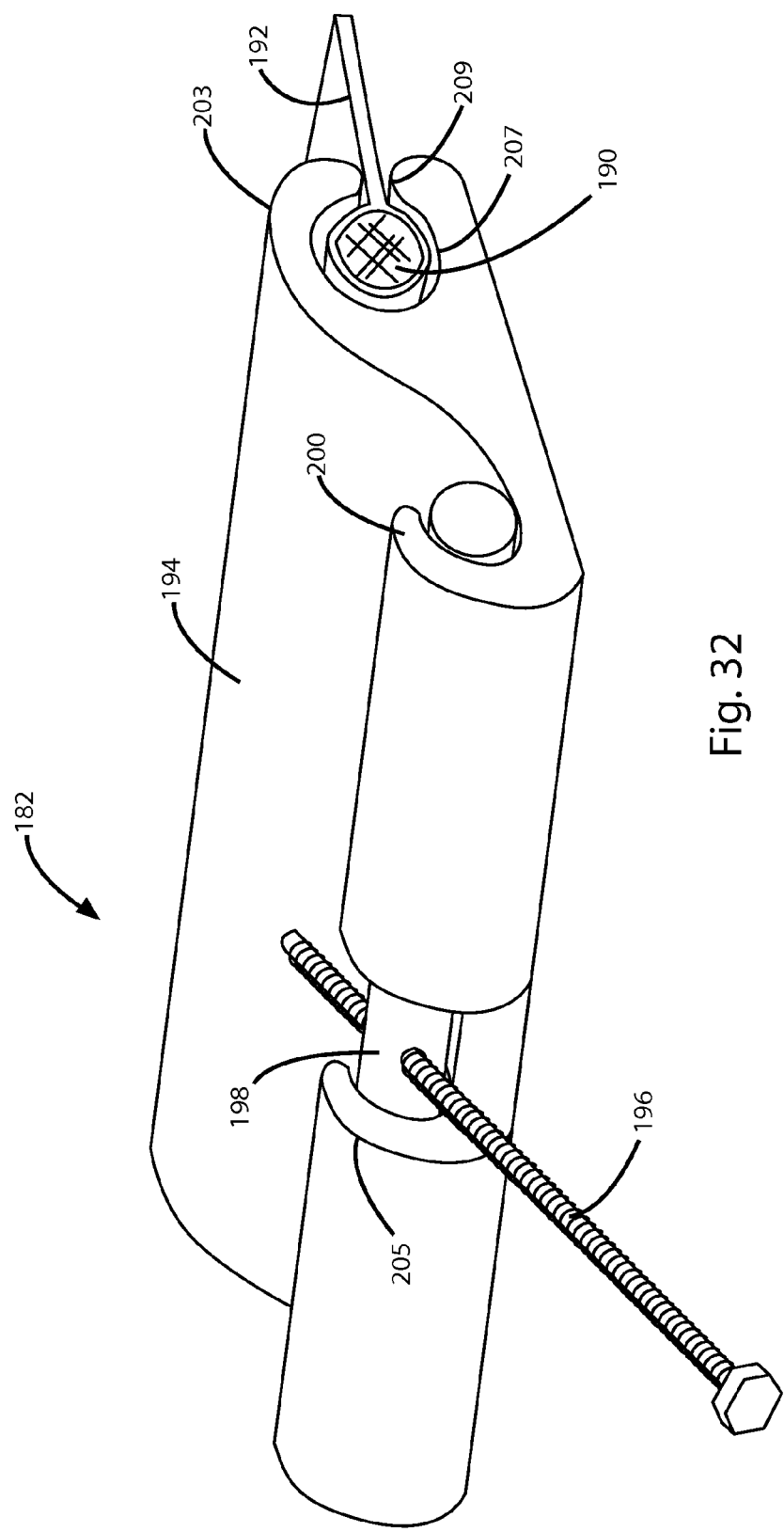
FIG. 32 is an enlarged perspective view of a sheet side edge holder retaining an insulation panel of a tensioned panel extended insulation system in accordance with the present invention.

FIG. 27 discloses a cut-away view of a metal building 160 with an extended distance between adjacent rafters 162. The metal building 160 includes the plurality of rafters 162 and a plurality of bar joists 164 that span the adjacent rafters 162. Each rafter 162 includes a top flange 163, a vertical web 165 and a bottom flange 167. FIGS. 28-32 disclose a tensioned panel extended insulation system 166. The tensioned panel extended insulation system 166 preferably includes a support structure 168, a panel support structure 170 and a pair of insulation panels 172. The support structure 168 preferably includes two strut end supports 174, two lengthwise struts 176, a center strut support 178 and a center hanger 180. The support structure 170 includes two sheet side edge holders 182 and a center edge holder 184. Each strut end support 174 includes a C-shaped cross section. A vertical portion of each strut end support 174 is preferably attached to the vertical web 165 of the rafter 162 with any suitable method, such as fasteners 186. An inside perimeter of the two strut end supports 174 are sized to receive the two lengthwise struts 176. One end of the two lengthwise struts 176 is retained in the two strut end supports 174 with any suitable method, such as fasteners 188. The other end of the two lengthwise struts 176 is retained in opposing ends of the center strut support 178. An inner perimeter of the center strut support 178 is sized to receive the two lengthwise struts 176.

Each insulation panel 172 includes two opposing rod ends 190 and sheet material 192. Insulation is supported above the insulation panels 172. Each end of the sheet material 192 is secured to one of the pair of opposing rod ends 190. Each rod end 190 is preferably foldable or flexible. Each side edge holder 182 includes a side holder body 194, a tensioning bolt 196 and a cylindrical nut 198. A rod hook 200 is formed on one end of the side holder body 194 and a sheet retainer 203 is formed on an opposing end of the side holder body 194. A bolt notch 205 is formed through the rod hook 205 to provide clearance for the tensioning bolt 196. The tensioning bolt 196 is threaded into the cylindrical nut 198.

The sheet retainer 203 includes a rod cross bore 207 and a sheet slit 209. The rod cross bore 207 is sized to receive one of the rod ends 190 and the cross slit 209 provides clearance for the sheet material 192. The center edge holder 184 includes a support stud 211, a joist hanger 213 and a plurality of threaded nuts 215. A lengthwise rod slot 217 is formed in opposing sides of the center edge holder 184. A sheet clearance slit 218 is formed through the lengthwise rod slot 216. The lengthwise rod slot 217 retains the opposing rod end 190 and the sheet clearance slit 218 provides clearance for the sheet material 192. A hole is formed through the center edge holder 184 and the center strut support 178 for insertion of the support stud 211. The joist hanger 213 is preferably fabricated from a strip of metal 220. The strip of metal 220 is bent into a substantially rectangular shape. A stud hole is formed through each end of the strip of metal 220 to receive the support stud 210. The strip of metal 220 is bent to form the substantially rectangular shape, such that the support stud 211 is inserted through the two stud holes and retained with two nuts 215 on one end of the support stud 211. Another nut 215 is threaded on to the other end of the support stud 211 to support the center strut support 178. The insulation panel 172 is tensioned between adjacent rafters 162 by inserting tensioning bolts 196 through adjacent rafters 162 and tightening the tensioning bolts 196 in the cylindrical nuts 198, until the insulation panel 172 is taught.

With reference to FIGS. 33-35, a telescoping tube extended insulation system preferably includes a support structure 224 and an ceiling sheet material (not shown). The telescoping tube extended insulation system 222 has a maximum span of about 30 feet. The support structure includes two strut tubes 226 and a center strut tube 228. Each strut tube 226 includes a support tube 230 and an attachment plate. One end of the two strut tubes 230 is retained in the center strut 228 and the other end of the two strut tubes terminated with the attachment plate. The attachment plate may be parallel to an axis of the support tube or perpendicular to an axis of the support tube. With reference to FIGS. 37-38, a parallel attachment plate 232 includes at least one bolt hole 234 for fastening to a rafter web stiffener 169 or a rafter clip 236. A perpendicular attachment plate 238 includes at least two threaded fasteners 240 extending outward therefrom. At least two holes are formed through the vertical web 165 of the rafter 162 to receive the at least two threaded fasteners 240. With reference to FIG. 36, the perpendicular attachment plate 238 is secured to the vertical web 165 with at least two nuts 242

The rafter clip 236 preferably includes a clip member 244 and a clip attachment plate 246. The clip member 244 includes a flange plate 248, a vertical plate 250 and a web plate 252. One end of the flange plate 248 is terminated with a hook portion 254 and the vertical plate 250 extends downward from the other end of the flange plate 248. The attachment plate 246 extends from a front of the vertical plate 250. The web plate 252 extends inward from a bottom of the vertical plate 250. A distal end of the web plate 250 is terminated with a flange plate 256. The hook portion 254 hooks around an edge of the top flange 163. At least one bolt 258 may be inserted through the flange plate 256 and secured to the vertical web 165 with at least one nut 260. The parallel attachment plate 232 is bolted to the clip attachment plate 246 with fasteners or the like. After the telescoping tube extended insulation system 222 is secured to adjacent rafters 162, two holes are drilled through the two strut tubes 226 and the center strut tube 228 to receive two fasteners 260. The ceiling sheet material is retained on a top of the support structure 224.

With reference to FIG. 39, a bracing strut 262 may be used to further support an end of the strut tube 226 relative to the rafter 162. The bracing strut 262 includes a strut brace clip 264, a rafter brace clip 266 two bolts 267 and a rafter brace member 268. The rafter brace clip 266 is attached to the bottom flange 167 of the rafter 162 and the strut brace clip 264 is attached to a bottom of the strut tube 226. Each opposing end of the rafter brace member 268 is attached to one of the strut brace clip 264 and the other end of the rafter brace member 268 is attached to the rafter brace clip 266.

Figure 40:
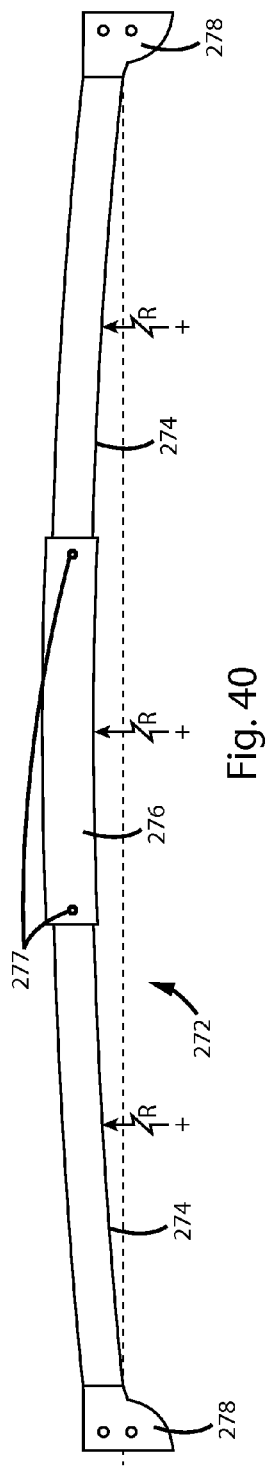
FIG. 40 is a side view of an arched telescoping tube extended insulation system in accordance with the present invention.

With reference to FIG. 40, an arched telescoping tube extended insulation system includes an arched support structure 272 and the ceiling sheet material (not shown). The arched support structure 272 includes forming a large radius on two arched strut tubes 274 and an arched center strut tube 276, such that a middle of the arched support structure 272 is higher than each end of the arched support structure 272 to offset deflection of the arched support structure 272 during use. A distal end of the two strut tubes 274 is terminated with a parallel attachment plate 278. Two fasteners 277 are used to attach the two arched strut tubes in the arched center strut tube 276. It is preferable that the height differential is between 1.25-1.50 inches over a length of 25 feet.

Figure 41:
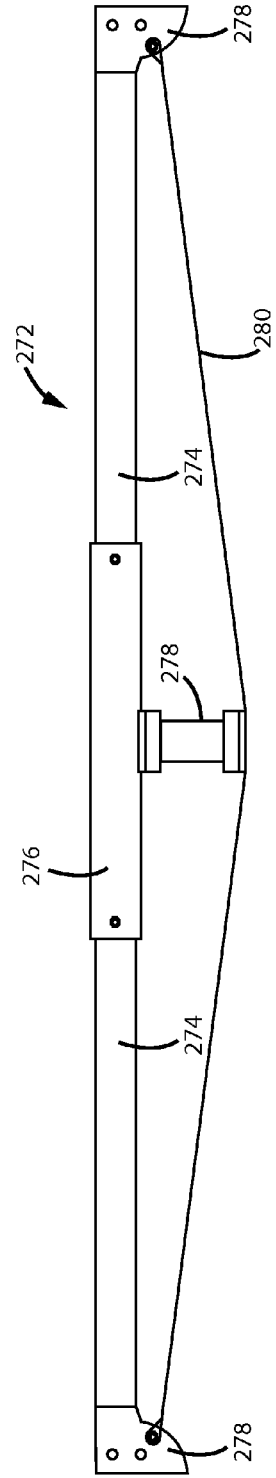
FIG. 41 is a side view of a cable arched telescoping tube extended insulation system in accordance with the present invention.
Figure 41A:
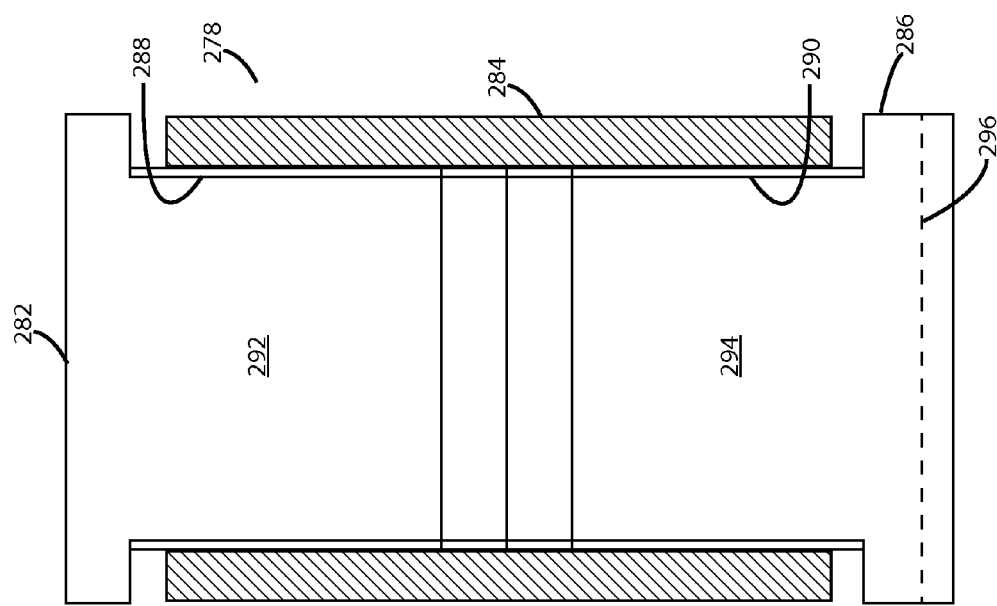
FIG. 41a is an enlarged side cross sectional view of an adjustable spacer of a cable arched telescoping tube extended insulation system in accordance with the present invention.

With reference to FIG. 41, a cable arched telescoping tube cable extended insulation system includes the arched support structure 272, an adjustable spacer 278, a cable 280 and the ceiling sheet material (not shown). The adjustable spacer 278 is attached to a bottom of the arched center strut tube 276. One end of the cable 280 is attached to one parallel attachment plate 278 and the other end of the cable 280 is attached to an opposing parallel attachment plate 278. With reference to FIG. 41a, the adjustable spacer 278 includes a top portion 282, a center portion 284 and a bottom portion 286. A left hand thread 288 is formed into half a depth of one end of the center portion 284 and a right hand thread 290 is formed into half a depth of an opposing end of the center portion 284. A left hand threaded shaft 292 extends from a bottom of the top portion 282 and a right hand threaded 294 shaft extends from a top of the bottom portion 286. The top portion 282 is threaded into a top of the center portion 284 and the bottom portion 286 is threaded into a bottom of the center portion 284. Rotation of the center portion decreases or increases a length of the adjustable spacer 278 to offset deflection during use. A groove 296 is preferably formed in a bottom of the bottom portion 286 to receive the cable 280.

Figure 42:
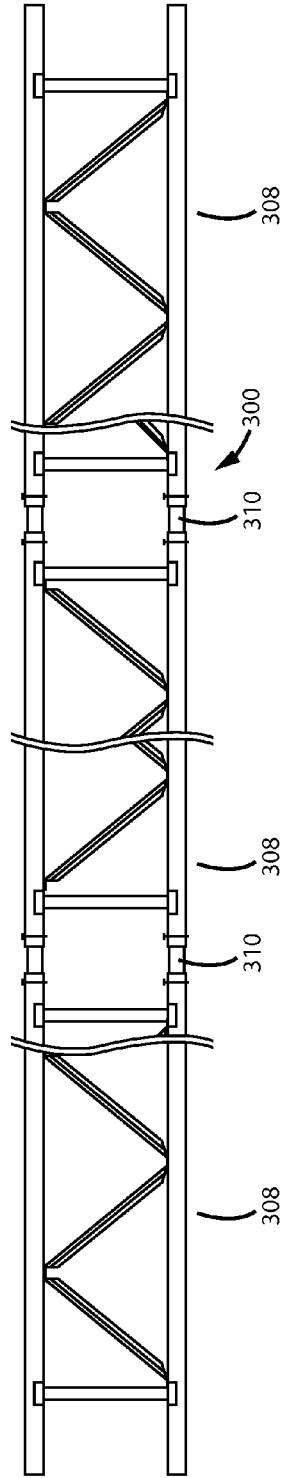
FIG. 42 is a side view of an insulation support structure of a bar joist extended insulation system in accordance with the present invention.
Figure 43:
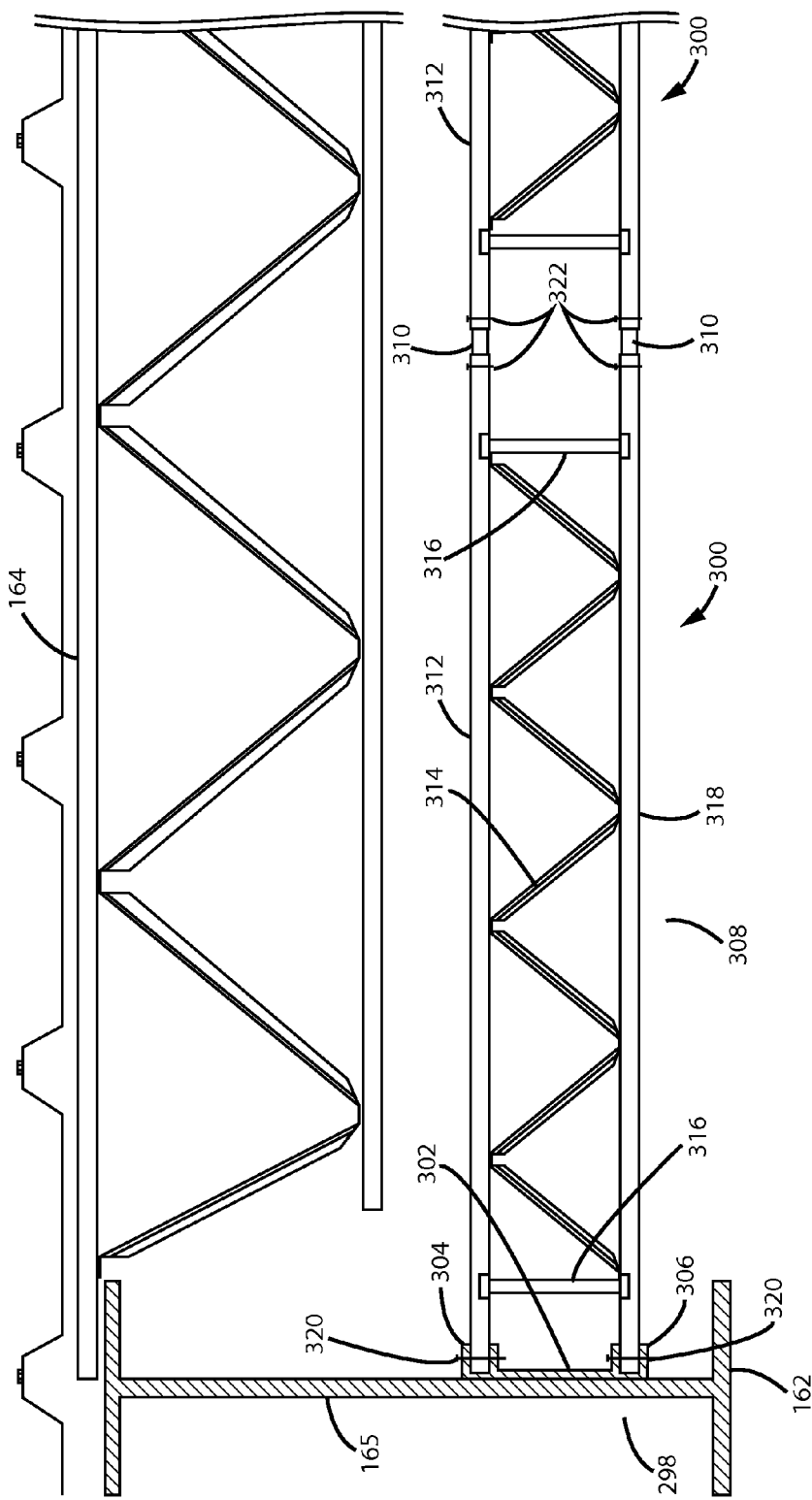
FIG. 43 is a side view of a support structure retaining one end of a insulation support structure of a bar joist extended insulation system in accordance with the present invention.

With reference to FIGS. 42-43, a bar joist extended insulation system preferably includes a support structure 298, an insulation support structure 300 and a ceiling sheet material (not shown). The support structure 298 includes a base member 302, a top yoke 304 and a bottom yoke 306.

The bottom yoke 306 extends outward from a bottom of the base member 302 and the top yoke 304 extends outward from a top of the base member 302. The base member 302 is attached to the web 165 of the rafter 162. The insulation support structure 300 includes at least two bar joist members 308 and at least two telescoping tubes 310. With reference to FIGS. 44-45, each bar joist member 308 includes a top chord 312, a plurality of webs 314, at least two vertical support members 316 and a bottom chord 318. An end of the top and bottom chords 312, 318 are sized to be received by the top and bottom yokes 304, 306 respectively. One end of the plurality of webs 314 is attached to a top of the bottom chord 318 and the other end of the plurality of webs 314 is attached to a bottom of the top chord 312. The top and bottom chords 312, 318 could have a C-shape, a round shape or any other suitable shape. An inner perimeter of the top and bottom chords 312, 318 is sized to receive an outer perimeter of the telescoping tubes 310. The ceiling sheet material (not shown) is retained on a top of the top chord 318. Fasteners 320 are used to secure one end of the top and bottom chords 312, 318 in the top and bottom yokes 304, 306. Fasteners 322 are used to secure the other end of the top and bottom chords 312, 318 to one end of the telescoping tubes 310. The other end of the telescoping tubes 310 are secured to one end of the top bottom chords 312, 318 of a second bar joist member 308. The bar joist extended insulation system will support the ceiling sheet material having a width of up to 60 feet.

With reference to FIG. 46, an arched bar joist extended insulation system includes the support structure 298, an arched insulation support structure 324 and the ceiling sheet material (not shown). The arched insulation support structure 324 includes at least two arched bar joists 326 and at least two arched telescoping tubes 328. The arched bar joists 326 include an arched top chord 330, the plurality of webs 314, the at least two vertical supports 316 and an arched bottom chord 332. The arched insulation support structure 324 is created by forming a large radius on the top chord 330, the bottom chord 332 and the at two telescoping tubes 328, such that a middle of the arched insulation support structure 324 is higher than each end of the arched insulation support structure 324. It is preferable that the height differential is between 1.25-1.50 inches over a length of 25 feet.

Figure 47:
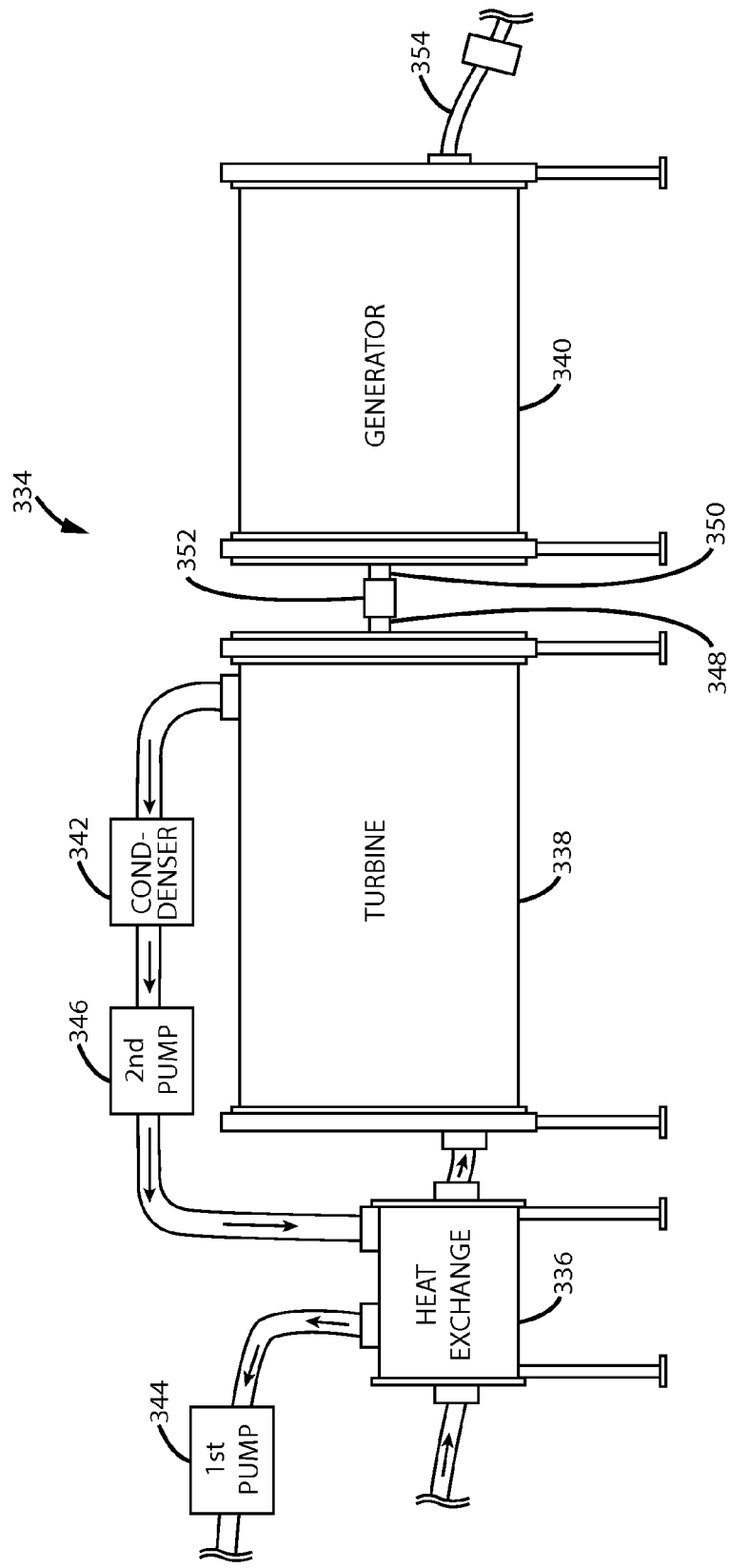
FIG. 47 is a side view of a building heat collection power generator in accordance with the present invention.

With reference to FIG. 47, a building heat collection power generator 334 preferably includes a heat exchanger 336, a pressure driven turbine 338, an electrical generator 340, a condenser 342, a first fluid pump 344 and a second fluid pump 346. With reference to FIG. 4c, heat transfer pipes 92 with heat collection fins are installed at upper wall air gaps and along the highest practical point of a roof air gap, where heat naturally collects and concentrates in a gradient due to gravity. A first heat transfer fluid is pumped through the heat transfer pipes 92. With reference to FIG. 14, a leak-proof trough 96 is placed under the heat transfer pipe 92 to catch and channel condensation to a drain (not shown) along its length. With reference to FIG. 10, solar heated air inside of the wall air gap 12 and/or in the roof air gap 10 comes in contact with the heat transfer pipes 92. The first heat transfer fluid is pumped through the heat transfer pipes with the first fluid pump 344. The first heat transfer fluid collects heat from the wall air gap 12 and the roof air gap 10 of the building 100. The heated first heat transfer fluid travels to the heat exchanger 336, which transfers the heat energy from the first heat transfer fluid to a second heat transfer fluid circulating in the heat exchanger 336 through interlaced plates or tubing. The second heat transfer fluid is circulated with a second fluid pump 346.

The first heat transfer fluid is preferably a low freezing point liquid such as water with an antifreeze chemical added to it to prevent freezing in very cold weather conditions. The second fluid is preferably a low boiling point organic compound such as refrigerants used in some heating and cooling equipment. The secondary heat transfer fluid is heated above its boiling point by the first heat transfer fluid in the heat exchanger 336. the heated second transfer fluid is drawn into the pressure driven turbine 338 by the second fluid pump 346. The condenser 342 cools the second heat transfer fluid exiting the pressure driven turbine 338. The second heat transfer fluid entering the pressure driven turbine causes an output drive shaft 348 thereof to rotate. The output drive shaft 348 is coupled to an input drive shaft 350 of the generator 340 with a shaft coupler 352. Rotation of the input drive shaft 350 causes the generator to output electrical power through an output line 354.

Figure 48:
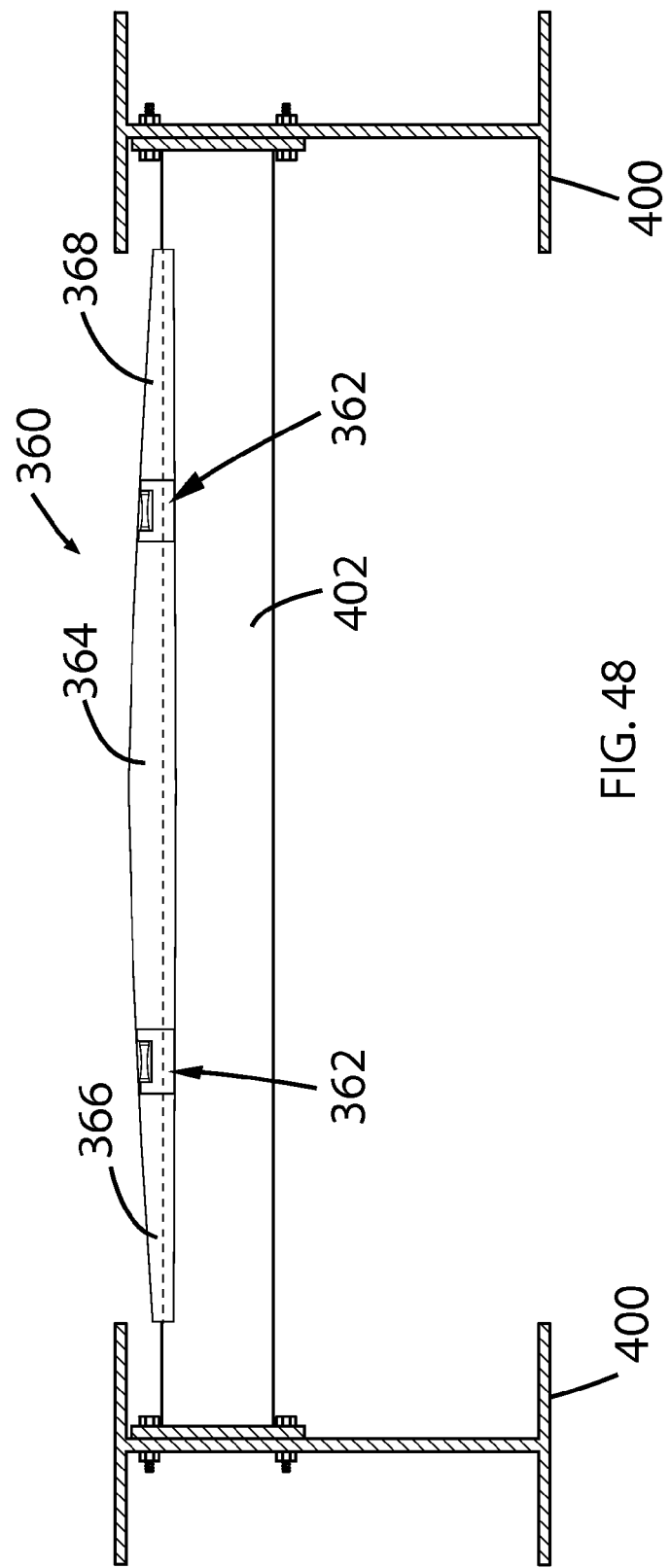
FIG. 48 is a front view of an installation system retained on a strut, before the ceiling sheet is placed in tension in accordance with the present invention.
Figure 49:
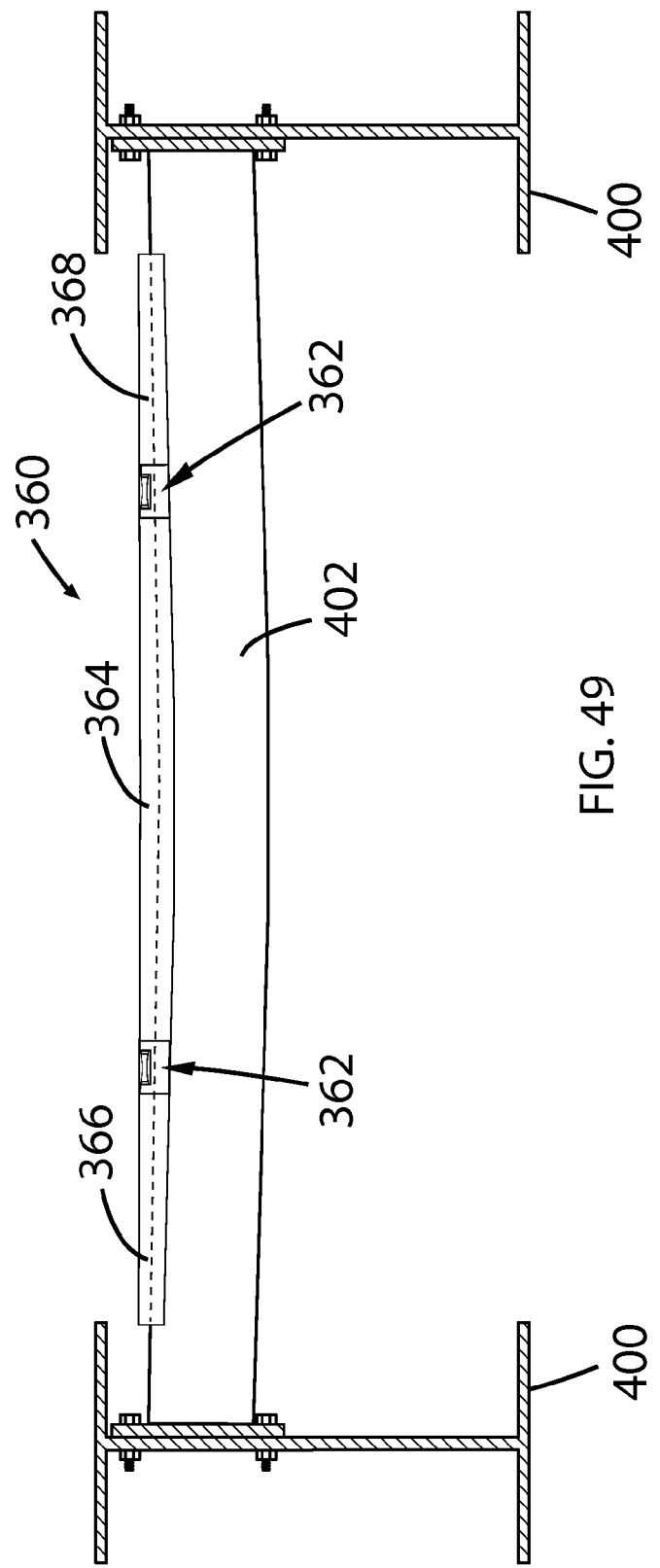
FIG. 49 is a front view of an installation system retained on a strut, after the ceiling sheet is placed in tension in accordance with the present invention.
Figure 52:
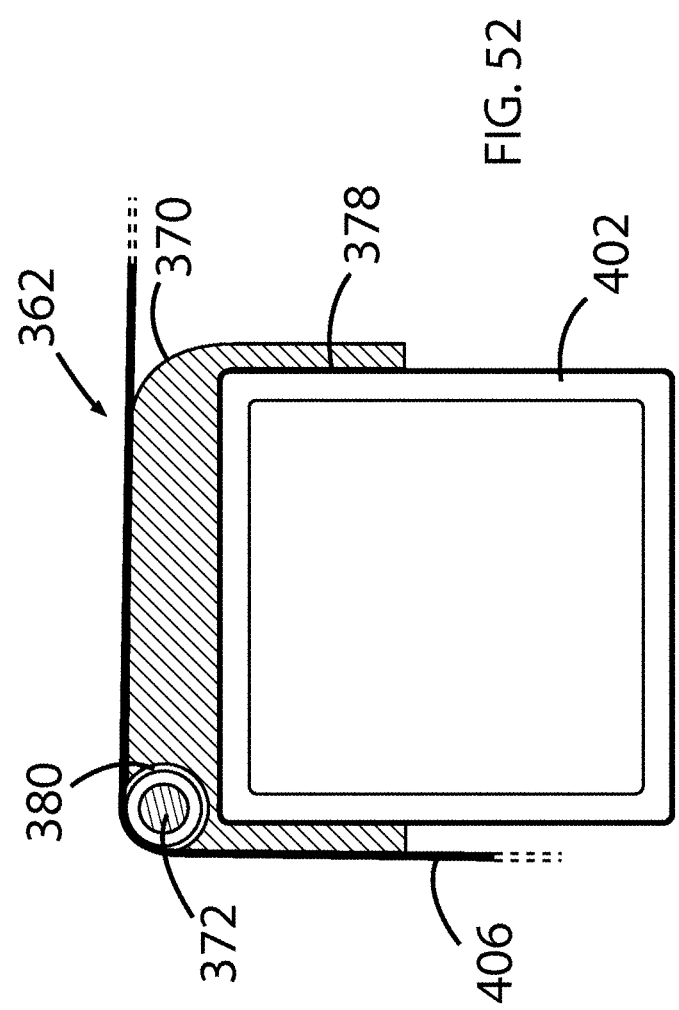
FIG. 52 is a cross sectional view cut through FIG. 50 of a ceiling sheet being pulled over a roller support of an installation system in accordance with the present invention.

With reference to FIGS. 48-49, a system for installing ceiling sheets in buildings (installation system) 360 preferably includes two roller supports 362, a middle section 364, a first end section 366 and a second end section 368. FIG. 48 shows a strut 402, which is attached between two adjacent rafters 400. FIG. 49 shows a strut 402, which is under deflection from a ceiling sheet material pulled into tension. With reference to FIGS. 50-54, each roller support 362 includes a roller support base 370, a roller 372 and a pair of bearings 374. The bearing 374 may also be a bushing. An axle 376 extends from opposing ends of the roller 372. An inner diameter of the bearing 374 is sized to rotatably receive the axle 376.

A C-shaped channel 378 is preferably formed in a bottom of the two roller supports 362, the middle section 364, the first end section 366 and the second end section 368 to receive an outer perimeter of the strut 402. FIG. 51 illustrates that the roller support base 370 is secured to substantially a top of one of the plurality struts 402. The roller support base 370 is not able to rotate relative to the strut 402. However, a single roller support may be created by making the two roller support bases 370 and the middle section from a single piece material. Further, a base support without rollers may be made from the two roller supports 362, the middle section 364, the first end section 366 and the second end section 368. A curved surface is formed on at least one top corner edge of the base support to prevent damage to a ceiling sheet material 406 being pulled over thereof. Alternatively, the roller support base may be extended to half a length of the middle section 364. Preferably, a bottom of the C-shaped channel 378 in the first and second end sections 366, 368 are tapered, such that a distance from a bottom of the C-shaped channel 378 to a top of the end section is greater at an inside end than at an outside end. Preferably, a bottom of the C-shaped channel 378 in the roller support base 370 is tapered, such that a distance from a bottom of the C-shaped channel 378 to a top of the roller support base 370 section is greater at an inside end than at an outside end. Preferably, a bottom of the C-shaped channel 378 in the middle section 364 is tapered, such that a distance from a bottom of the C-shaped channel 378 to a top of the middle section 364 in a middle is greater than at each end thereof.

A roller pocket 380 is formed in a top and side of the roller support 370 to provide clearance for the roller 372. A pair of bearing snap pockets 382 are formed in opposing ends of the roller pocket 380 to receive the pair of bearings 374. The roller 372 is preferably a bow tie roller. The bow tie roller would keep a cable 404 centered, which is used to pull the ceiling sheet material 406 over the strut 402. The pair of bearings 374 are placed over the pair of axles 376. The roller-bearing assembly is snapped into the pair of snap bearing pockets 382. The sheet support base 370 is placed on top of the strut 402 with the first end, middle and second end sections 366, 364, 368, where the ceiling sheet material 404 will make a substantially perpendicular turn relative to itself.

With reference to FIGS. 55-56, a sheave support 384 is substituted for the roller support 362. The sheave support 384 includes a roller support base 386 and a sheave 388. The roller support base 386 includes a roller pocket 390, which is formed in a top and side of the roller support base 386 to receive the sheave 388. The roller support base 386 also includes a C-shaped channel 392 formed in a bottom thereof. The sheave 388 preferably includes the shape of the bow tie roller 372. The sheave 388 is essentially a quarter section of the roller 372, which is secured in the roller pocket 388.

Figure 59:
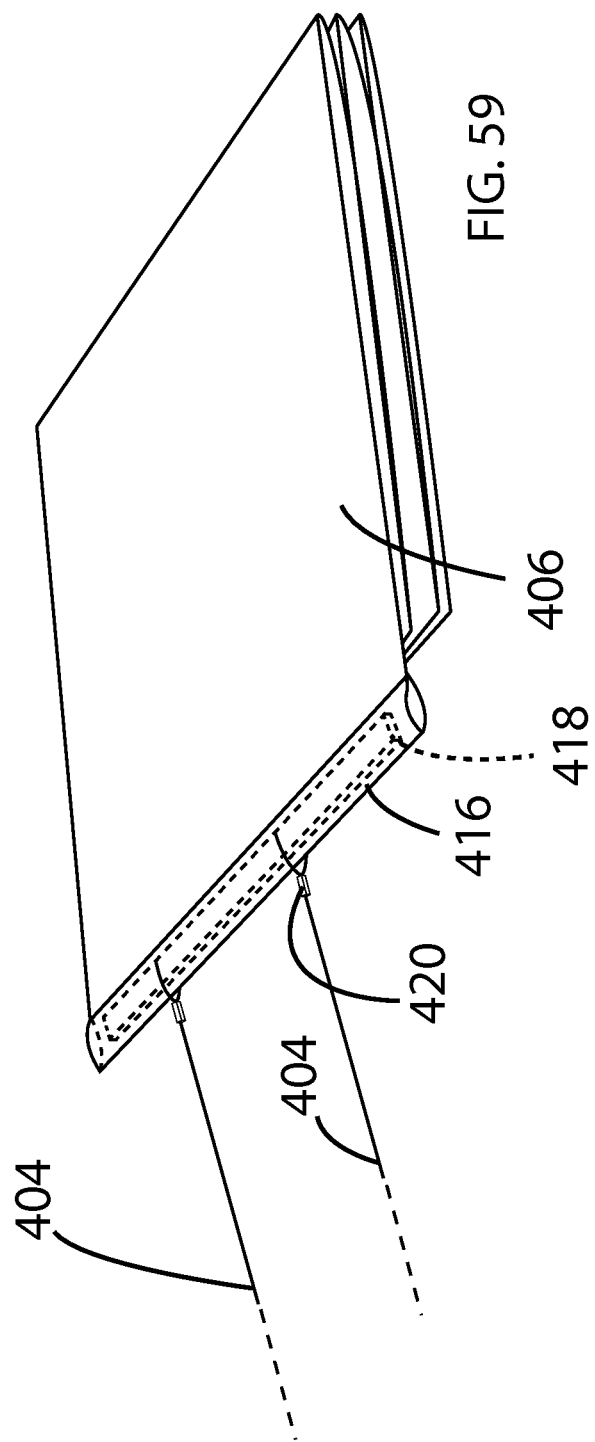
FIG. 59 is a perspective view of an elongated member secured to an end of a ceiling sheet material of an installation system in accordance with the present invention.

With reference to FIGS. 57-58, the conventional stationary strut 402 may be replaced with a rotary strut 408 for installing ceiling sheet material 406. The rotary strut 408 preferably includes a pair of bearing brackets 410 and a roller support 412. The roller support 412 preferably includes a substantially parabolic shape and a pair of cable groves 414 formed in a perimeter of the roller support 412 to locate cables, when a ceiling sheet material 406 is pulled over a plurality of struts 402. The substantially parabolic shape provides support to a middle of the ceiling sheet material 406 when pulled. Each end of the roller support 412 is inserted into one of the pair of bearing brackets 410. The bearing brackets 410 are attached between adjacent rafters 400 with fasteners or the like. The rotary strut 308 provides structural rigidity to the adjacent rafters 400 and the roller support 412 rotates relative to the adjacent rafters 400. The rotary strut 412 is installed adjacent a wall of a building. With reference to FIG. 59, an end of the ceiling sheet material 406 is folded over itself to form a pull loop 416. An elongated member 418 is inserted into the pull loop 416. One end of the at least one cable 404 is inserted through the ceiling sheet material 406 and behind the elongated member 418. The at least one cable 404 is secured to itself with any suitable device 420 or method. An opposing end of the at least one cable 404 is secured to a cable pulling device (not shown). The cable 404 may also be any suitable pulling filament, such as a cord, a strap or rope.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A system for installing ceiling sheet material in buildings, the building including a plurality of parallel rafters, a plurality of struts are retained between two adjacent rafters of the plurality of rafters, comprising:
   a roller support includes a roller support base and at least one roller, said at least one roller is rotatably retained by said roller support base, said roller support base is secured to a top of one of the plurality of struts, said roller support base does not rotate relative to the plurality of struts, wherein when at least one of a ceiling sheet and a filament is pulled over said roller support, an end of the ceiling sheet is substantially perpendicular to a horizontal portion of the ceiling sheet.

2. A system for installing ceiling sheets in buildings, the building including a plurality of parallel rafters and a plurality of struts extending between two adjacent rafters of the plurality of parallel rafters, comprising:
   a base support includes a height at a middle which is greater than a height at each end, said height at each end is tapered to meet said height at said middle, said base support is retained on a top of one of the plurality of struts, a curved surface is formed on at least one top corner edge of said base support, a length of said base support extends substantially a length of one of the plurality of struts, wherein a ceiling sheet is pulled over said base support, the ceiling sheet making a substantially perpendicular bend when pulled.

3. The system for installing ceiling sheet material in buildings of claim 2, further comprising:
   at least one roller pocket is formed in said base support to receive a roller.

4. The system for installing ceiling sheet material in buildings of claim 3, further comprising:
   said roller is supported in said roller pocket with two bearings.

5. The system for installing ceiling sheet material in buildings of claim 2, further comprising:
   at least one sheave pocket is formed in said base support to receive a sheave.

6. A system for installing ceiling sheet material in buildings, the building including at least one of a plurality of parallel rafters and a plurality of columns, each one of the plurality of parallel rafters includes a top horizontal flange, a vertical member and a bottom horizontal flange, comprising:
   a pair of bearing brackets are attached to two adjacent vertical members of the plurality of parallel rafters and two adjacent columns of the plurality of columns; and
   a support roller is pivotally retained between two adjacent rafters of the plurality of parallel rafters, opposing ends of said support roller are retained by said pair of bearing brackets, wherein a ceiling sheet is pulled over said support roller, an end of the ceiling sheet is substantially perpendicular to a horizontal portion of the ceiling sheet.

7. The system for installing ceiling sheet material in buildings of claim 6 wherein:
   said support roller having a substantially parabolic shape.

8. The system for installing ceiling sheet material in buildings of claim 6 wherein:
   at least one filament groove is formed in said support roller.

9. A system for installing ceiling sheets in buildings, the building including a plurality of parallel rafters and a plurality of struts extending between two adjacent rafters of the plurality of parallel rafters, comprising:
   a base support includes a height at a middle which is greater than a height at each end, said height at each end is tapered to meet said height at said middle, said base support is retained adjacent a top of one of the plurality of struts, a curved surface is formed on at least one top corner edge of said base support, a length of said base support extends at least a portion of a length of one of the plurality of struts, wherein a ceiling sheet is pulled over said base support, the ceiling sheet making a substantially perpendicular bend when pulled.

10. The system for installing ceiling sheet material in buildings of claim 9, further comprising:
    at least one roller pocket is formed in said base support to receive a roller.

11. The system for installing ceiling sheet material in buildings of claim 10, further comprising:

said roller is supported in said roller pocket with two bearings.

12. The system for installing ceiling sheet material in buildings of claim 9, further comprising:
   at least one sheave pocket is formed in said base support to receive a sheave.

13. The system for installing ceiling sheet material in buildings of claim 9, further comprising:
   said base support includes at least two sectional base supports; and
   at least one roller support includes a roller, said roller support is retained between said at least two sectional base supports.

* * * * *